(12) United States Patent
Keicher et al.

(10) Patent No.: US 6,811,744 B2
(45) Date of Patent: Nov. 2, 2004

(54) FORMING STRUCTURES FROM CAD SOLID MODELS

(75) Inventors: David M. Keicher, Albuquerque, NM (US); James W. Love, Los Lunas, NM (US); Kevin J. Dullea, Albuquerque, NM (US); James L. Bullen, Edgewood, NM (US); Pierrette H. Gorman, Placitas, NM (US); Mark E. Smith, Tijeras, NM (US)

(73) Assignee: Optomec Design Company, Albuquerque, NM (US)

(*) Notice: Subject to any disclaimer, the term of this patent is extended or adjusted under 35 U.S.C. 154(b) by 89 days.

(21) Appl. No.: 10/128,658

(22) Filed: Apr. 22, 2002

(65) Prior Publication Data

US 2003/0206820 A1 Nov. 6, 2003

Related U.S. Application Data

(63) Continuation-in-part of application No. 09/568,207, filed on May 9, 2000, now Pat. No. 6,391,251.
(60) Provisional application No. 60/143,142, filed on Jul. 7, 1999.

(51) Int. Cl.⁷ .............................. B22F 7/02; B22F 7/04; B32B 1/10
(52) U.S. Cl. .............................. 419/5; 419/9; 264/112; 264/610; 264/629; 264/670
(58) Field of Search ............................... 419/5, 9, 6, 7; 264/112, 610, 629, 670

(56) References Cited

U.S. PATENT DOCUMENTS

| | | | |
|---|---|---|---|
| 4,200,669 A | 4/1980 | Schaefer et al. | |
| 4,323,756 A | 4/1982 | Brown et al. | |
| 4,724,299 A | 2/1988 | Hammeke | |
| 4,927,992 A | 5/1990 | Whitlow et al. | |

(List continued on next page.)

FOREIGN PATENT DOCUMENTS

| | | |
|---|---|---|
| CA | 2131248 | 3/1996 |
| DE | 3541999 A1 | 6/1987 |
| EP | 0 555 896 A1 | 8/1993 |

(List continued on next page.)

OTHER PUBLICATIONS

Keicher, D.M., et al., "The Laser Forming of Metallic Components Using Particulate Materials", *JOM*, May, 1997, pp. 51–54.

(List continued on next page.)

*Primary Examiner*—Daniel Jenkins
(74) *Attorney, Agent, or Firm*—Jeffrey D. Myers; Peacock, Myers & Adams, P.C.

(57) ABSTRACT

A method and apparatus for embedding features and controlling material composition in a three-dimensional structure (130) is disclosed. The invention enables the control of material characteristics, within a structure (130) made from a plurality of materials, directly from computer rendering of solid models of the components. The method uses stereolithography and solid model computer file formats to control a multi-axis head (480) in a directed material deposition process (123). Material feedstock (126, 127) is deposited onto a pre-heated substrate (19). Depositions (15) in a layer-by-layer pattern, defined by solid models (141, 146), create a three-dimensional article having complex geometric details. Thermal management of finished solid articles (250–302), not available through conventional processing techniques, is enabled by embedded voids (152) and/or composite materials (126, 127), which include dissimilar metals (210, 216). Finished articles control pressure drop and produce uniform coolant flow and pressure characteristics. High-efficiency heat transfer is engineered within a solid structure by incorporating other solid materials with diverse indexes. Embedding multi-material structures (132, 134) within a normally solid component (141) produces articles with diverse mechanical properties. Laser and powder delivery systems (420, 170) are integrated in a multi-axis deposition head (480) having a focused particle beam (502) to reduce material waste.

1 Claim, 44 Drawing Sheets

U.S. PATENT DOCUMENTS

| | | |
|---|---|---|
| 4,947,463 A | 8/1990 | Matsuda et al. |
| 5,043,548 A | 8/1991 | Whitney et al. |
| 5,126,102 A | 6/1992 | Takahashi et al. |
| 5,173,220 A | 12/1992 | Reiff et al. |
| 5,176,328 A | 1/1993 | Alexander |
| 5,208,431 A | 5/1993 | Uchiyama et al. |
| 5,306,447 A | 4/1994 | Marcus et al. |
| 5,393,613 A | 2/1995 | MacKay |
| 5,398,193 A | 3/1995 | deAngelis |
| 5,405,660 A | 4/1995 | Psiuk et al. |
| 5,418,350 A | 5/1995 | Freneaux et al. |
| 5,477,026 A | 12/1995 | Buongiorno |
| 5,518,680 A | 5/1996 | Cima et al. |
| 5,578,227 A | 11/1996 | Rabinovich |
| 5,648,127 A | 7/1997 | Turchan et al. |
| 5,653,925 A | 8/1997 | Batchelder |
| 5,697,046 A | 12/1997 | Conley |
| 5,705,117 A | 1/1998 | O'Connor et al. |
| 5,707,715 A | 1/1998 | deRochemont |
| 5,746,844 A | 5/1998 | Sterett et al. |
| 5,775,402 A | 7/1998 | Sachs et al. |
| 5,779,833 A | 7/1998 | Cawley et al. |
| 5,837,960 A | 11/1998 | Lewis et al. |
| 5,847,357 A | 12/1998 | Woodmansee et al. |
| 5,849,238 A | 12/1998 | Schmidt et al. |
| 5,993,554 A | 11/1999 | Keicher et al. |
| 6,046,426 A | 4/2000 | Jeantette et al. |
| 6,144,008 A | 11/2000 | Rabinovich |
| 6,251,488 B1 | 6/2001 | Miller et al. |
| 6,268,584 B1 | 7/2001 | Keicher et al. |
| 6,391,251 B1 * | 5/2002 | Keicher et al. ............... 419/7 |

FOREIGN PATENT DOCUMENTS

| | | |
|---|---|---|
| EP | 0 555 896 B1 | 4/1997 |
| EP | 0 950 502 A2 | 10/1999 |
| WO | WO 92/18323 | 10/1992 |
| WO | WO 97/16274 | 5/1997 |

OTHER PUBLICATIONS

Nakai, T., et al., "Fabrication of Three–Dimensional Objects Using Laser Lithography", *Systems and Computers in Japan*, 1989, vol. 20, No. 3, pp. 58–67, Scipta Technica, Inc.

Smugeresky, J.E., et al., "Laser Engineered Net Shaping (LENS™) Process: Optimization of Surface Finish and Microstructural Properties", Jun. 30, 1997, pp. 1–11.

Smugeresky, J.E., et al., "Using the Laser Engineered Net Shaping (LENS™) Process to Produce Complex Components from a CAD Solid Model", *Proceedings of the SPIE–The International Society for Optical Engineering, Lasers as Tools for Manufacturing II*, Feb. 12–17, 1997, pp. 3–9.

Vanheuseden, K., et al., "Direct Printing of Interconnect Materials for Organic Electronics", *IMAPS ATW Printing for an Intelligent Future*, Mar. 8–10, 2002, pp. 1–5, Lake Tahoe, Nevada.

* cited by examiner

VIEW B

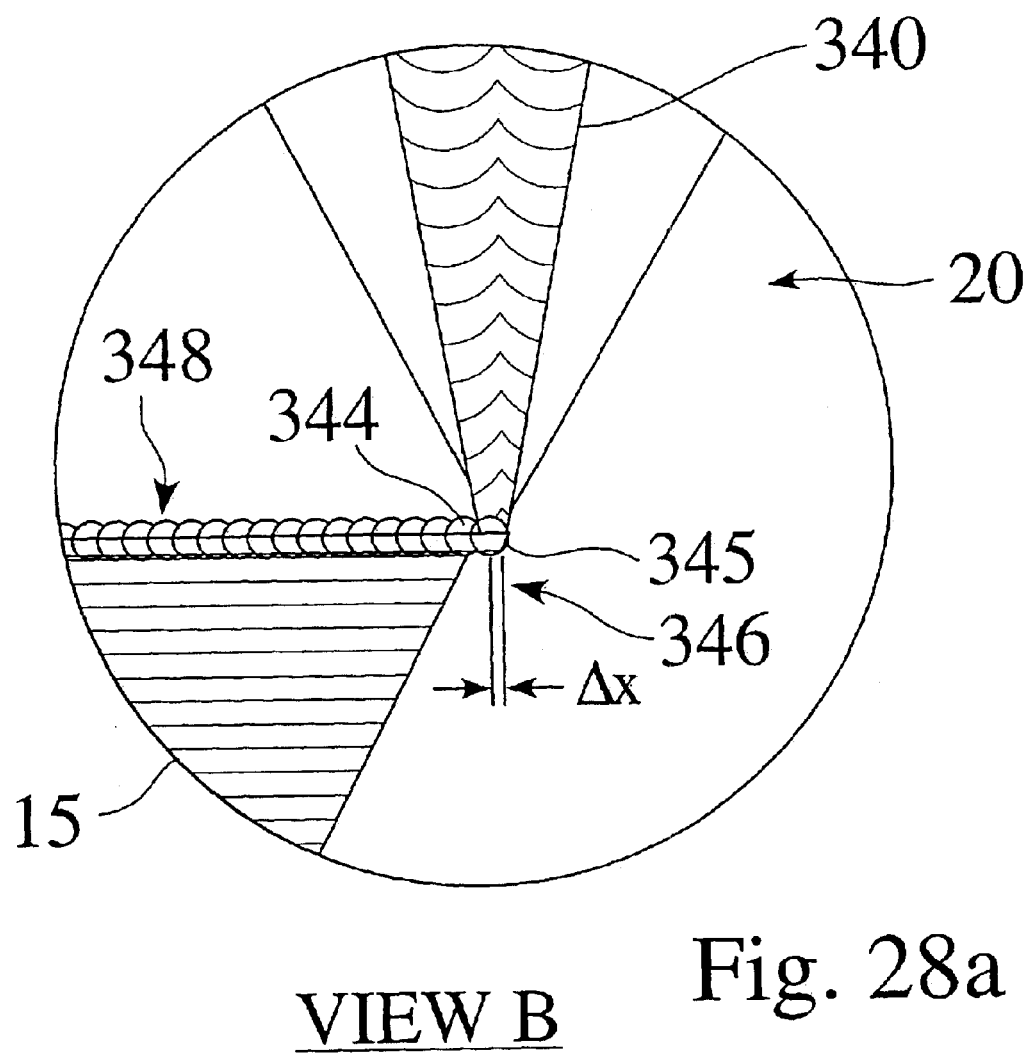
VIEW B  Fig. 28a

VIEW C

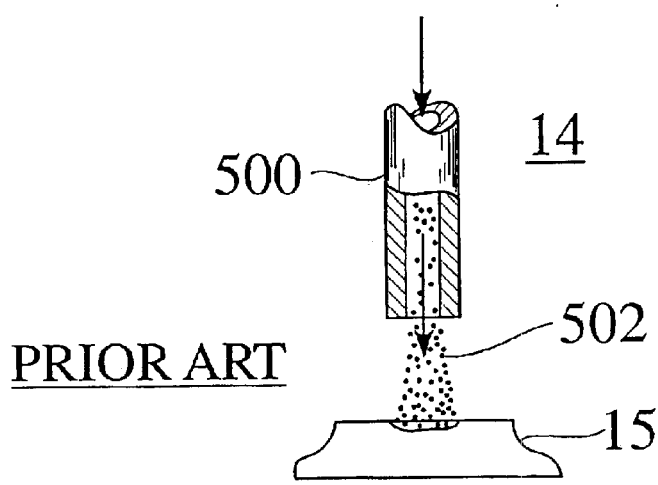
PRIOR ART
Fig. 41
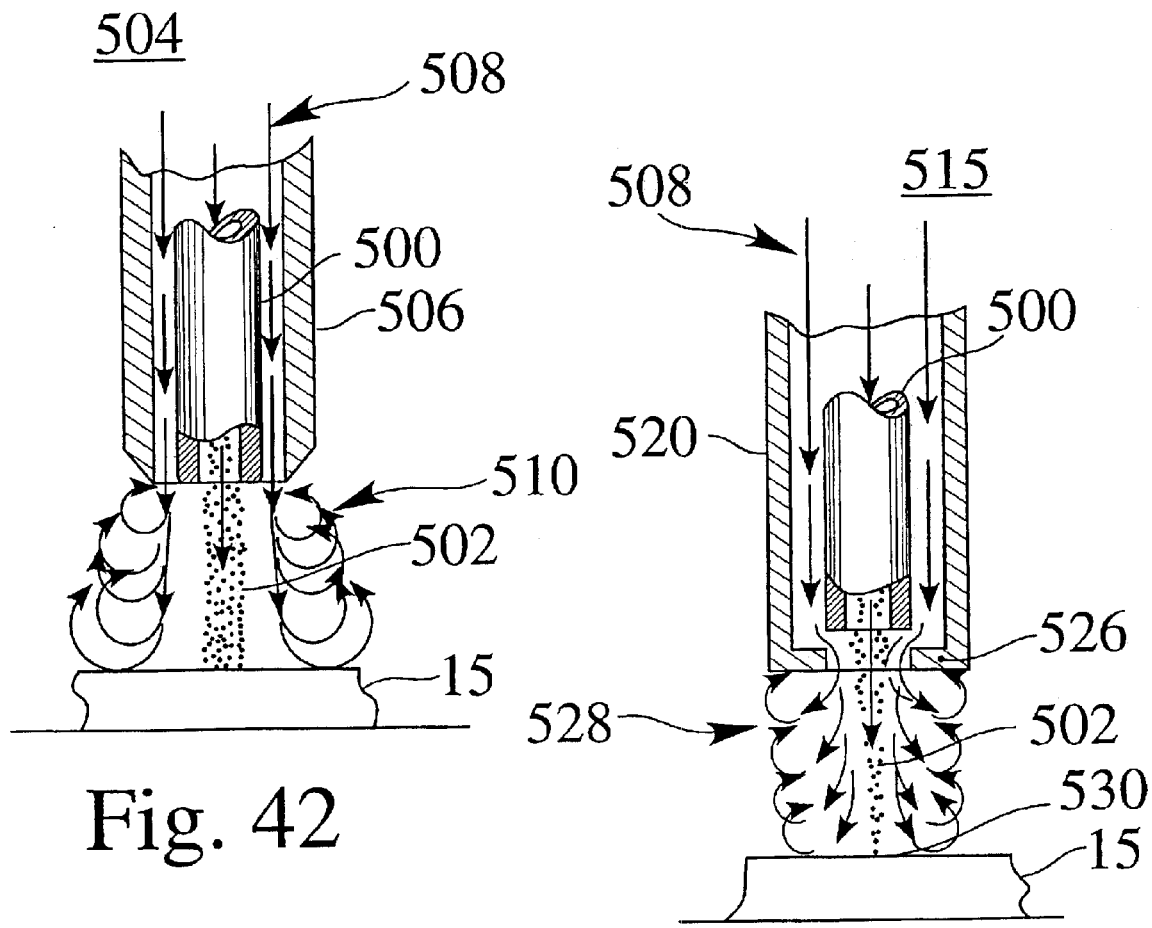
Fig. 42
Fig. 43

FORMING STRUCTURES FROM CAD SOLID MODELS

CROSS-REFERENCES TO RELATED PATENT APPLICATIONS & CLAIMS FOR PRIORITY

The present Patent Application is a Continuation-in-Part Application. The Applicants hereby claim the benefit of priority under Section 120 of the United States Code of Laws for any and all subject matter which is commonly disclosed in the present Application and in U.S. patent application Ser. No. 09/568,207 now U.S. Pat. No. 6,391,251, entitled Forming Structures from CAD Solid Models by David M. Keicher et al. which was filed on 9 May 2000, which claims priority of U.S. Provisional Patent Application Ser. No. 60/143,142, filed on 7 Jul. 1999, entitled Manufacturable Geometries for Thermal Management of Complex Three-Dimensional Shapes by David M. Keicher et al., and the specifications thereof are incorporated herein by reference.

INTRODUCTION

This title of the Invention is Forming Structures From CAD Solid Models. The Inventions are David M. Keicher, 5309 Hines N E, Albuquerque N. Mex. 87111; James W. Love, 1344 Rio Grand, Los Lunas, N. Mex. 87031; Kevin J. Dullea, 5226 Carlsbad Ct. NW, Albuquerque, N. Mex. 87120; James L. Bullen, P.O. Box 2136, Edgewood, N. Mex. 87015; Pierrette H. Gorman, 8 Trigo Road, Placitas, N. Mex. 87043; and Mark E. Smith, 30 Shady Oak Circle, Tijeras, N. Mex. 87059. All of the Inventors are citzens of the United States of America.

FEDERALLY SPONSORED RESEARCH OR DEVELOPMENT

None.

FIELD OF THE INVENTION

The present invention relates to the field of direct material deposition processes which allow complex structures to be fabricated efficiently in small lots to meet stringent requirements of a rapidly changing manufacturing environment. More particularly, the invention pertains to the fabrication of three-dimensional metal parts directly from a computer-aided design (CAD) electronic "solid" model. The invention also provides methods which use existing industry-standard computer file formats to create unique material structures including those having thermal characteristics embedded within them. The invention addresses methods to control direct material deposition processes to achieve a net-shaped or near net-shaped article, and to fabricate metal articles having exceptional material properties and dimensional repeatability.

BACKGROUND OF THE INVENTION

Manufacturing techniques or technologies generally known as "layered manufacturing" have emerged over the last decade. For metals, the usual shaping process forms a part by removing metal from a solid bar or ingot until the final shape is achieved. With the new technique, parts are made by building them up on a layer-by-layer basis. This is essentially the reverse of conventional machining. According to the paper appearing at the Internet site of Helsinki University of Technology, the first commercial process was presented in 1987. The process then was very inaccurate, and the choice of materials was limited. The parts were considered, therefore, prototypes and the process was called rapid prototyping technology (RPT). The prior art has advanced, however, to a point where it has been favorably compared too conventionally numerically controlled (NC) milling techniques. Considerable savings in time, and therefore cost, have been achieved over conventional machining methods. Moreover, there is a potential for making very complex parts of either solid, hollow or latticed construction.

Stereolithography technique (SLT), sometimes known as solid freeform fabrication (SFF), is one example of several techniques used to fabricate three-dimensional objects. This process is described in the Helsinki University of Technology paper. A support platform, capable of moving up and down is located at a distance below the surface of a liquid photo polymer. The distance is equal to the thickness of a first layer of a part to be fabricated. A laser is focused on the surface of the liquid and scanned over the surface following the contours of a slice taken through a model of the part. When exposed to the laser beam, the photo polymer solidifies or is cured. The platform is moved downwards the distance of another slice thickness and a subsequent layer is produced analogously. The steps are repeated until the layers, which bind to each other, form the desired object. A He—Cd laser may be used to cure the liquid polymer. The paper also describes a process of "selective laser sintering." Instead of a liquid polymer, powders of different materials are spread over a platform by a roller. A laser sinters selected areas causing the particles to melt and solidify. In sintering, there are two phase transitions, unlike the liquid polymer technique in which the material undergoes but one phase transition: from solid to liquid and again to solid. Materials used in this process included plastics, wax metals and coated ceramics. A number of Patents and other disclosures have preceded and followed these processes, including the following:

U.S. Pat. No. 4,323,756, issued on 6 Apr. 1982 to Clyde O. Brown, et al., entitled Method for Fabricating Articles by Sequential Layer Deposition, discloses a method for the production of bulk rapidly solidified metallic objects of near-net shape, by depositing multiple thin layers of feedstock using an energy beam to fuse each layer onto a substrate. The feedstock may be in the form of metal powder or wire. A net shaped or near-net shaped article is one which approximates all of the desired features of its contemplated design so that little or no finishing work is required.

In his U.S. Pat. No. 4,724,299, dated 9 Feb. 1988, Albert W. Hammeke describes a laser spray nozzle in which a beam passageway between the end portions permits a laser beam to pass through. A housing surrounds a second end portion and forms an annular passage, coaxial with the beam passageway. A cladding powder supply system is connected with the annular passage so that the powder exits the coaxial opening with the beam. The laser beam melts the powder which is deposited on a target substrate. The powder distribution system is contained within the nozzle assembly.

A laser spray nozzle assembly is a part of the Axial Flow Laser Plasma Spraying apparatus disclosed by Eric J. Whitney et al. in their August 1991 U.S. Pat. No. 5,043,548. The apparatus for depositing a feed material onto a substrate, has a plasma confinement chamber into which a laser beam is focused, the focal point being at a distance sufficiently far from the substrate that the substrate, is not melted. Finely divided feed material in a carrier gas flow is fed axially into the confinement chamber along the direction of the laser beam and melted into the plasma formed in the interaction of the laser beam, the feed material and the gas at the focal point. The feed material is then directed to deposit onto the substrate while the plasma energy is largely confined within the apparatus by the confinement chamber and constriction of the flow path upstream of the chamber.

A Rapid Prototyping System is disclosed by Joshua E. Rabinovich in U.S. Pat. No. 5,578,227, issued Nov. 26, 1996. The system involves a model making method and apparatus which projects a laser beam, circular polarizes the beam and directs the circular polarized beam for fusing a rectangular wire to a substrate or a previously fused wire on a target stage. The disclosure is differentiated by fusing the deposited feedstock to bond to a previously deposited layer without substantially altering the cross-section of the newly deposited material.

Such a deposition process would seem to have substantial problems of warping and distorting the deposited layers because of incomplete melting of feedstock material. Unlike Rabinovich's disclosed process, a powder deposition completely consumes the feedstock material in the three-dimensional net shape. The powder's cross-section and material properties are significantly altered. Rabinovitch does not disclose how the properties of the deposited material are controlled in his invention.

U.S. Pat. No. 5,697,046, dated 9 Dec. 1997 and entitled Composite Cermet Articles and Method of Making was issued to Edward V. Conley. It discloses methods for making and using and articles comprising ferromagnetic cermets, preferably carbides and more preferably tungsten carbide having at least two regions exhibiting at least one property that differs. The cermets are manufactured by juxtaposing and densifying at least two powder blends having different properties. The methods described are very specific to cermets and do not employ solid models and automated processes.

U.S. Pat. No. 5,705,117 dated 6 Jan. 1998 discloses a Method of Combining Metal and Ceramic Inserts Into Stereolithography Components. Kurt Francis O'Connor et al. describe a stereolithography process for developing a prototype part in which inserts of non-photo polymer material are included in the resulting part so as to develop a functioning prototype part. In order to allow the inserts to be placed within the developing prototype part, a series of STL files are defined for forming the part in individual sections. The method is very specific to metal-ceramic composite structures for PC boards. It is not a direct fabrication method for three-dimensional objects with graded or multiple material structures.

Direct fabrication of three-dimensional metal parts by irradiating a thin layer of metal powder mixture is described in U.S. Pat. No. 5,393,613, entitled Composition for Three-Dimensional Metal fabrication Using a Laser, and issued 28, Feb. 1995. Colin A. MacKay uses a temperature equalization and unification vehicle in the mixture which is melted by a laser, selectively applied to form a solid metal film. The vehicle protects the molten metal from oxidation. The metal powder can contain an elemental metal or several metals. The material has a lower melting temperature because of the vehicle, which is essentially a flux. The method does not create structures of gradient material.

U.S. Pat. No. 5,707,715, issued to L. Pierre deRochemont et al. on 13, Jan. 1998, presents a disclosure of metal-ceramic composite comprising a metal member bonded to a ceramic oxide member through a covalent bond formed at temperatures less than 880 degrees Centigrade. Metal-ceramic composites are also described that are so constructed to control internal stress or increase crack resistance within the ceramic member under applied thermal or mechanical loads. The disclosure does not reveal a direct fabrication method for three-dimensional objects with graded or multiple material structures.

U.S. Pat. No. 5,126,102, entitled Fabricating Method of Composite Material, was granted to Masashi Takahashi on 30 Jun. 1992, and describes a method of preparing a composite material, excellent in joint strength and heat conductivity. More specifically, it describes a method of preparing a composite material composed of high melting temperature tungsten (W) material and low melting temperature copper (Cu) material by forming pores in the tungsten to obtain a substrate with distributed porosity. The method forms a high-porosity surface in at least one region of the substrate, the porosity gradually decreasing outward from the region. A second step impregnates the tungsten material with the copper material in the porous surface forming a gradient material of tungsten and copper. The patent describes the advantages of gradient materials, however, it does not discuss the use of solid models to achieve the shape of the gradient article. Direct material deposition processes produce three-dimensional parts by sequential layer deposition of feedstock material in powder or wire form.

Robert A. Sterett et al., in their aptly named U.S. Pat. No. 5,746,844, issued on 5 May 1998, disclose a Method and Apparatus for Creating a Free-Form Three-Dimensional Article Using A Layer-By-Layer Deposition of Molten Metal and Using Stress-Reducing Annealing Process On the Deposited Metal. A supply of substantially uniform droplets of desired material having a positive or negative charge, is focused into a narrow stream through an alignment means which repels each droplet toward an axis through the alignment means. The droplets are deposited in a predetermined pattern at a predetermined rate onto a target to form the three-dimensional article without use of a mold of the shape of the article. The disclosure reveals means for reducing stress by annealing portions of the deposited droplets which newly form a surface of the 3-D article. Melting of the metal is not done by laser and molten metal. Metal powder is carried from a liquid supply to the target surface. The invention produces "fully dense" article of one metal or an alloy material having uniform density, no voids and no porosity. The method allows creation of part overhangs without using supports, by relying on the surface tension properties of the deposition metal.

U.S. Pat. No. 5,837,960 to Gary K. Lewis, of Los Alamos National Laboratory, et al. was filed on 30 Nov. 1995 and issued on 17 Nov. 1998. Its title is Laser Production of Articles from Powders. A method and apparatus are disclosed for forming articles from materials in particulate form in which the materials are melted by a laser beam and deposited at points along a tool path to form an article of desired shape and dimensions. Preferably, the tool path and other parameters of the deposition process are established using computer-aided design (CAD) and computer-aided manufacturing (CAM) techniques. A controller consisting of a digital computer directs movement of a deposition zone along the tool path and provides control signals to adjust the apparatus functions, such as the speed at which a deposition head which delivers the laser beam and powder to the deposition zone moves along the tool path. The article is designed using a commercially available CAD program to create a design file. A "cutter location file" (CL) is created from the design file and an adapted, commercially available CAM program. User-defined functions are established for creating object features in the adapted CAM program. The functions are created by passing an "electronic plane"

through the object feature. A planar figure created in the first plane at the intersection with the feature is a first portion of the tool path. A second plane is passed through the feature parallel to the first plane. The second plane defines a second tool path. The end of the tool path in the first plane is joined to the beginning of the tool path in the second plane by a movement command. The process is continued until the tool path required to make the feature is complete.

Lewis et al. describe certain methods of preheating an article support (substrate) to overcome the fact that without it, an article support will be cold when the deposition is started in comparison to the material on which deposition is later done in the fabrication process. Computer modeling of heat flow into, through and out of an article and the data generated from such modeling imported into the CAM program is suggested. The fabrication of articles of two different materials is addressed by forming a joint between dissimilar metals by changing powder compositions as the joint is fabricated. As an example, one could introduce a third material as an interlayer between mild steel and 304 stainless steel. The interlayer material might be a Ni—Cr—Mo alloy such as Hastelloy S.

U.S. Pat. No. 5,993.554 to David M. Keicher et al., dated 30 Nov. 1999 and entitled Multiple Beams and Nozzles to Increase Deposition Rate, describes an apparatus and method to exploit desirable material and process characteristics provided by a lower power laser material deposition system. The invention overcomes the lower material deposition rate imposed by the same process. An application of the invention is direct fabrication of functional, solid objects from a CAD solid model. A software interpreter electronically slices the CAD model into thin horizontal layers that are subsequently used to drive the deposition apparatus. A single laser beam outlines the features of the solid object and a series of equally spaced laser beams quickly fill the featureless regions. Using a lower power laser provides the ability to create a part that is very accurate, with material properties that meet or exceed that of a conventionally processed and annealed specimen of similar composition. At the same time, using multiple laser beams to fill in featureless areas allows the fabrication process time to be significantly reduced.

In an article entitled *The Direct Metal Deposition of H13 Tool Steel for 3-D Components* by J. Mazurnder et al., the authors state that the rapid prototyping process has reached the stage of rapid manufacturing via direct metal deposition (DMD) technique. Further, the DMD process is capable of producing three-dimensional components from many of the commercial alloys of choice. H13 is a material of choice for the tool and die industry. The paper reviews the state of the art of DMD and describes the microstructure and mechanical properties of H13 alloy deposited by DMD.

The problem of providing a method and apparatus for optimum control of fabrication of articles having a fully dense, complex shape, made from gradient or compound materials from a CAD solid model, is a major challenge to the manufacturing industry. Creating complex objects with desirable material properties, cheaply, accurately and rapidly has been a continuing problem for designers. Producing such objects in high-strength stainless steel and nickel-based super alloys, tool steels, copper and titanium has been even more difficult and costly. Having the ability to use qualified materials with significantly increased strength and ductility will provide manufacturers with exciting opportunities. Solving these problems would constitute a major technological advance and would satisfy a long felt need in commercial manufacturing.

SUMMARY OF THE INVENTION

The present invention pertains generally to a class of material deposition processes that use a laser to heat and, subsequently, fuse powder materials into solid layers. Since these layers can be deposited in sequential fashion to ultimately form a solid object, the ability to alter the material properties in a very localized fashion has far reaching implications.

The present invention comprises apparatus and method for fabrication of metallic hardware with exceptional material properties and good dimensional repeatability. The invention provides a method for controlling material composition, and thus material characteristics, within a structure made from a plurality of materials, directly from computer rendering of solid models of the desired component. Both industry-accepted stereolithography (STL) file format as well as solid model file format are usable.

One embodiment of the invention is used to form embedded features in a three-dimensional structure. A plurality of separate material feedstock are fed into a directed material deposition (DMD) process which places a line of molten material onto a substrate. The depositions are repeated in a layer-by-layer pattern, defined by solid models which describe the structure, to create an article having complex geometric details. The bulk properties of the deposition are controlled by adjusting the ratio of laser irradiance to laser velocity along the line of deposition.

In addition to external contours, the solid-model computer files describe regions of each separate material, regions of a composite of the materials and regions of voids in each layer or "slice." The depositions are repeated in each of the "slices" of the solid models to create the geometric details within the three-dimensional structure.

Heating the substrate and the deposition produces parts with accurate dimensions by eliminating warping of the substrate and deposition. A prescribed temperature profile is used for processing tempered material. A temperature profile for heat treating may be used to enhance the mechanical properties of the part by ensuring the correct material microstructure during processing.

Although the prior use of DMD processes has produced solid structures, the use of this technology to embed features for thermal management of solid structures is novel. Embedding voids and/or composite material regions, enables thermal management engineering techniques for solid structures that are not available through conventional processing techniques. In one embodiment of the present invention, a method is provided to construct a solid structure with integral means to control its thermal properties.

Active thermal control is provided by forming passages and chambers for a coolant medium. The cross-section area and length of individual embedded structures are made approximately equal to provide uniform flow characteristics and pressure in the three-dimensional structure. Passive thermal control is provided by embedding materials having diverse thermal indexes.

Another embodiment of the present invention provides methods to locally control the thermal history of a three dimensional structure. Thermal history is the temperature variation in the part as a function of time. A part made with high thermal conductivity material in one region and a low thermal conductivity material in another region, will have a different thermal variation with time in each region.

In a further embodiment of the present invention, high-efficiency heat transfer is obtained within a three dimensional structure by incorporating regions of other materials within the article. For example, in parts having varying cross-sections, heating and cooling in selected regions is controlled to prevent thermal stresses.

In yet another embodiment of the present invention, three dimensional components are formed in which thermal characteristics such as heating and cooling rates are engineered into the component.

Embedding multi-material structures within a normally solid component, produces articles with diverse mechanical properties. Articles having complex internal and external contours such as heat exchangers and turbine blades are easily produced with the methods and apparatus disclosed.

To enhance the deposition process for manufacture of three-dimensional, multi-material structures with interior cavities either hollow or filled with diverse material, new apparatus, methods of deposition and material delivery are disclosed. These include:

1. Engineering properties such as tensile strength, toughness, ductility, etc. into the material layers by reference to a laser-exposure factor (E) which includes variables of laser power (p), relative velocity of the deposition (v) and material constants (a).
2. A fast-acting diverter valve for regulating feedstock flow allows precision depositions of gradient materials. The diverter valve controls the flow of a stream of a carrier gas and powder material to the deposition head. The valve comprises one diverter for a stream of gas only and another for a stream of gas and powder. The diverters are proportionately controlled so that the total volumetric flow rate of the powder and gas is constant, but the mass flow rate of powder to the deposition head can be quickly varied from no powder to the maximum available. Waste gas with powder is re-circulated and waste gas is reclaimed.
3. A self-contained, volumetric, low-friction powder feed unit which allows a user to use extremely low flow rates with a variety of powder materials; the powder feeder design is a marked improvement over current disk-style powder feeders in which the disk typically is buried in powder. In the present invention, powder flow from a reservoir to a transfer chamber is limited by the angle of repose of the powder feedstock, preventing the disk from being overwhelmed and clogged with powder. The present invention is insensitive to variations in flow rate of the gas which transports the powder to the deposition head. The spacing between the feed disk and the wipers which remove powder from the disk can be greater than in prior art designs without losing control of powder metering. This promotes much less wear on the wipers and substantially improves the life of the powder feed unit.
4. A multi-axis deposition head, including the powder delivery system and optical fiber, laser beam delivery system, moveable about a plurality of translational and rotational axes; the relative directions of the powder stream in the deposition process (123) being coordinated with a control computer (129) in a plurality of coordinate axes (x, y, z, u, v).
5. "Smart" substrates which are useful for construction of articles with internal spaces, unreachable from the surface, but serve as a starting point for conventional shaping methods.
6. Protection for the fiber optic which delivers a laser beam to the work piece to prevent catastrophic failure of the fiber because of beam reflections from the deposition surface, using a folding mirror, offset from 45 degrees by a small angle, to image a reflected laser beam at a distance from the fiber optic face, and water cooling of the fiber optic face.
7. A laser beam shutter with a liquid-cooled beam "dump" to aid testing and adjustment of the fiber optic, laser beam delivery system.
8. Using the surface tension property of melted materials to creating structures having unsupported overhanging edges.
9. Using a rotated plane of deposition or rotating a multi-axis deposition head to build unsupported overhanging edges.
10. Particle beam focusing to reduce material waste.

An appreciation of other aims and objectives of the present invention may be achieved by studying the following description of preferred and alternate embodiments, and by referring to the accompanying drawings.

A BRIEF DESCRIPTION OF THE DRAWINGS

Figure 6:
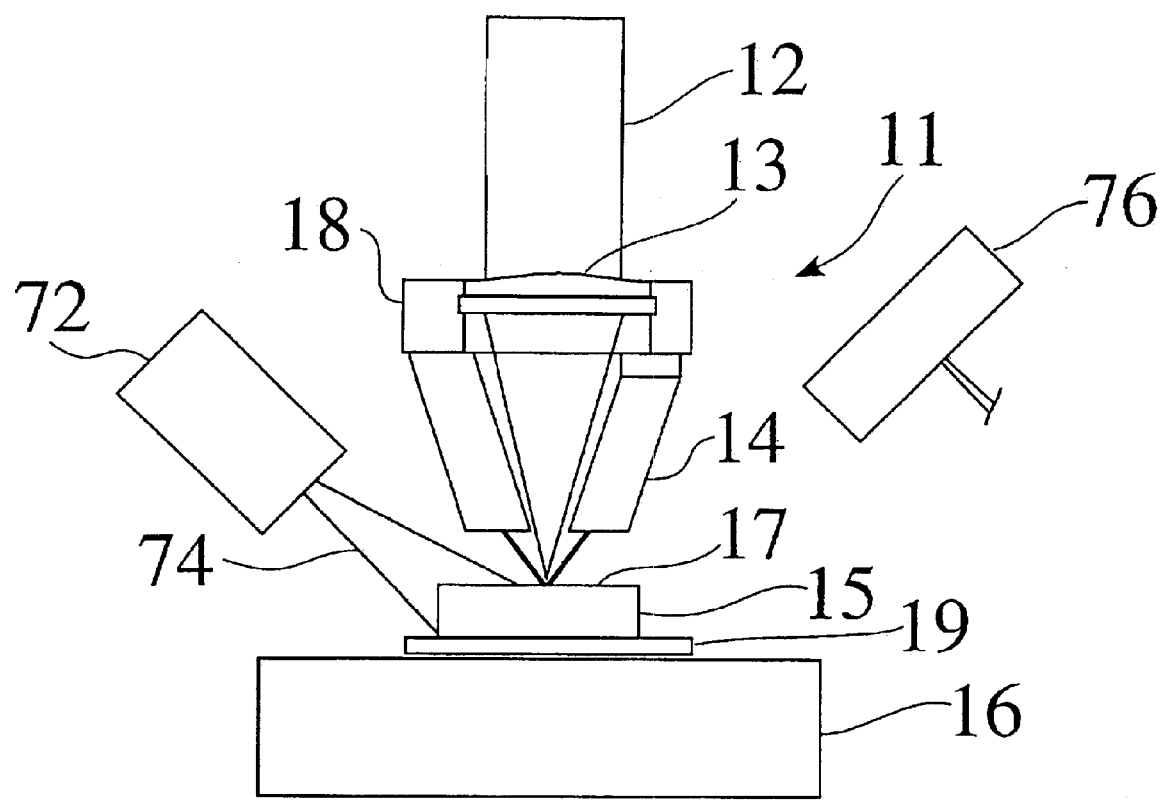

FIG. 6 schematically depicts in side-view, a metal deposition apparatus according to the present invention in which heat is applied to a substrate by a radiant source, the heating being measured over time by a monitoring source.

Figure 7:
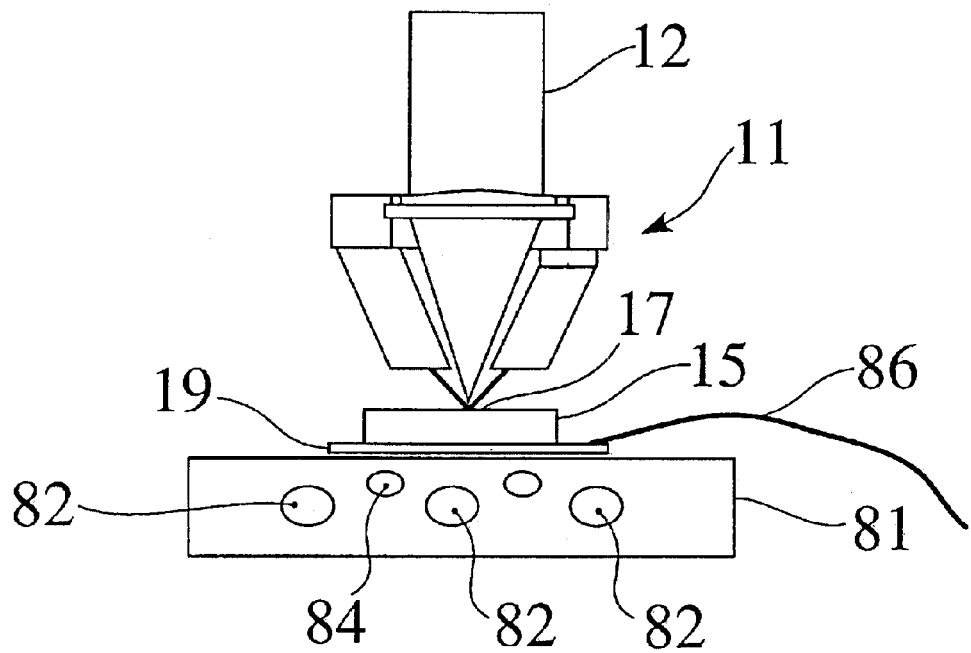

FIG. 7 is a side view of the metal deposition apparatus depicting substrate heating by a platen having internal heating elements, temperature monitoring being accomplished by sensors in the platen and on the substrate.

Figure 8:
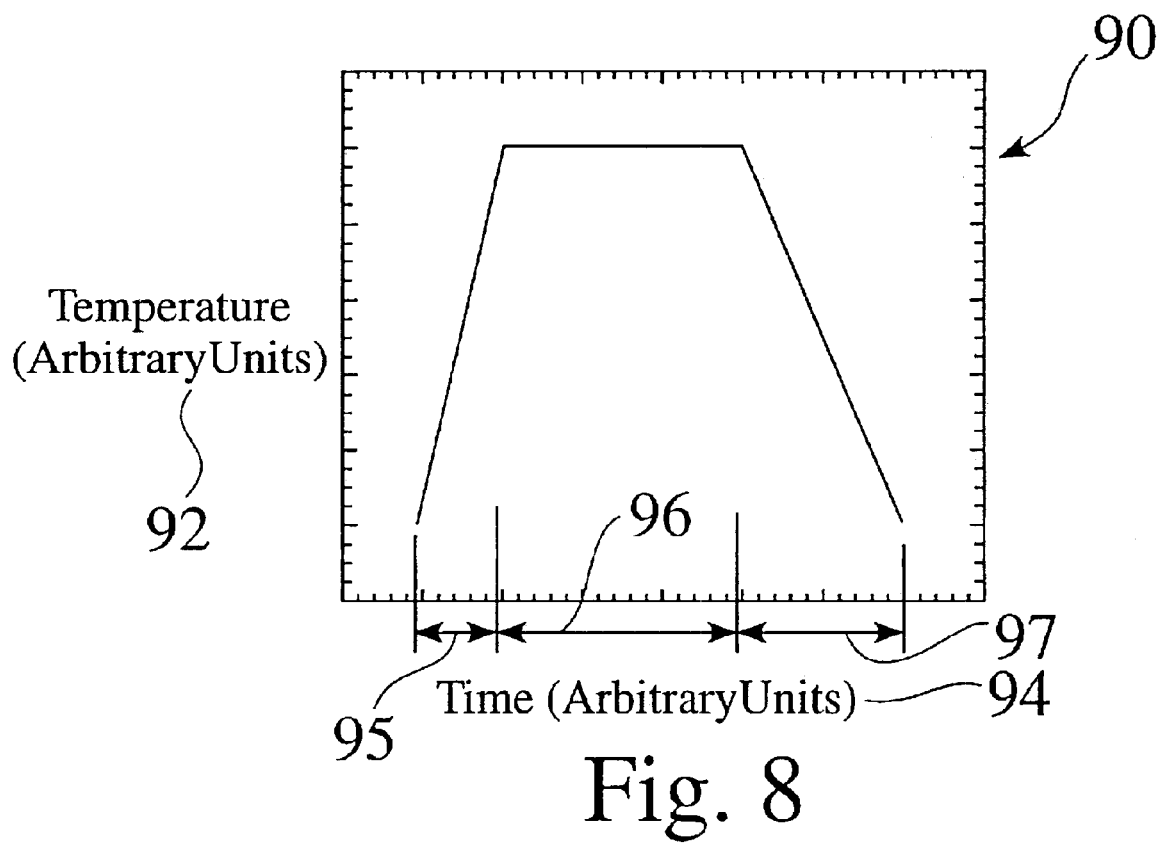

FIG. 8 presents a graph of one profile of heating a substrate during deposition. Controlling the temperature to a profile insures the correct material microstructure during processing.

Figure 9:
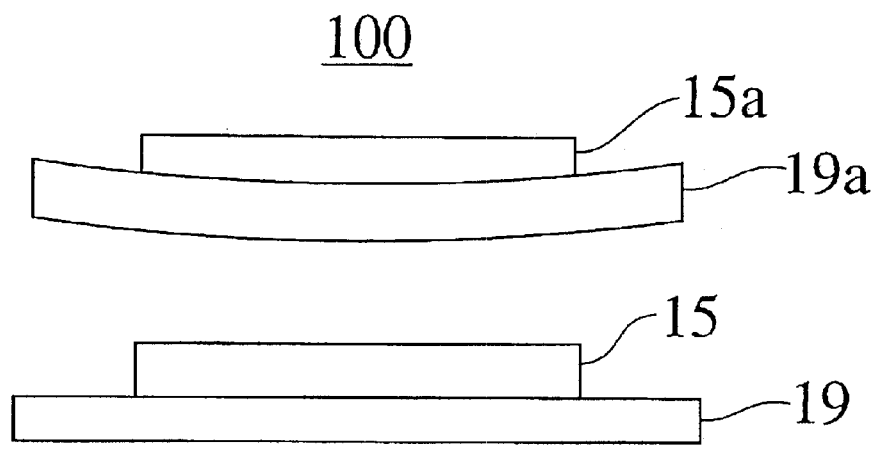

FIG. 9 is a side-elevation view comparing two substrates, showing warping in the upper one which was not heated during deposition processing and no warping of the lower one which was heated during deposition processing.

Figure 10:
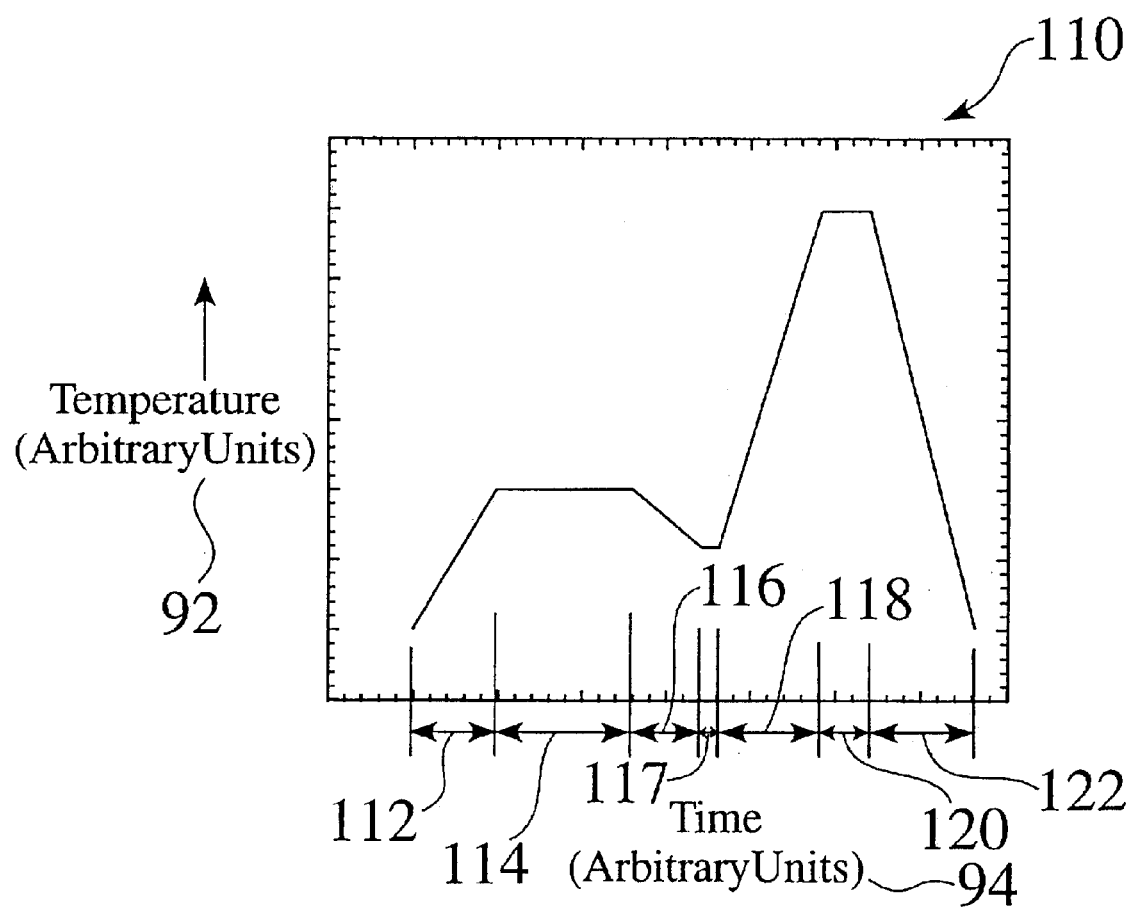

FIG. 10 shows yet another profile of thermal heating applied to a part during fabrication by directed material deposition, the added steps being applied to further improve the properties of the deposited material.

Figure 11:
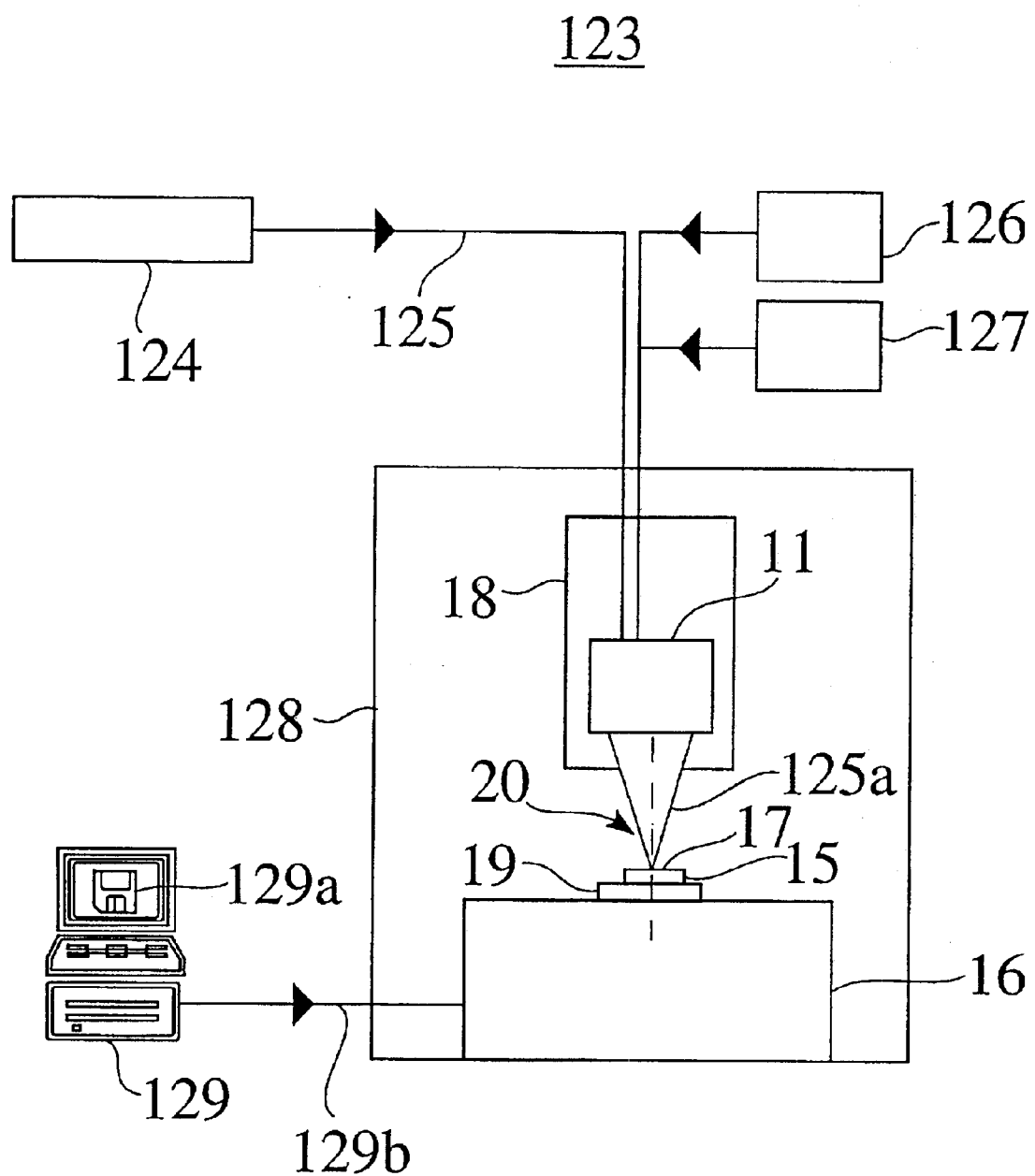

FIG. 11 is a schematic view showing the components of a directed material deposition system for fabricating objects from two different metal powders, according to the present invention.

Figure 12:
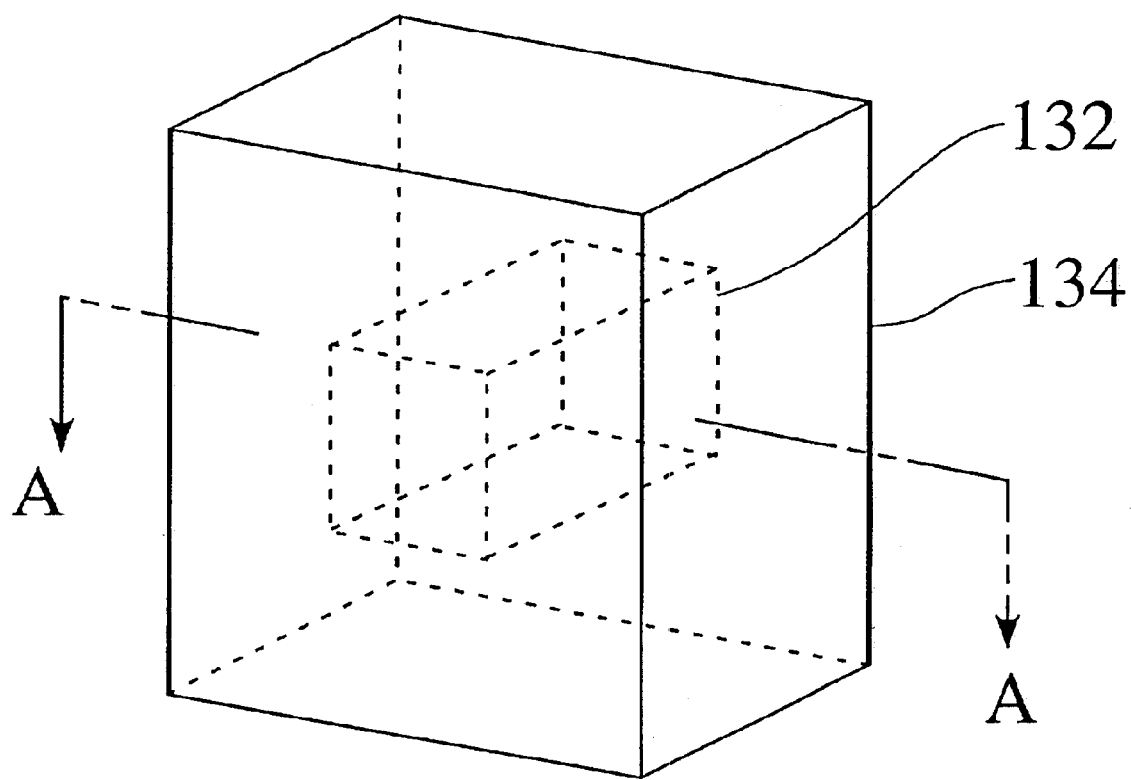

FIG. 12 is a perspective sketch illustrating the concept of capturing a solid model made of one material within a solid model made of a different material by means of the present invention.

Figure 13:
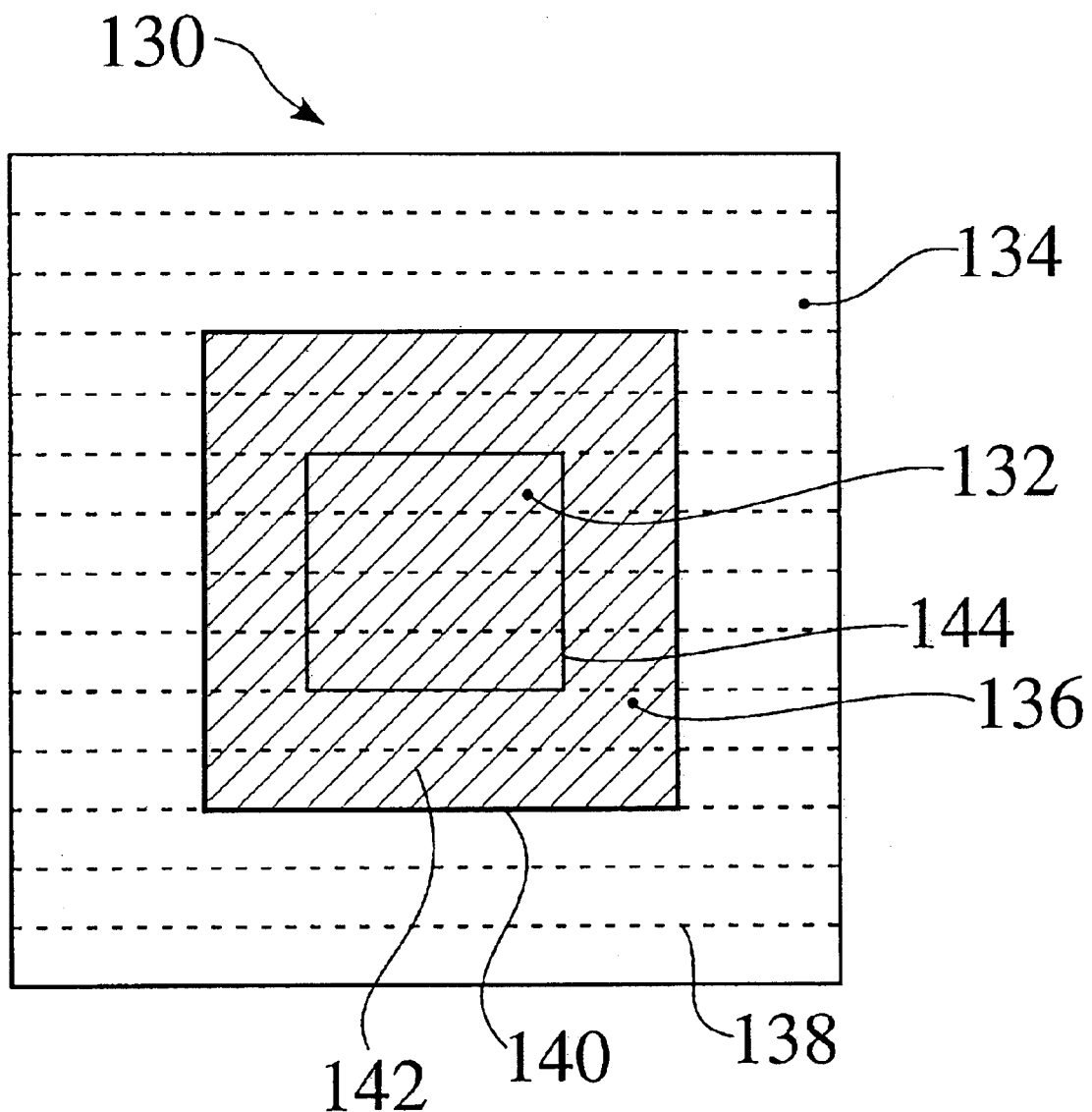

FIG. 13 is a plan view representing a plane section A—A taken through the solid models of FIG. 12, revealing the outer solid model of one material, the inner solid model of a second material and the region composed of both materials, graded from the first material to the second material. Composite cross-hatching illustrates the intersecting solid models and the region composed of two or more materials.

Figure 14:
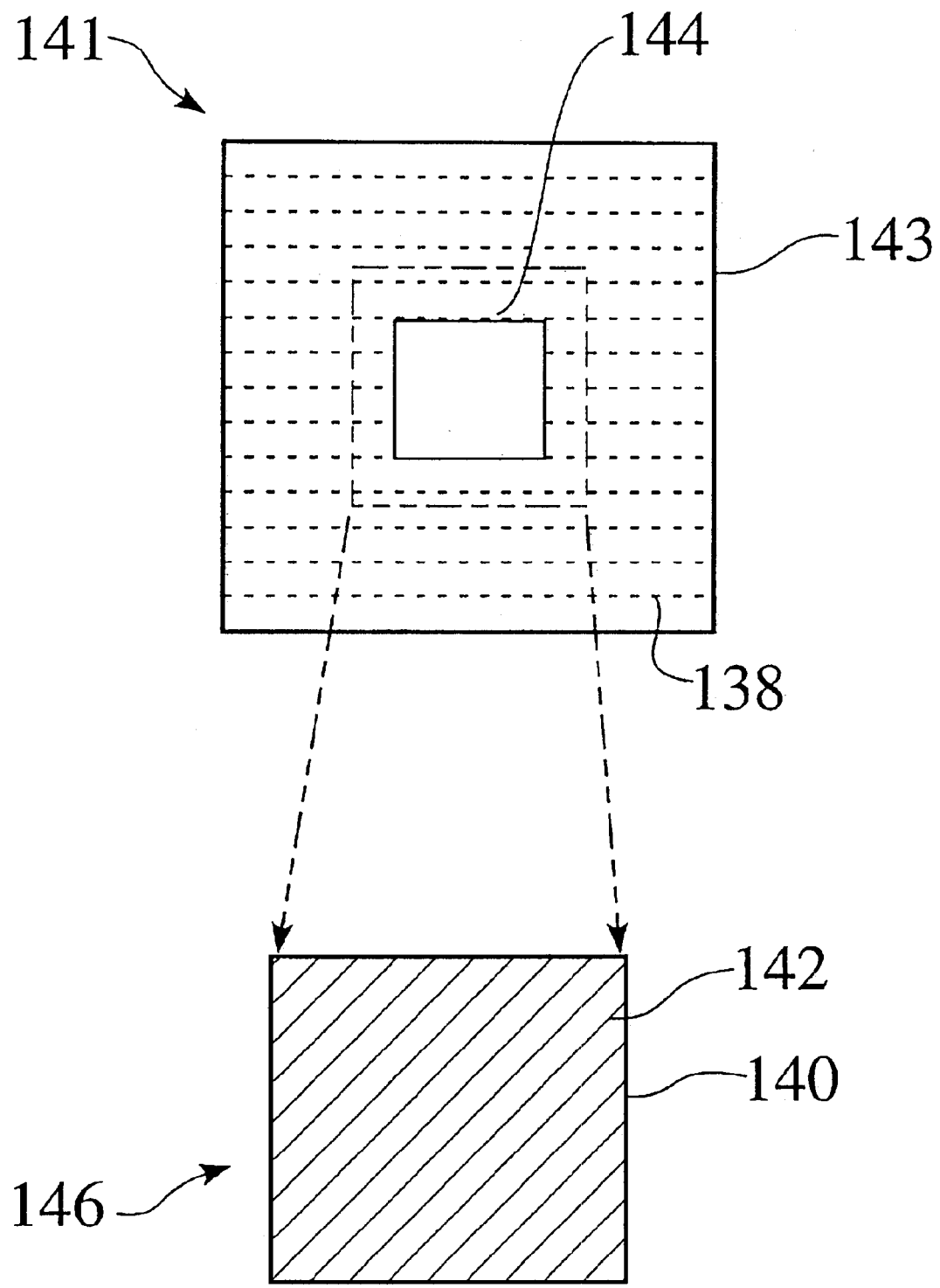

FIG. 14 is a plan view of a thin slice of the solid models at section A—A wherein a solid model representing a region of a first material is combined with a solid model representing a region of a second material to create a central core of one material, an outer region of the first material and an intermediate region of graded, composite material. To aid visualization of the process which combines two solid models, the solid model representing the region containing the first material is exploded from the solid model of the region containing the second material.

Figure 14A:
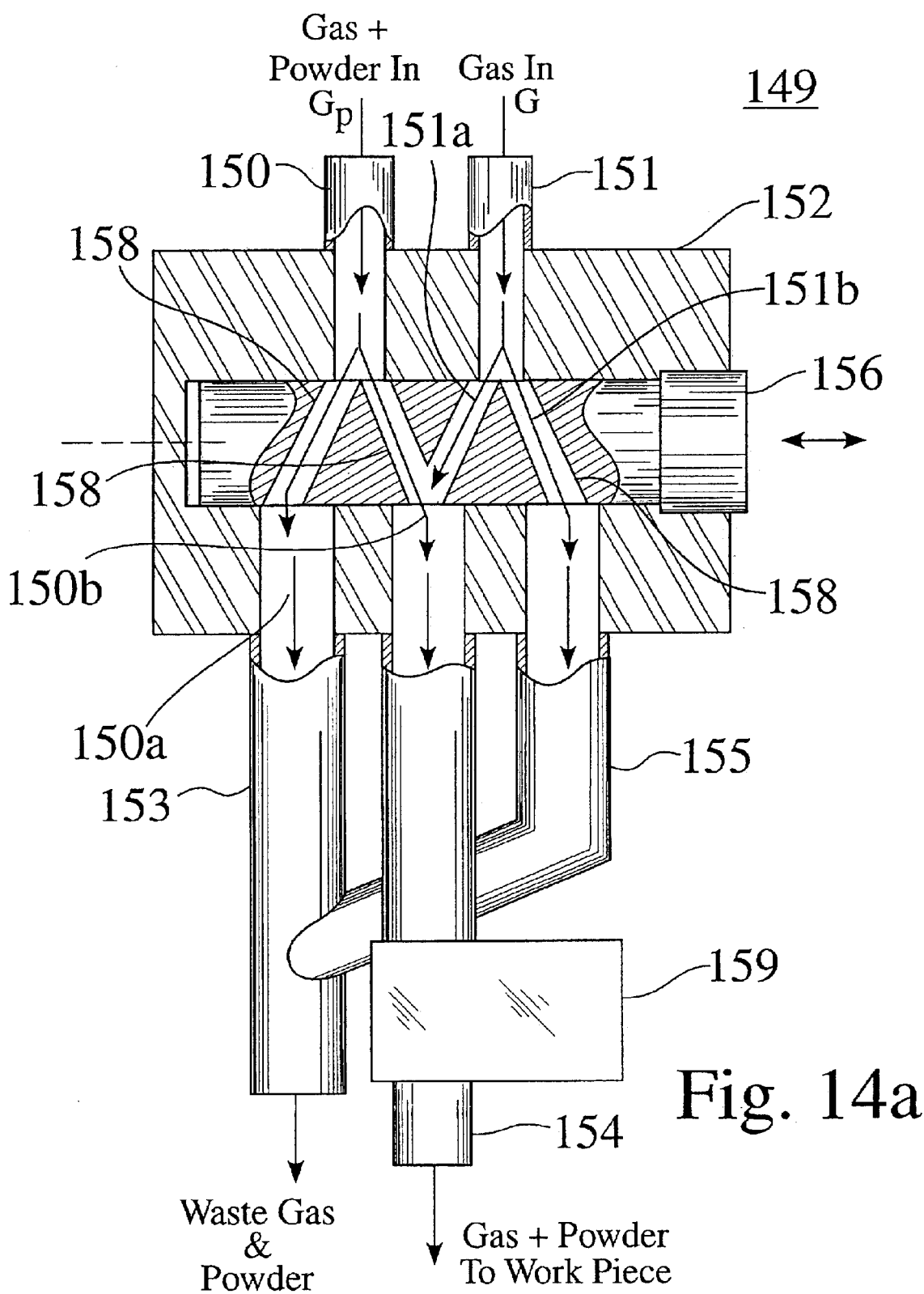

FIG. 14a is a cutaway view of a fast-acting diverter valve used to regulate powder flow to the work area.

Figure 14B:
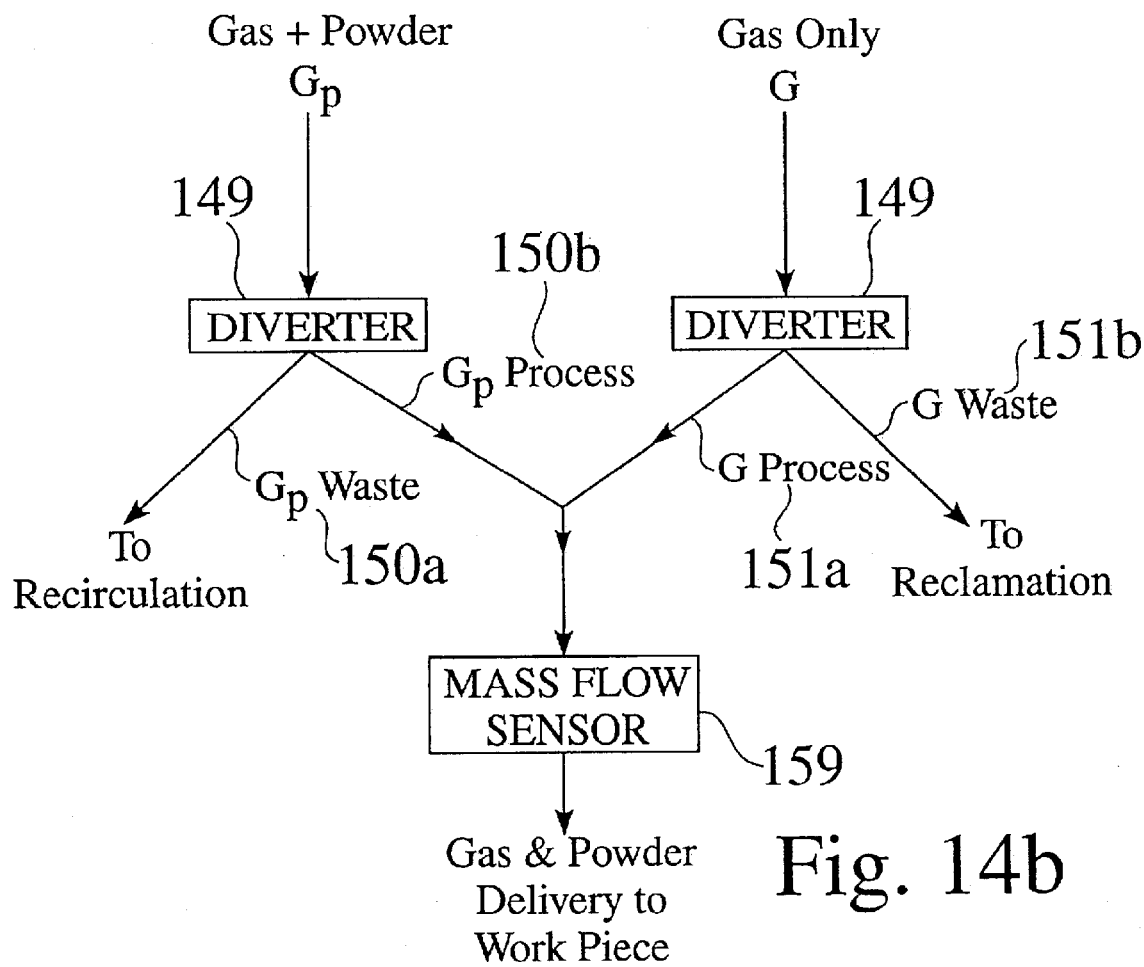

FIG. 14b is a schematic diagram of the operation of the diverter valve of FIG. 14a, illustrating how the volumetric flow of powder in a gas carrier is maintained constant.

Figure 15:
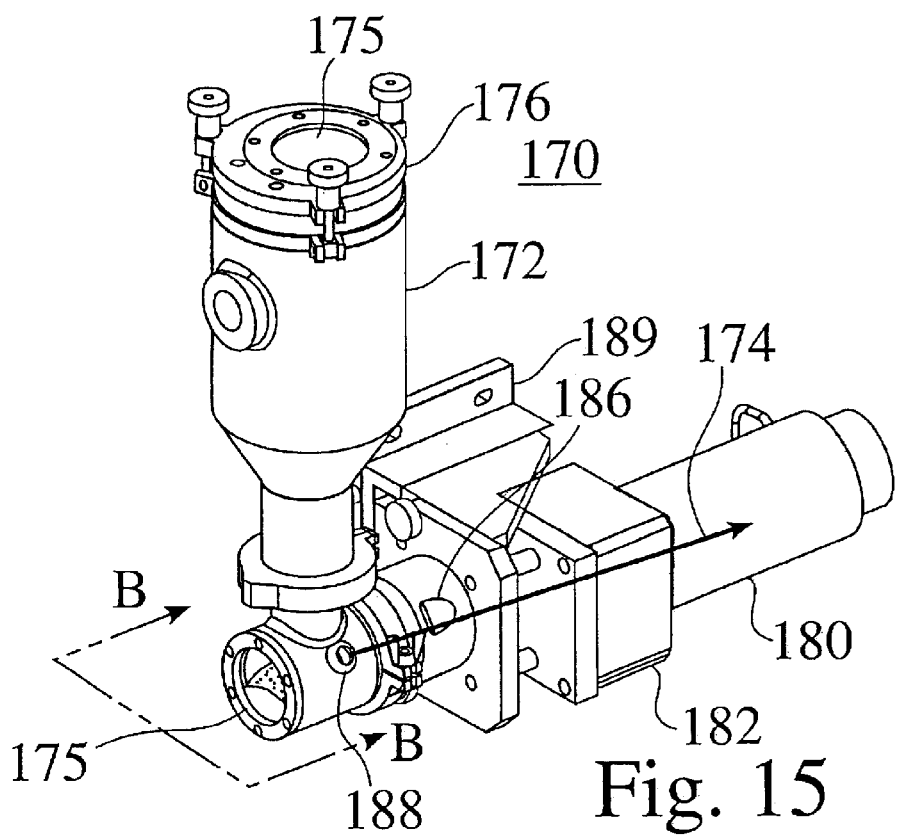

FIG. 15 is a perspective view of a low-rate powder feed unit.

Figure 16:
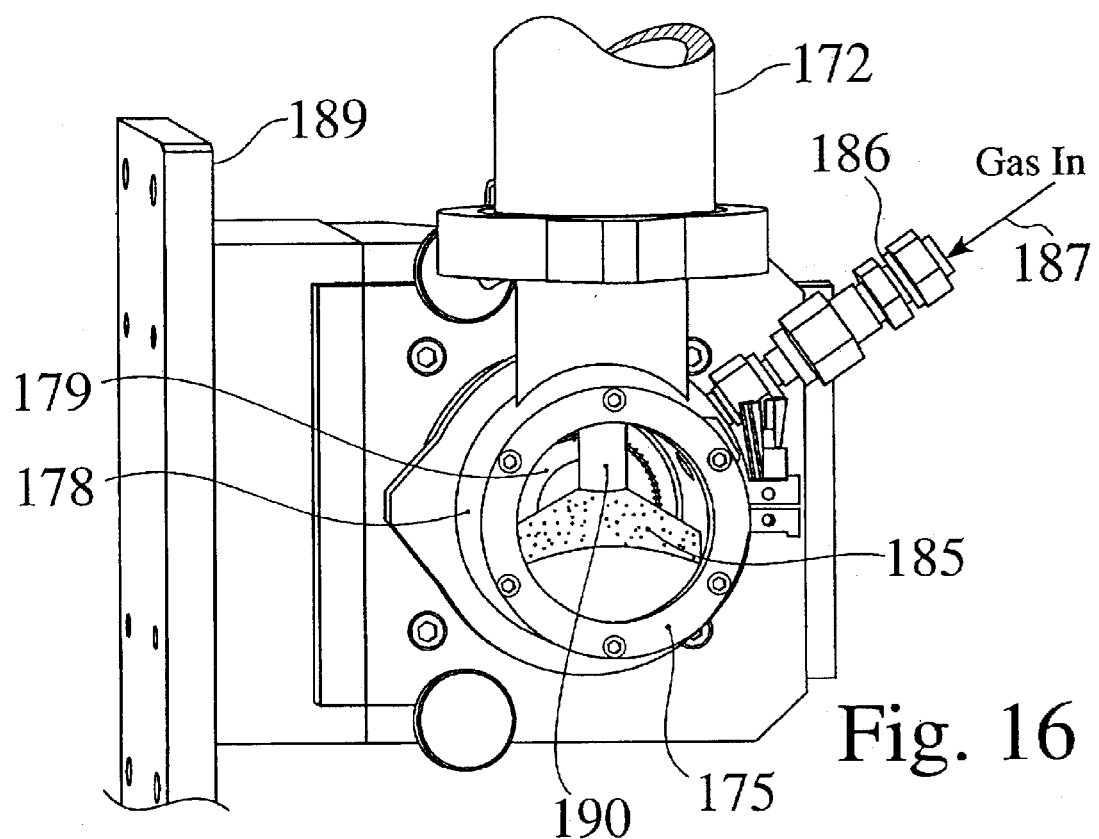

FIG. 16 is a perspective view of the low-friction, volumetric powder feed unit seen along view B—B of FIG. 15.

Figure 16A:
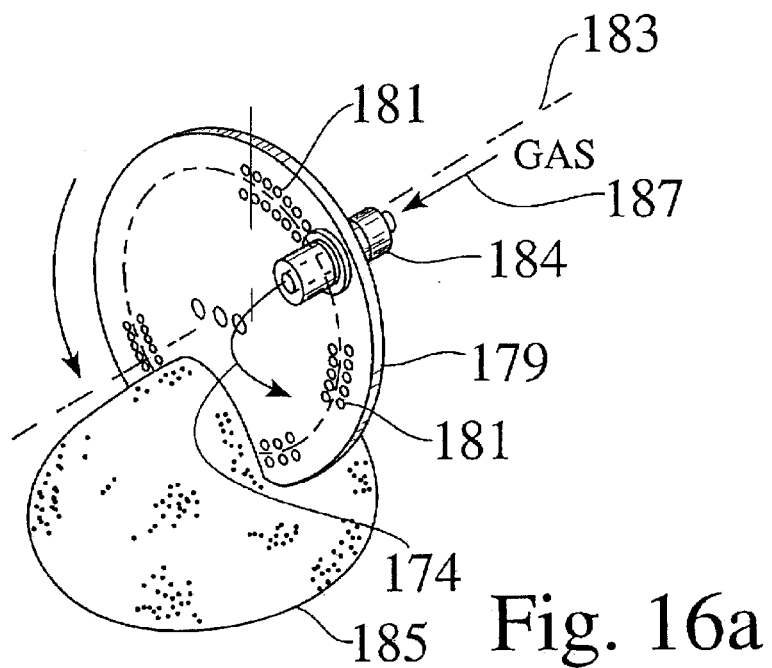

FIG. 16a is a perspective view of the powder feed disk and wiper assembly, alone, revealing the feed holes, disposed circumferentially in the disk, which pick up powder from the supply pile.

Figure 16B:
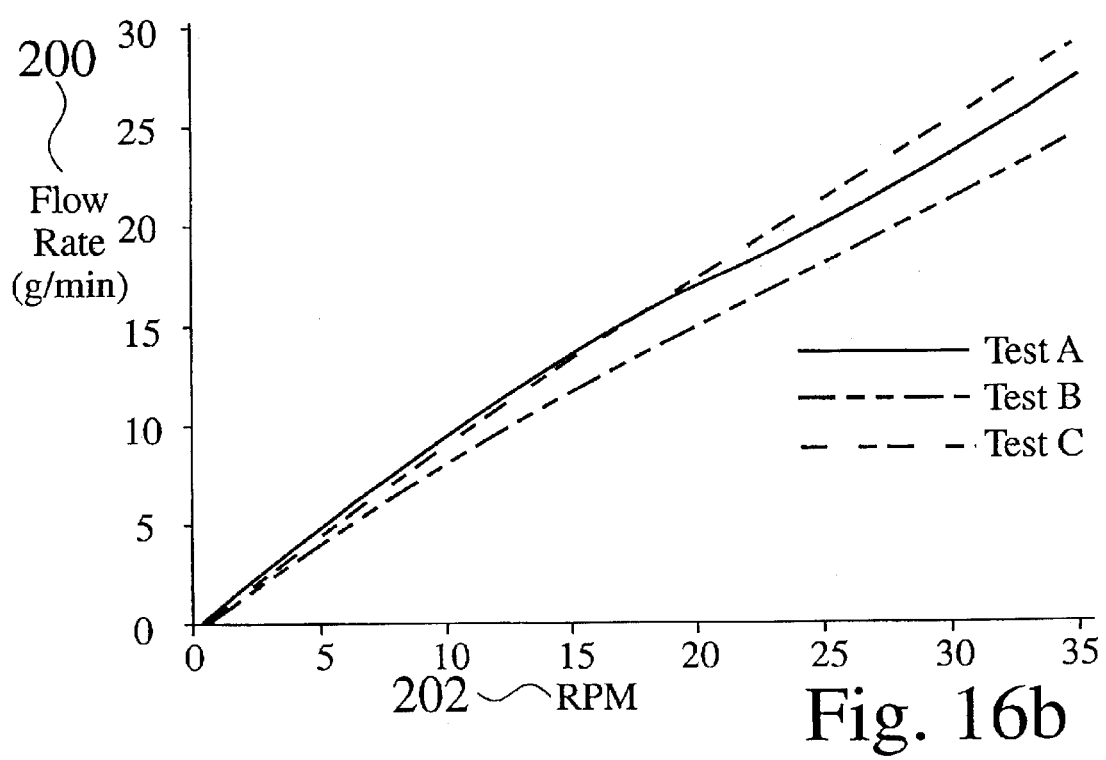

FIG. 16b is a graph of average flow rate for 316 stainless steel powder versus feed disk RPM for three test conditions, showing the nearly linear performance of the powder feeder.

Figure 16C:
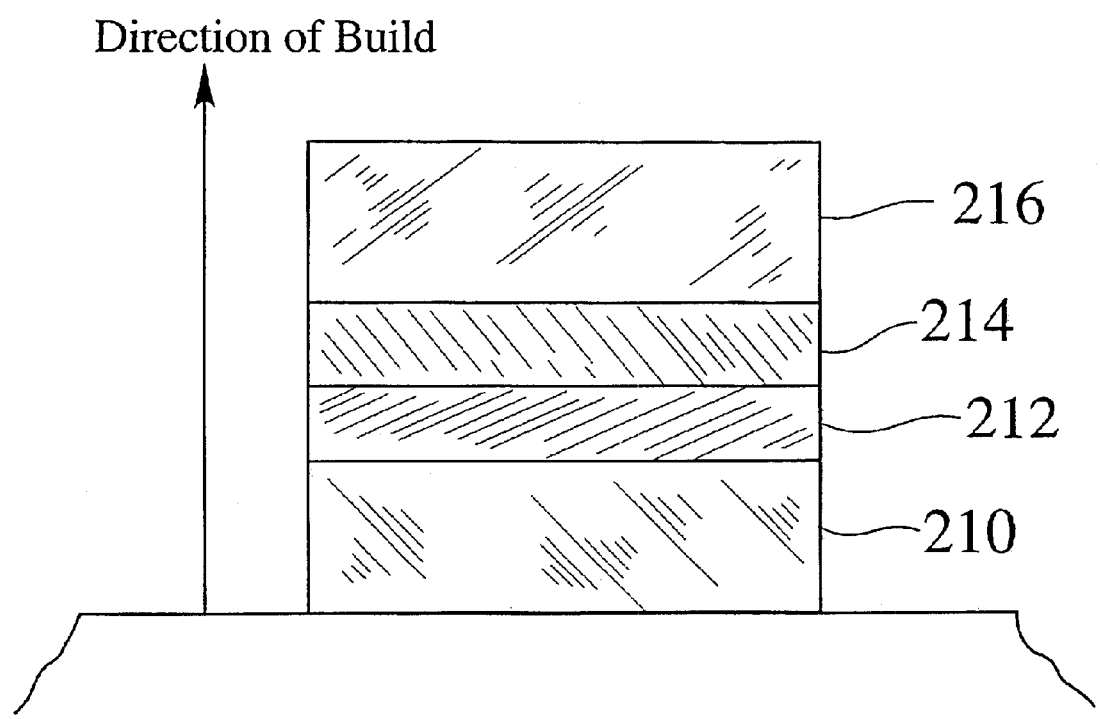

FIG. 16c shows an elevation view of a directed material deposition, revealing "buttering" layers of a first and second transitional material, deposited between two dissimilar metals to provide metallurgical compatibility between them.

Figure 17:
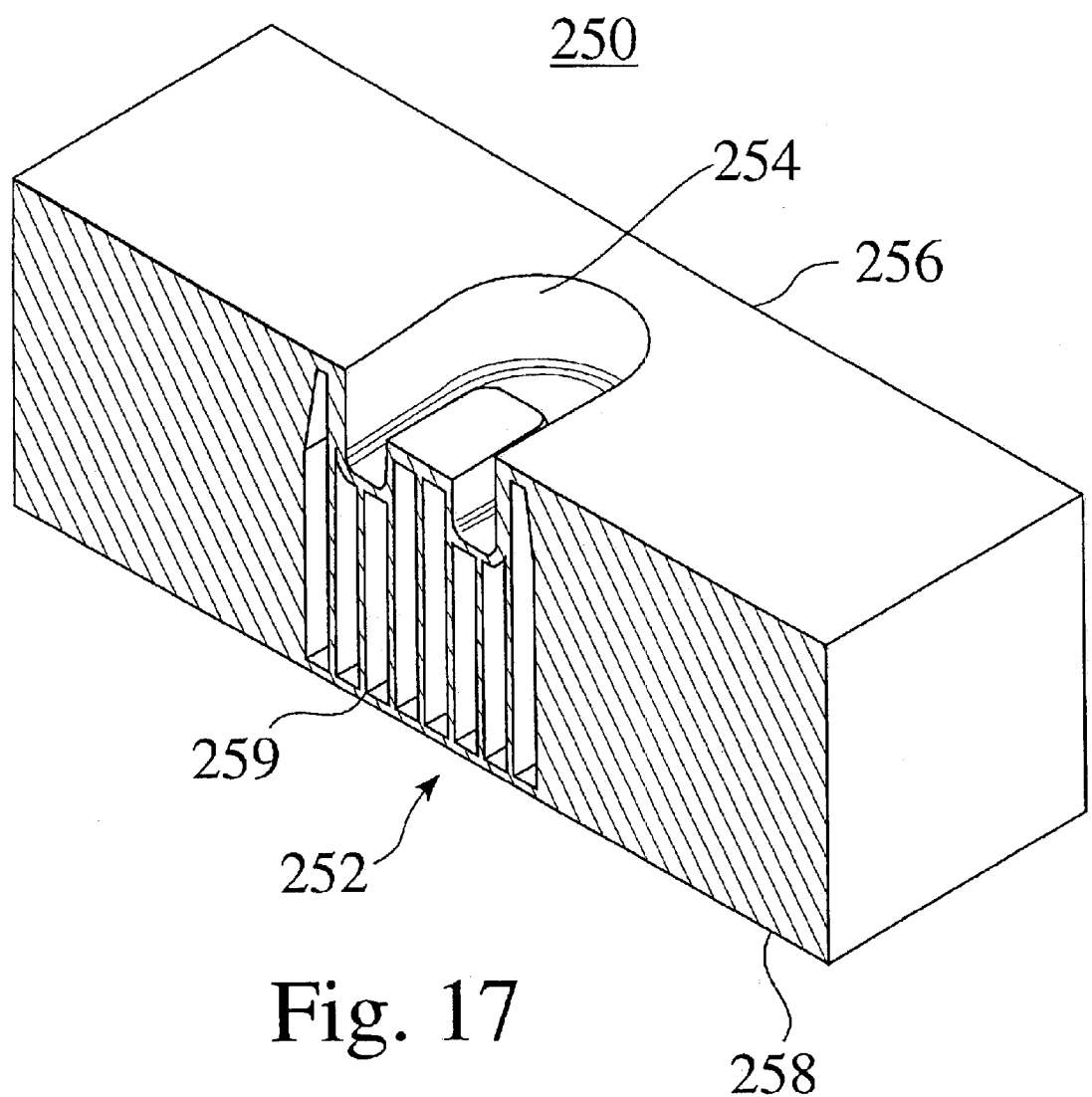

FIG. 17 is a perspective view of a cross-sectioned mold insert with a mold cavity, showing the detail of the conformal cooling passages integrated into the mold during manufacture using DMD methods.

Figure 18:
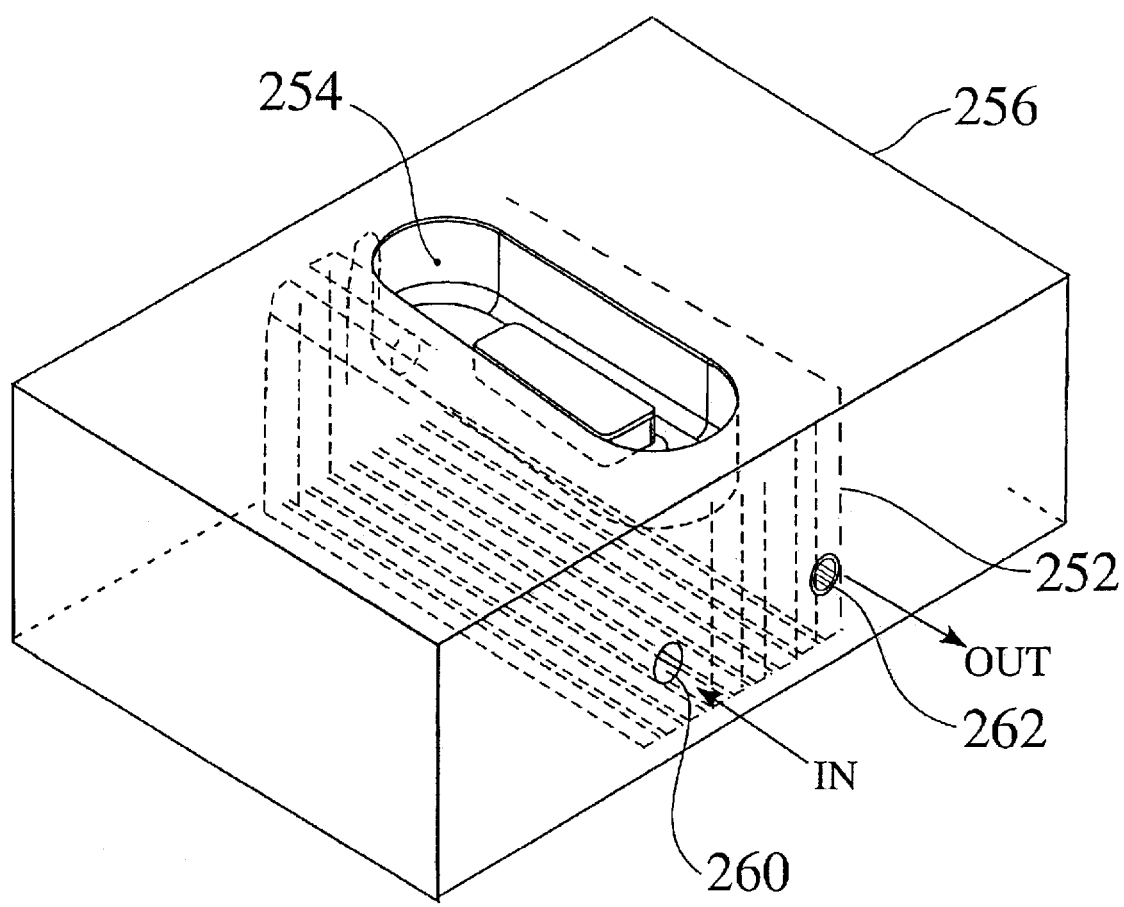

FIG. 18 is a perspective view of the whole mold insert showing the internal geometries as hidden lines, with inlet and outlet ports for coolant media, fabricated using invention methods disclosed herein.

Figure 19:
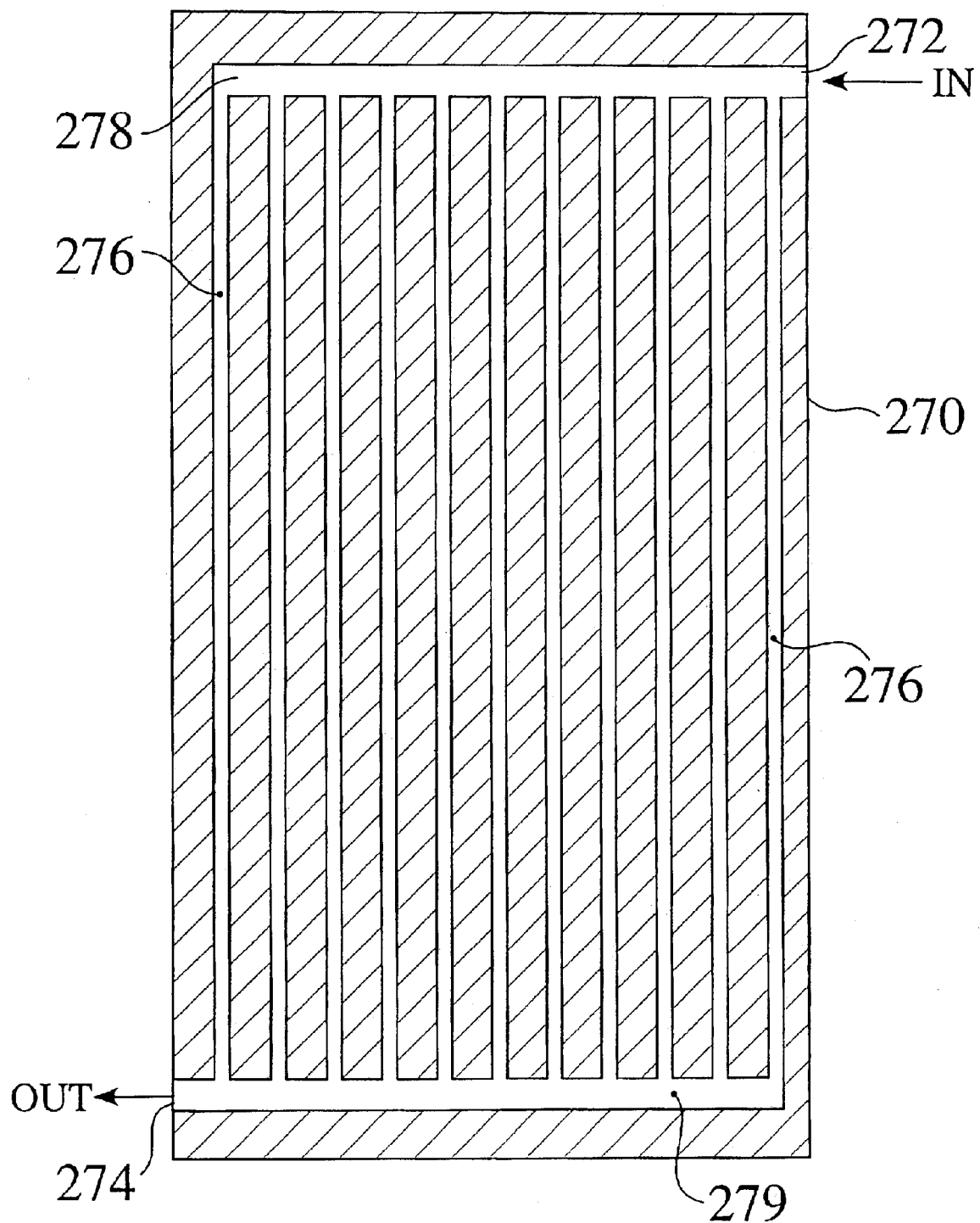

FIG. 19 is a cross sectional view of a solid, rectangular DMD article, showing the internal cooling passages and an inlet and exit made integral with the article.

Figure 20:
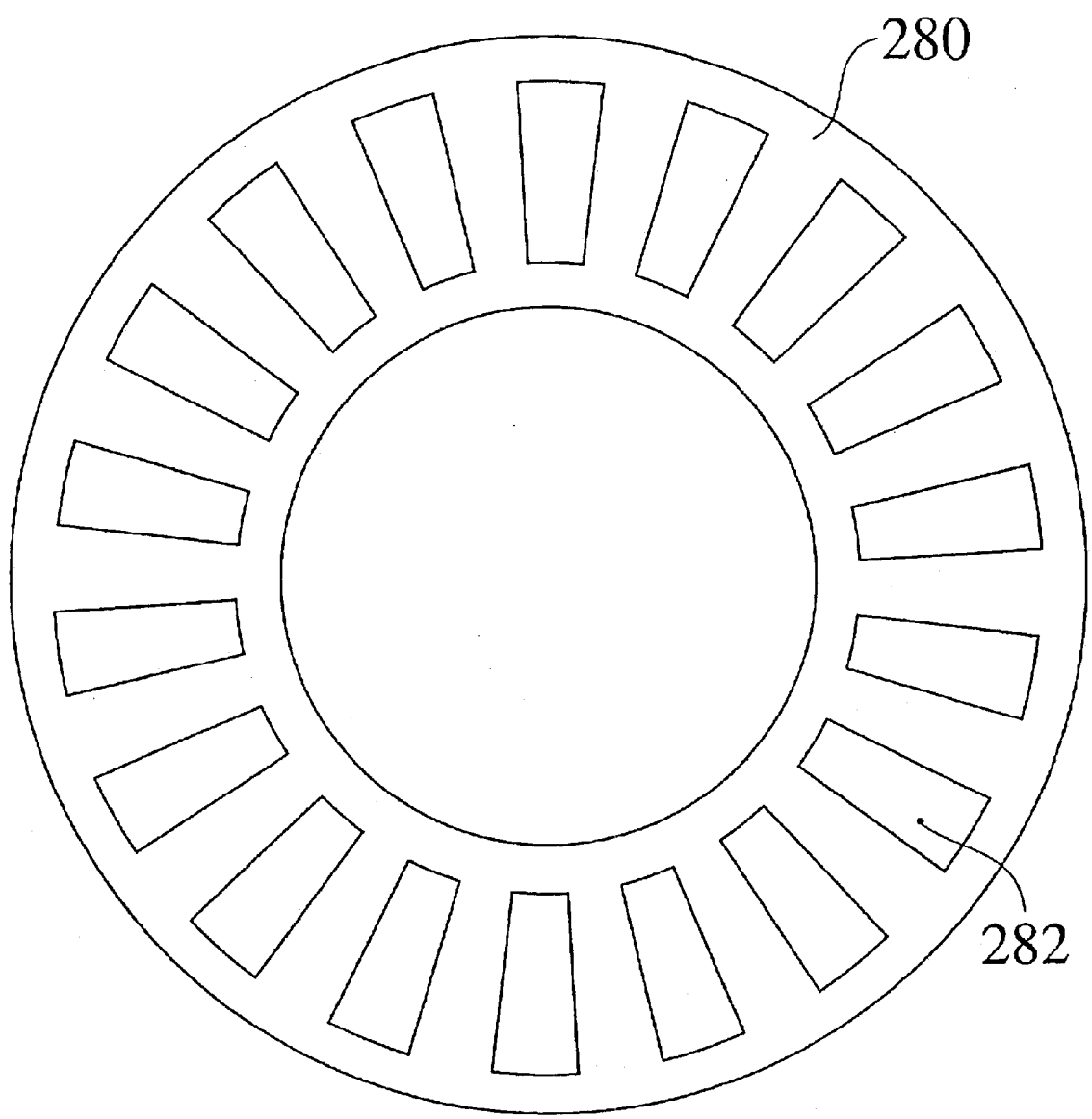

FIG. 20 is a cross-sectional view of a cylindrical article fabricated by the deposition method of the present invention, illustrating integral cooling passages.

Figure 21:
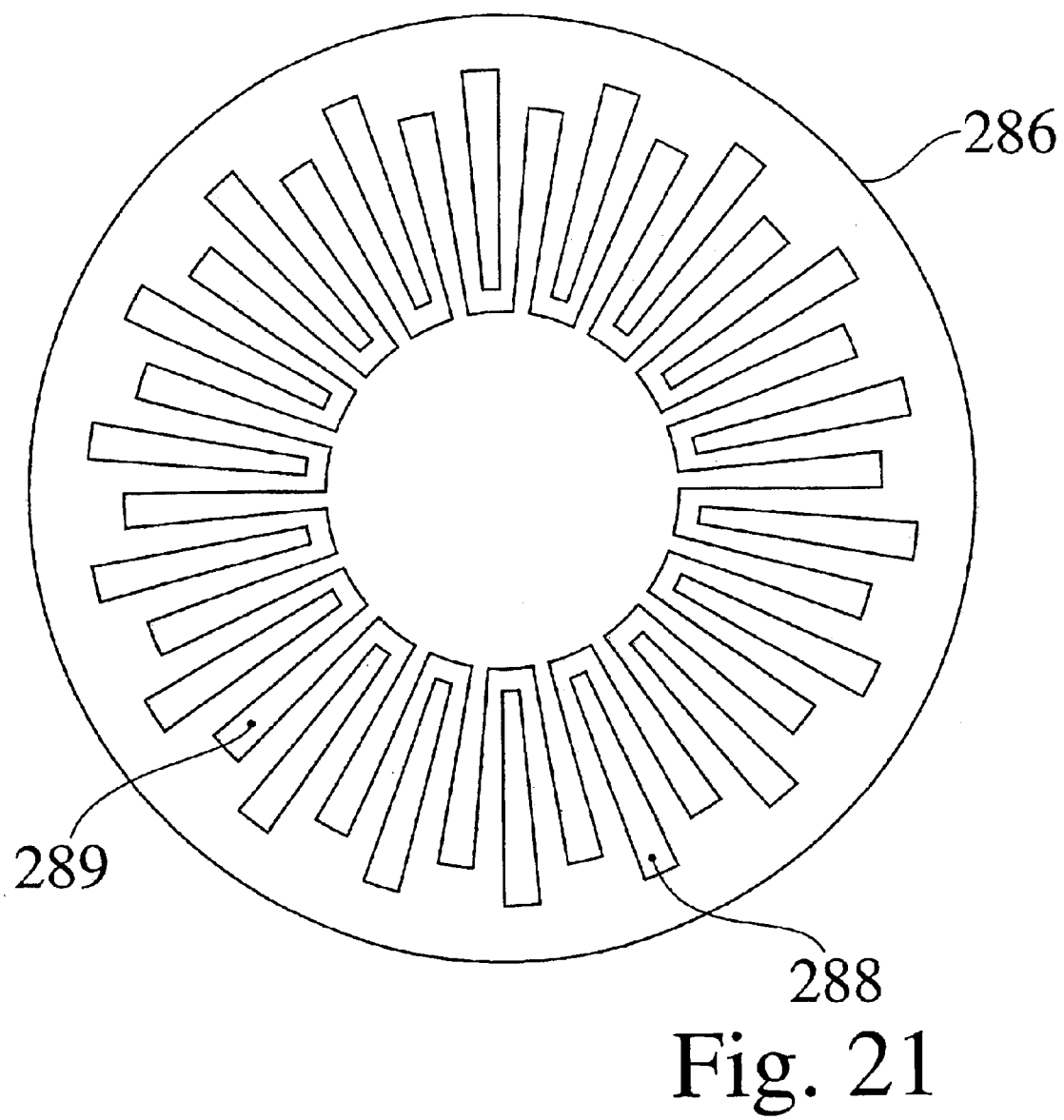

FIG. 21 is a cross-sectional view of a cylindrical object with complex geometries of separate cooling passages fabricated into the component, made by DMD.

Figure 22:
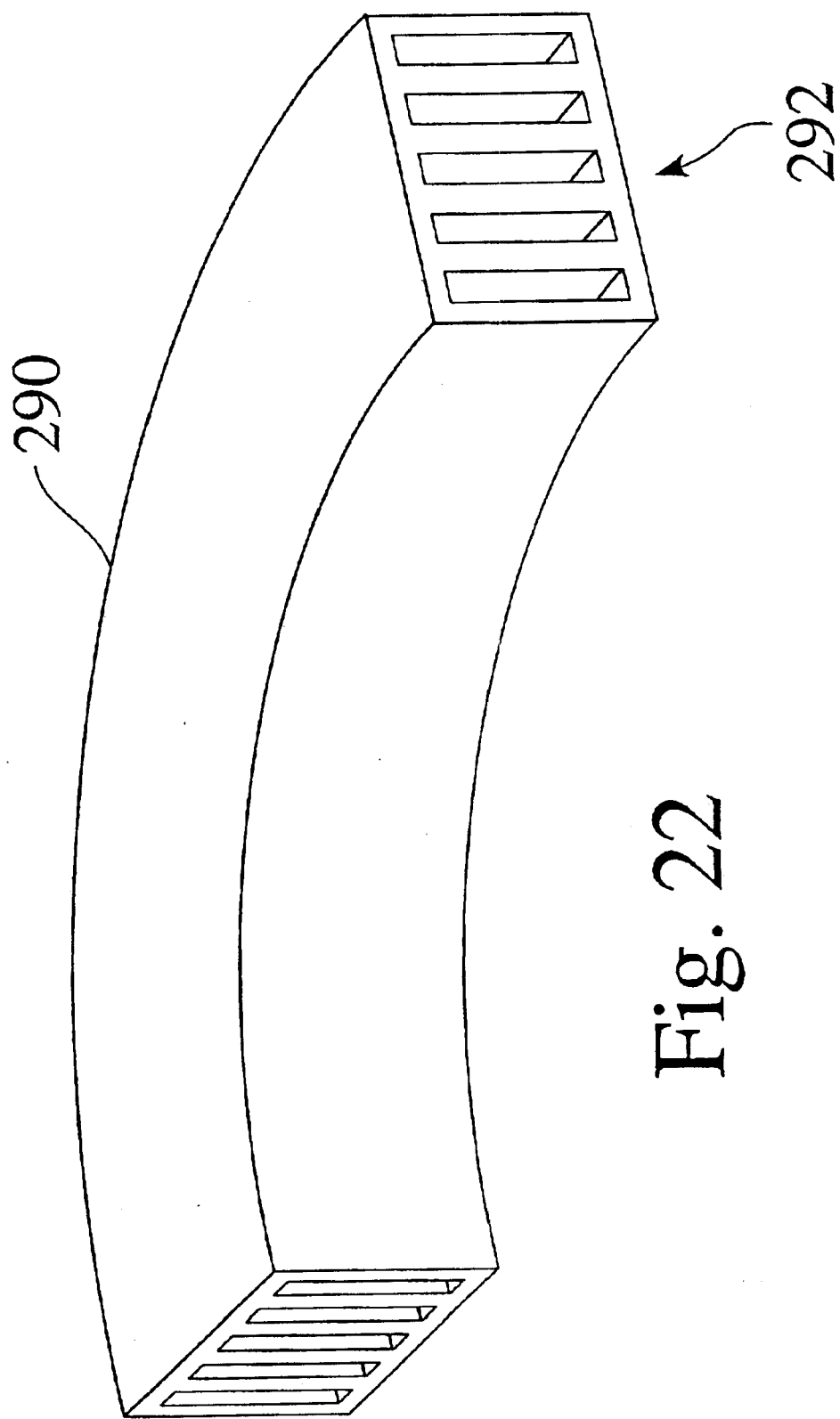

FIG. 22 is a perspective view of a solid, curved object made by directed material deposition, having the cooling passages following the contour of the outer shape.

Figure 23:
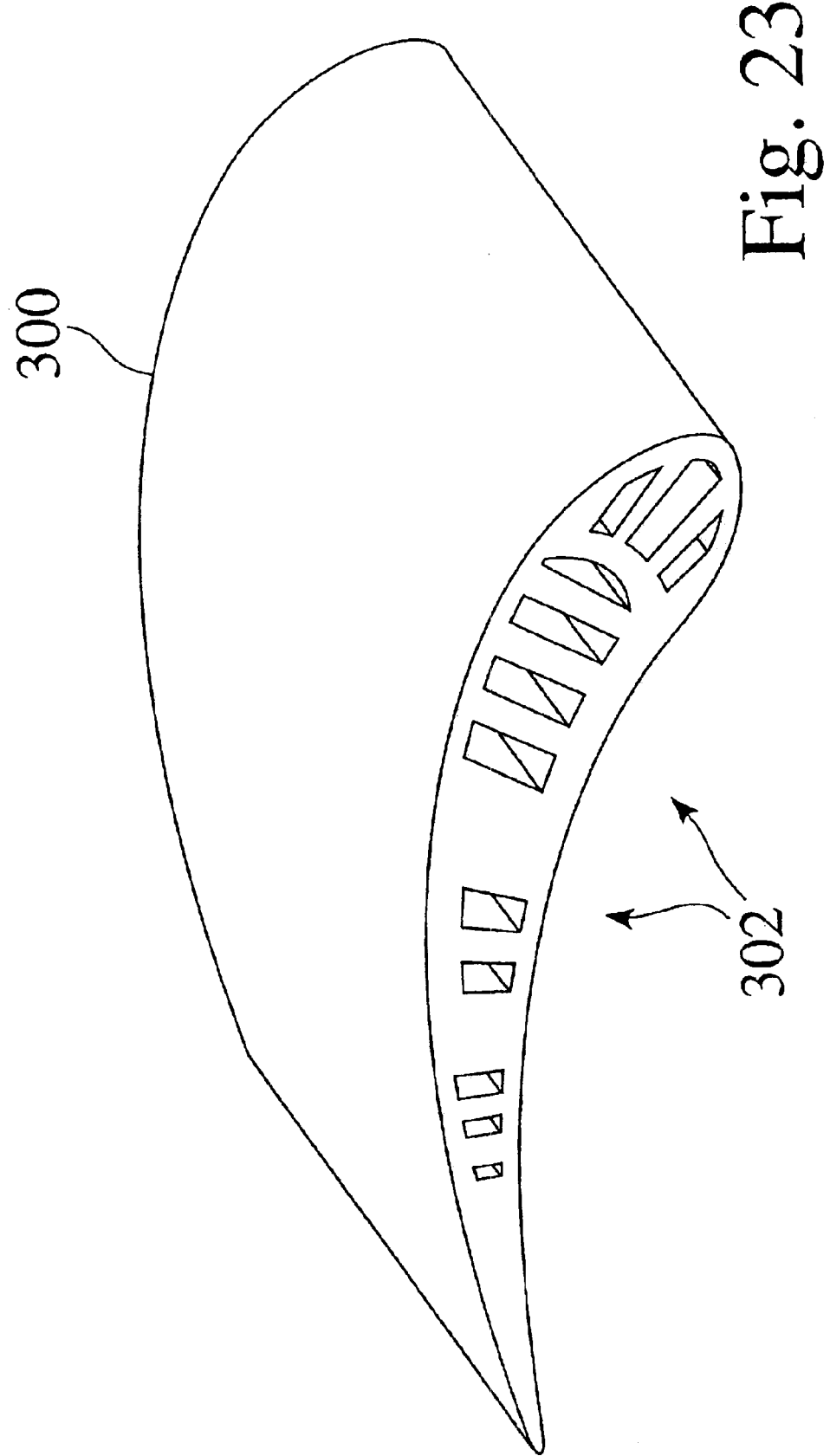

FIG. 23 is a perspective view of an airfoil shaped DMD article, such as a turbine blade, with cooling channels fabricated integrally within the airfoil.

Figure 24:
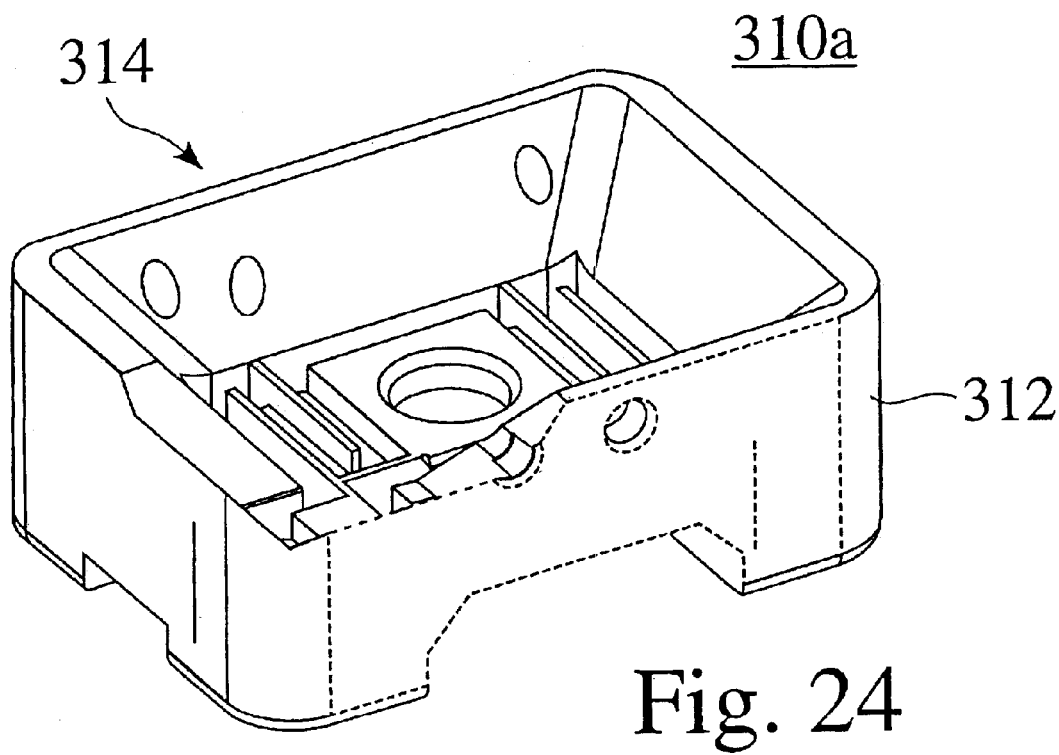

FIG. 24 represents a perspective view of a partially constructed "smart" substrate which can be made by DMD methods or by conventional machining.

Figure 25:
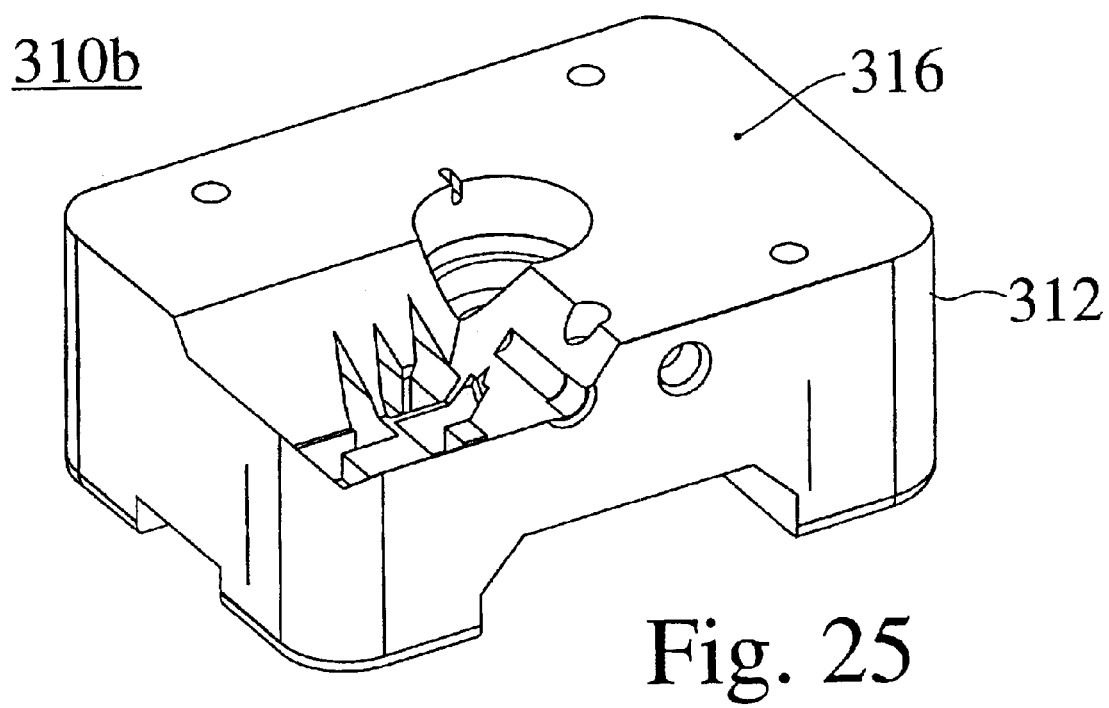

FIG. 25 is another view of the "smart" substrate in process shown in FIG. 24 to which has been added additional deposited material.

Figure 26:
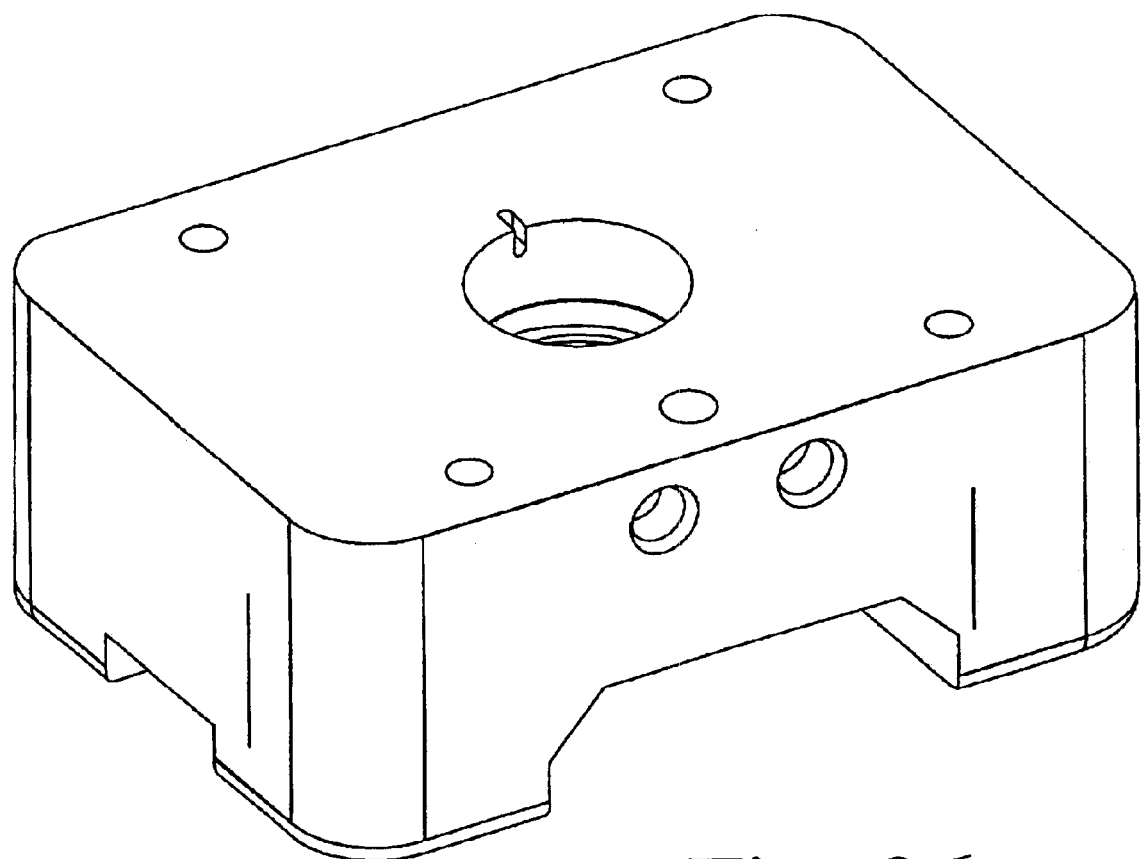

FIG. 26 is a perspective view of the finished "smart substrate" article shown in process in FIGS. 24 and 25.

Figure 26A:
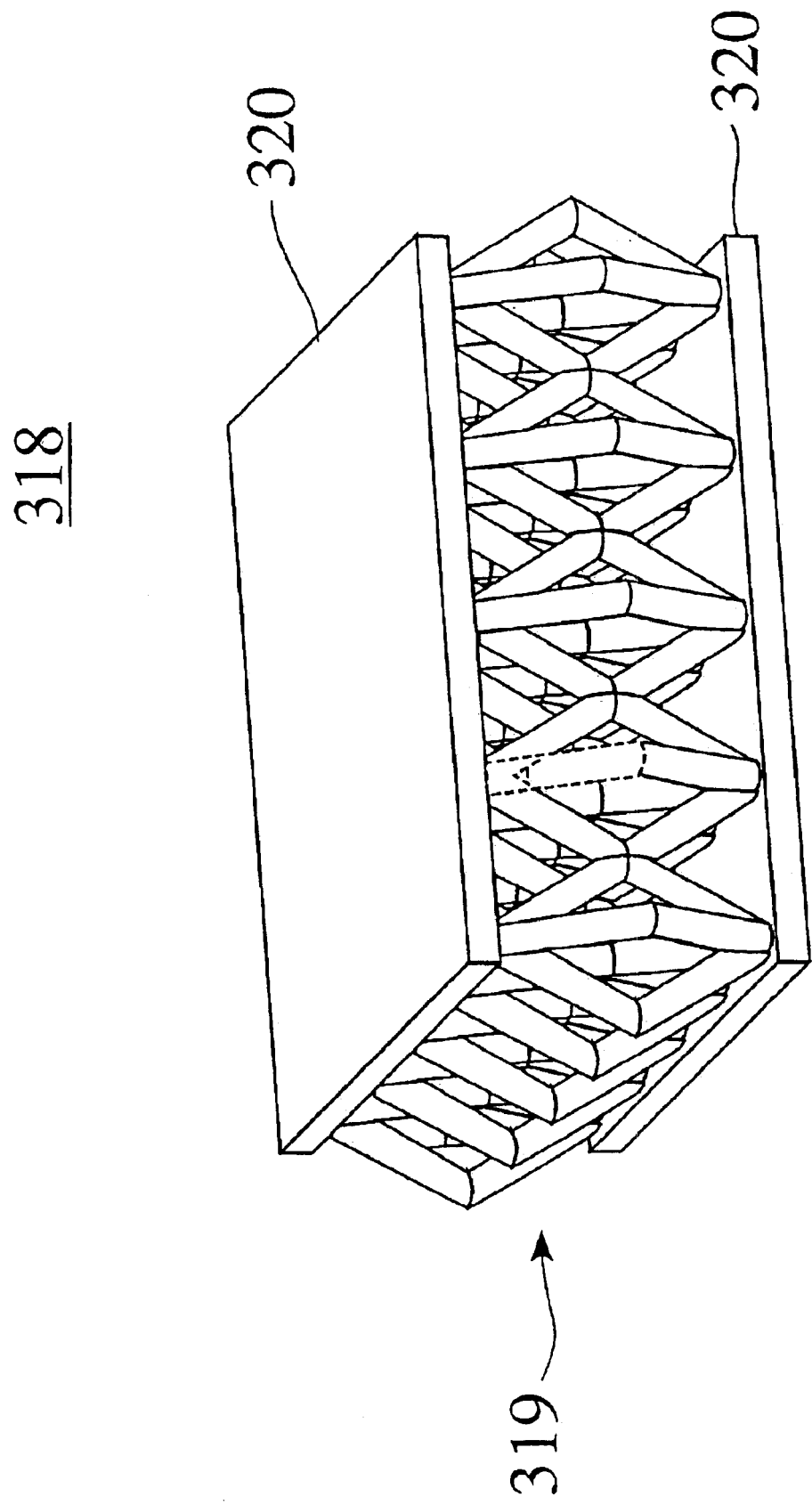

FIG. 26a is a perspective view of a latticed "smart" substrate, depicting tubular cooling channels which support the substrate bearing surfaces.

Figure 26B:
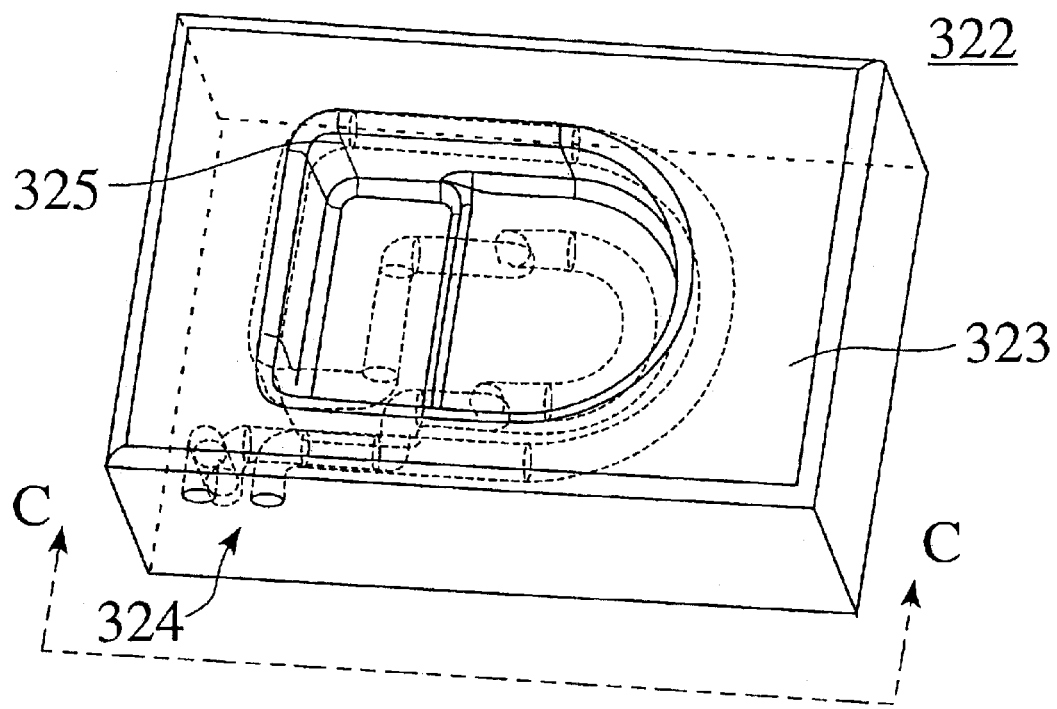

FIG. 26b is a perspective view of a plastic injection mold having embedded cooling channels of circular cross-section.

Figure 26C:
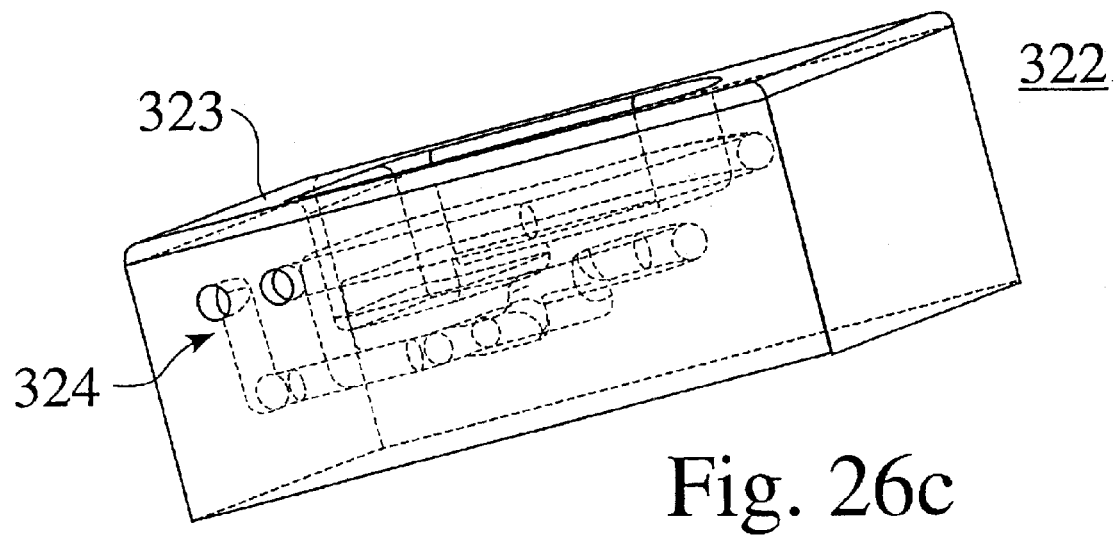

FIG. 26c is view C—C of the plastic injection mold revealed in FIG. 26b

Figure 27:
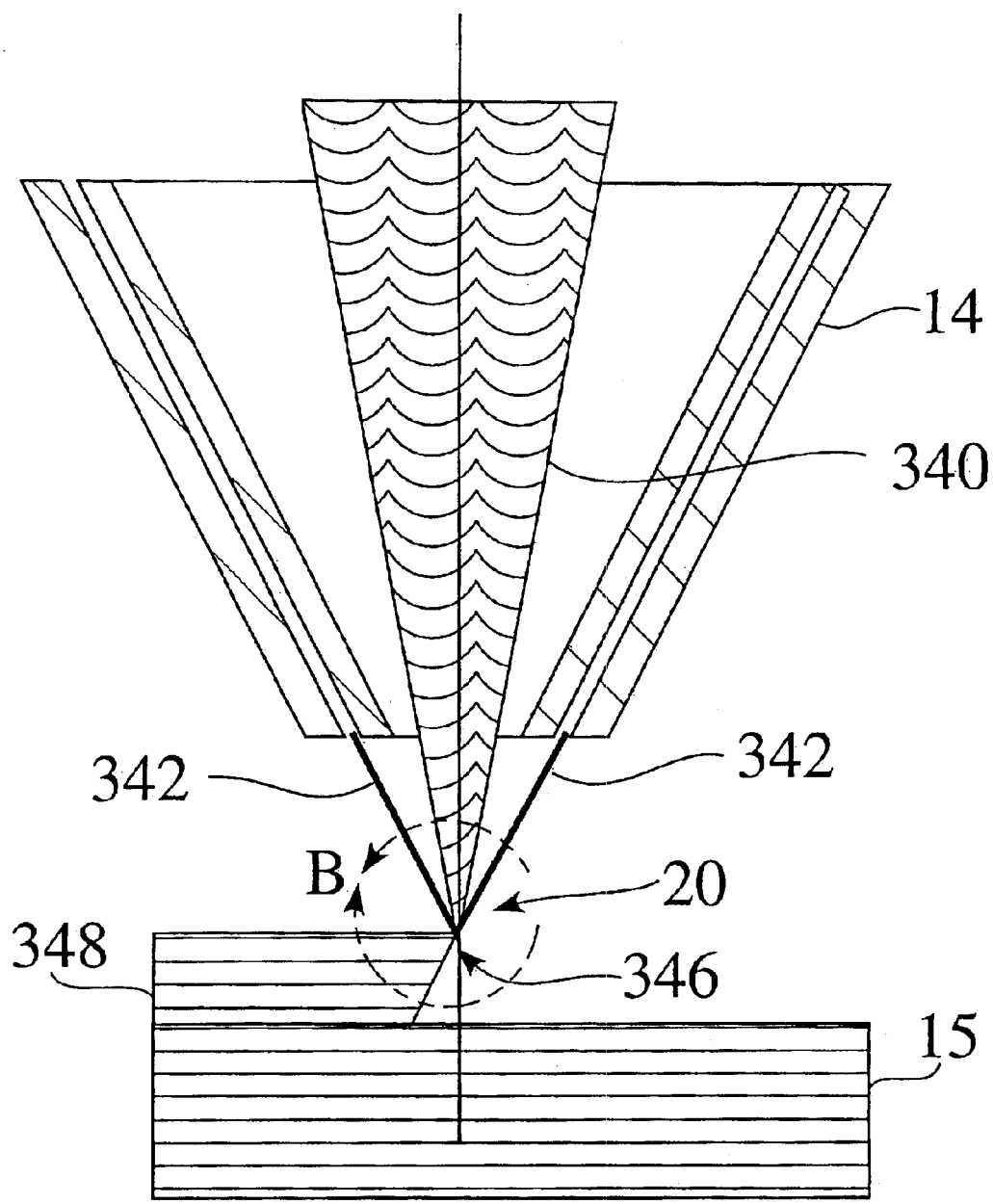

FIG. 27 reveals a side-view schematic of a method of manufacturing overhanging structures using 3-axis positioning of the deposition head in respect of the work piece.

Figure 28:
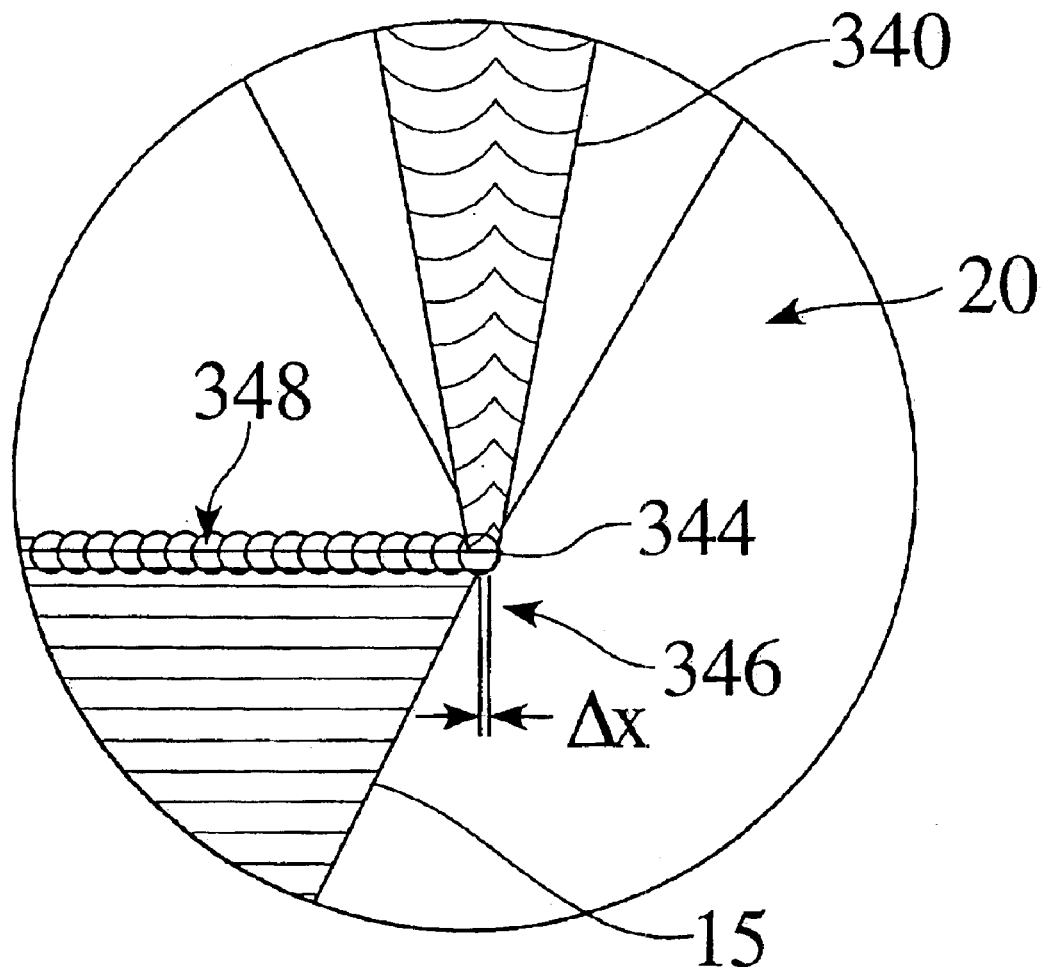

FIG. 28 is a closer look at view B of FIG. 27, showing how surface tension aids in maintaining the deposited material bead at the edge of a part.

FIG. 28a is another look at view B of FIG. 27 illustrating how additional beads of material may be attached to an existing overhanging surface. Additional deposition contours are added serially and $\Delta x$ is kept small with respect to the bead diameter.

Figure 29:
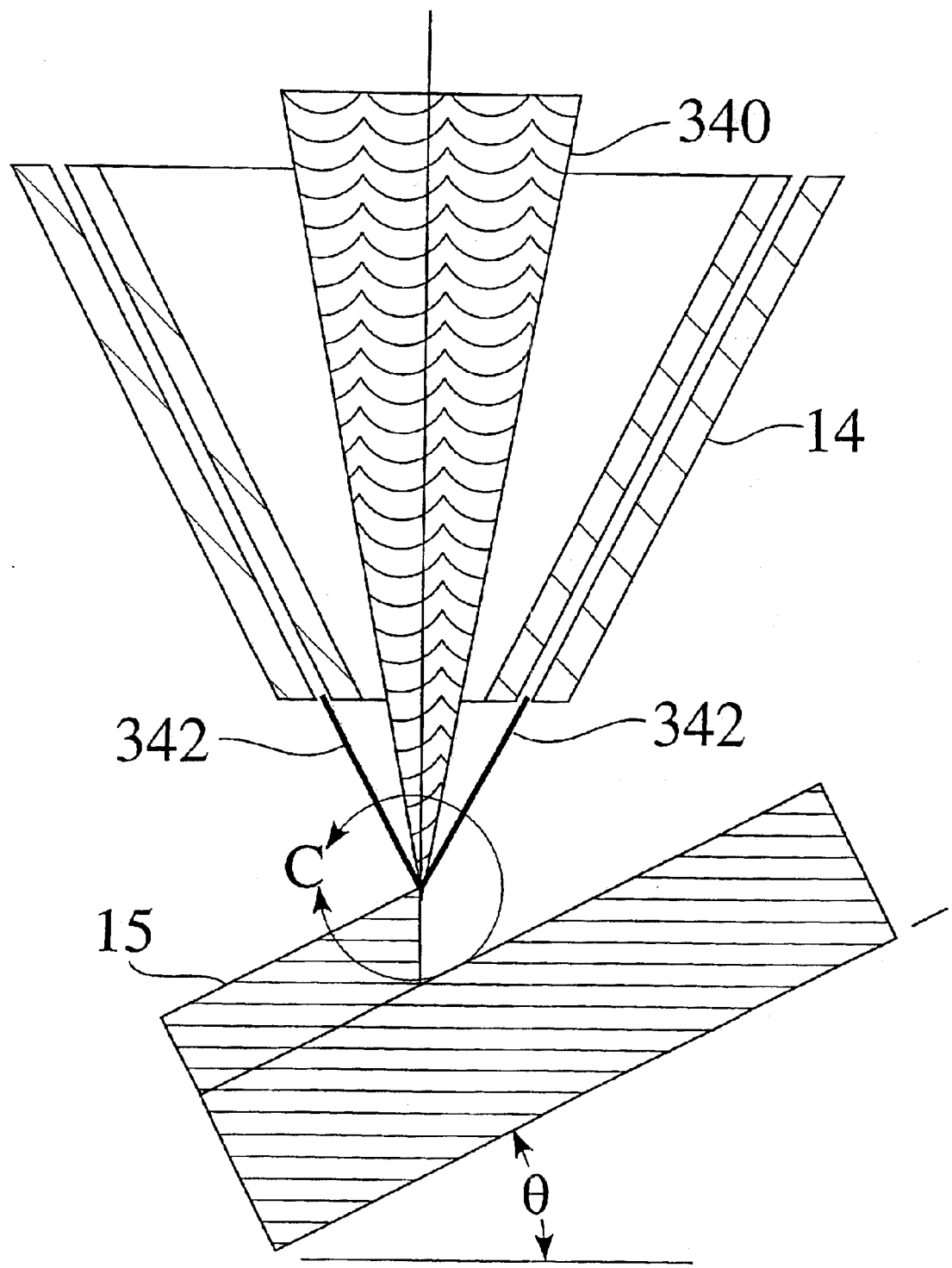

FIG. 29 shows a method of making an overhanging structure by rotating the work piece relatively in respect of the deposition head so the focused laser beam is parallel to a tangent to the surface being built. The deposition head can be rotated in multiple axes to implement the relative movement.

Figure 30:
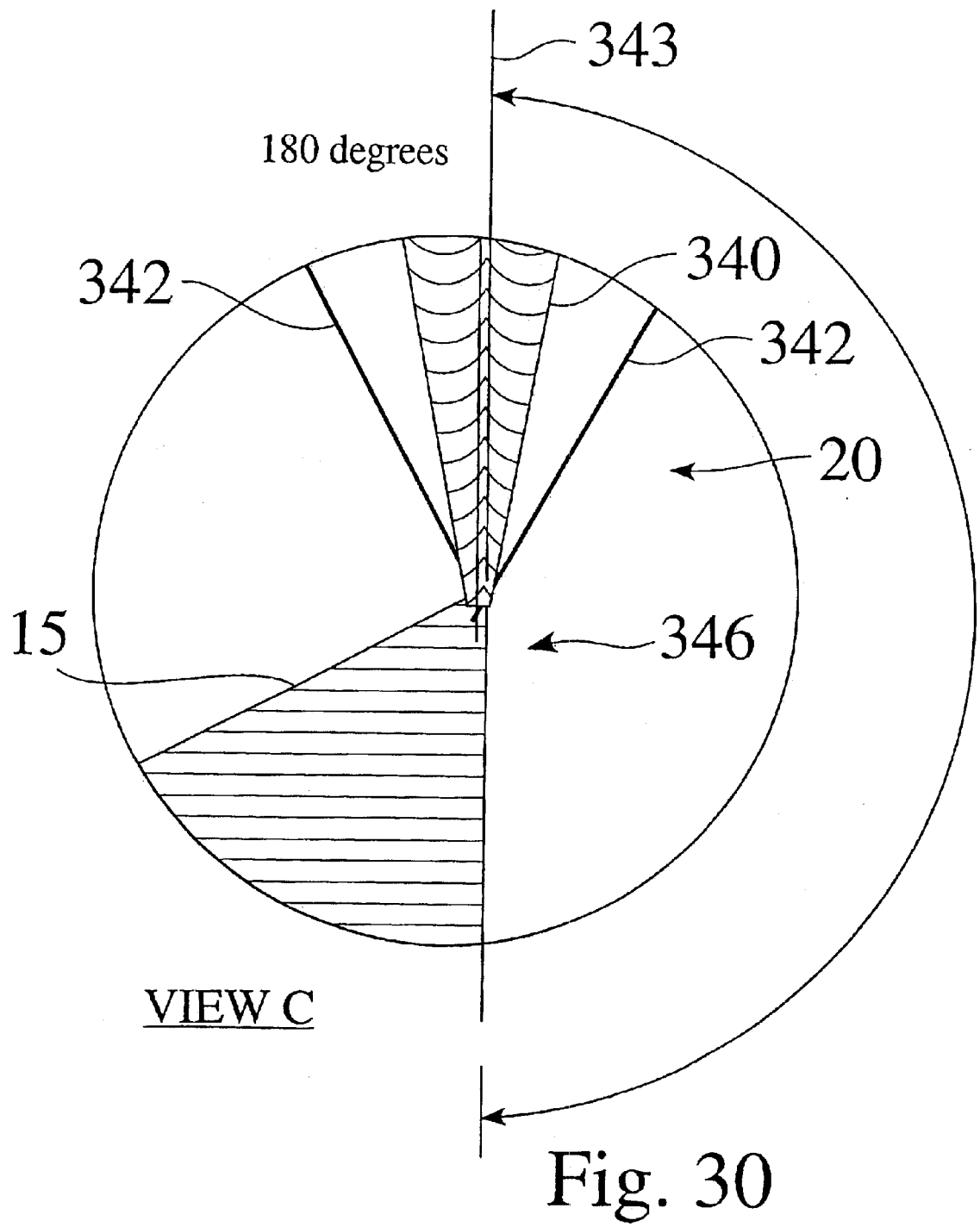

FIG. 30 is an enlarged view C of FIG. 29 showing the relationship of the laser beam-powder interaction area to the edge of the part which is being built.

Figure 31:
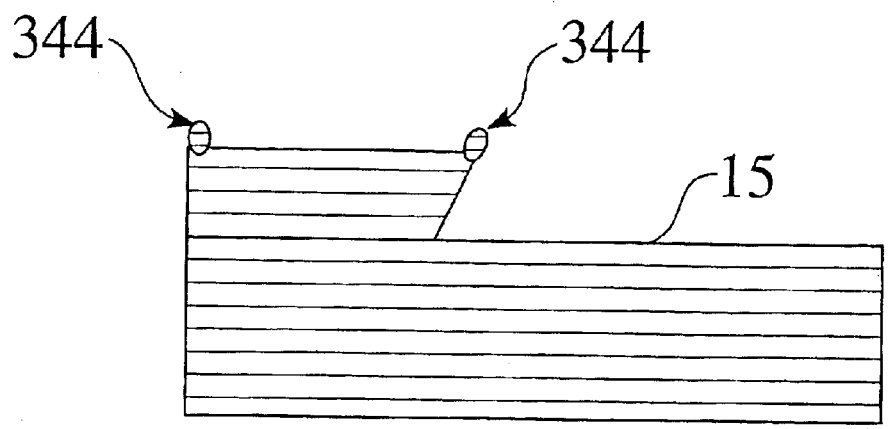

FIG. 31 is a side-view schematic of the work piece which is the target of the deposition, showing previously deposited material beads at the edges of the layer to be constructed which act as dams to contain fill material.

Figure 32:
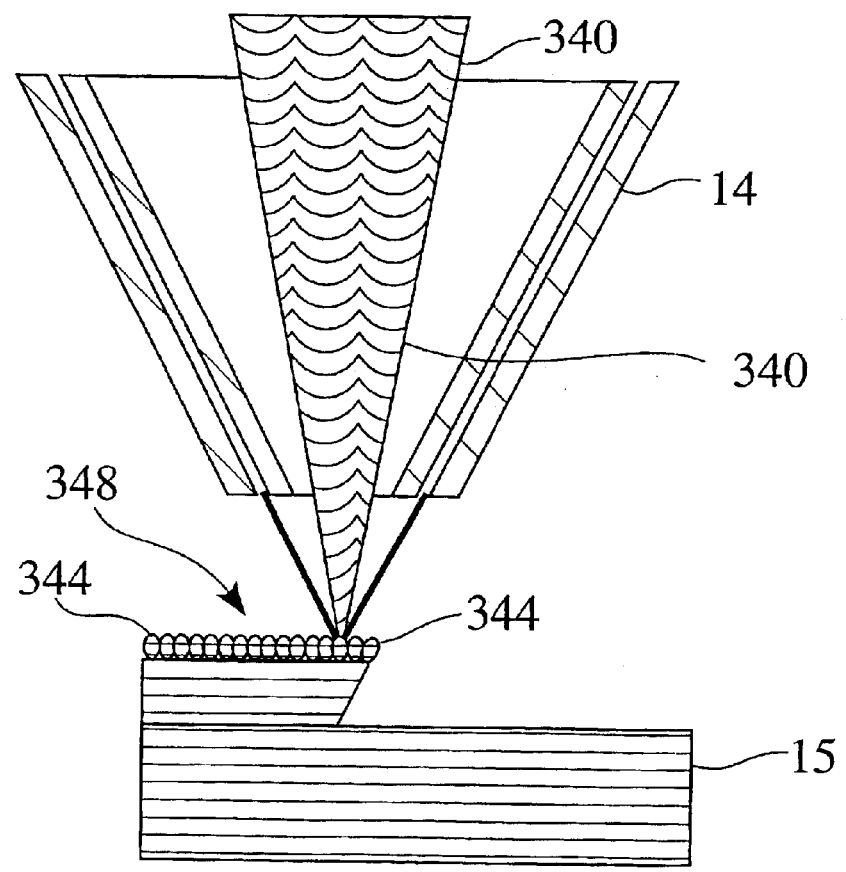

FIG. 32 is a side-view schematic of the deposition head using a standard fill process for filling in the deposition layer behind material beads which have been placed at the edges as dams, as depicted in FIG. 31.

Figure 33:
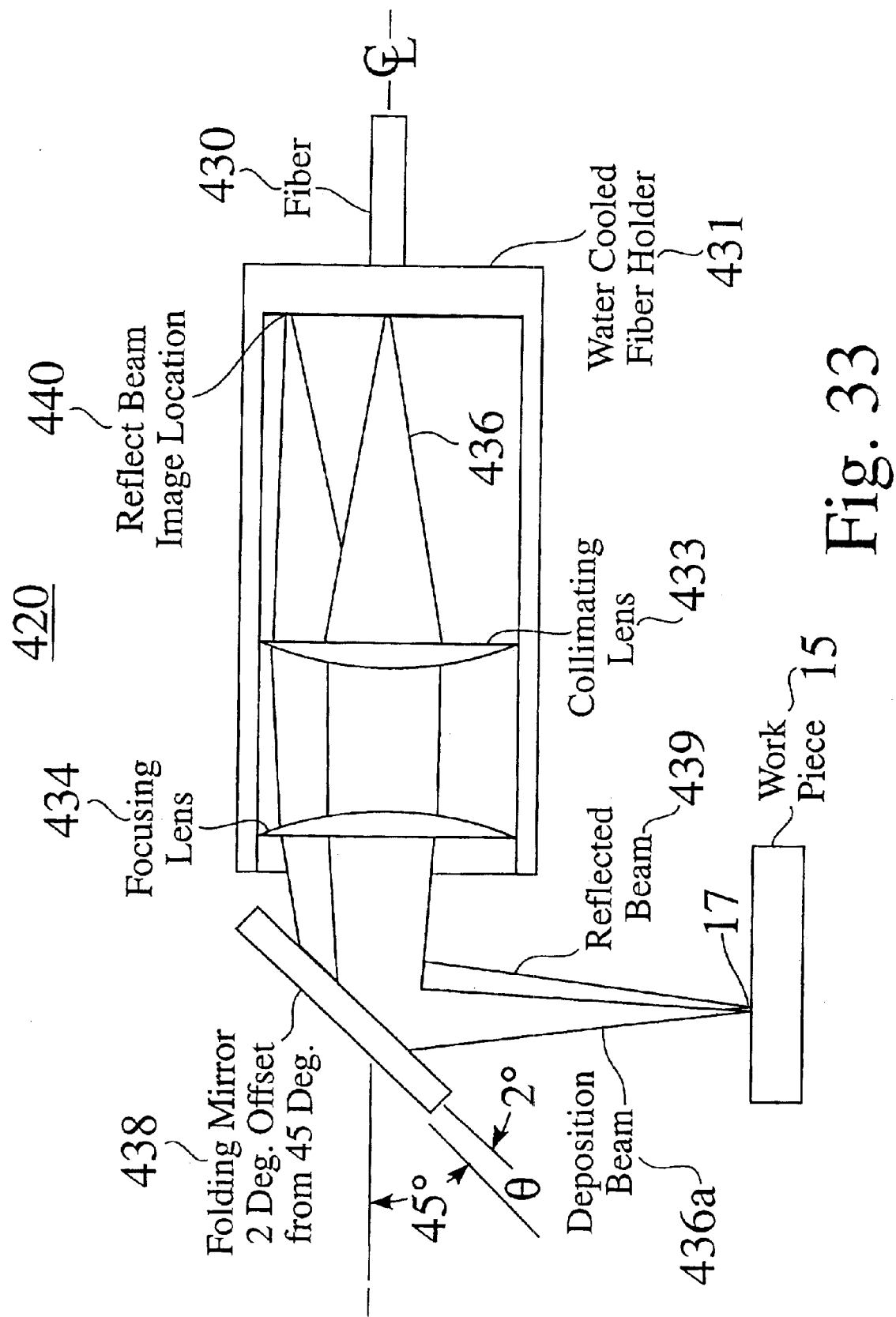

FIG. 33 is a schematic diagram of an optical fiber laser beam delivery system.

Figure 34:
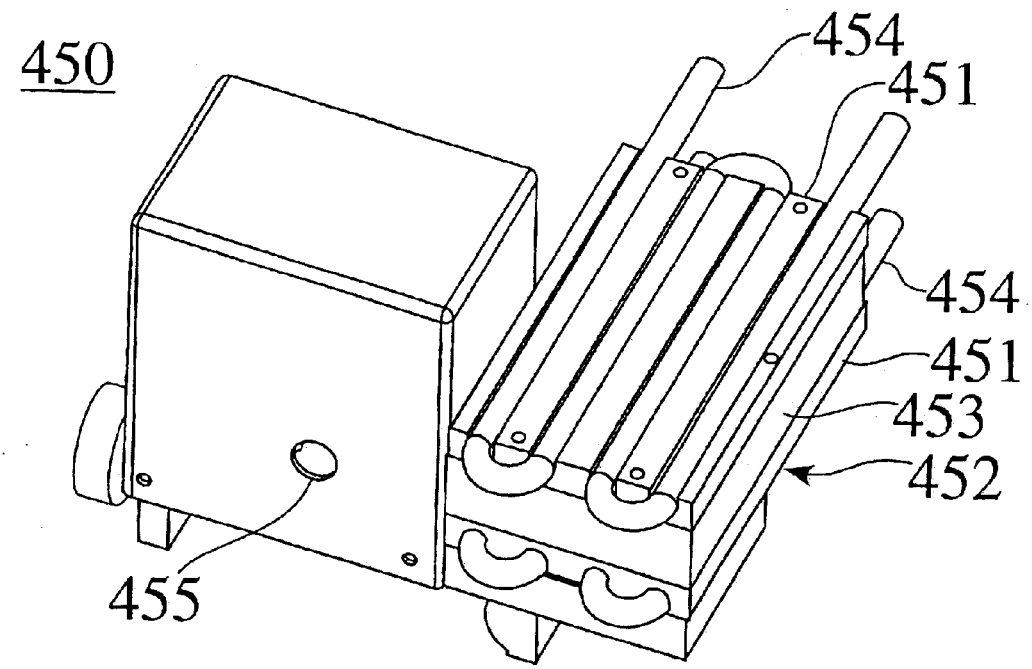

FIG. 34 is a perspective view of a laser beam shutter assembly, having a liquid-cooled laser beam "dump."

Figure 35:
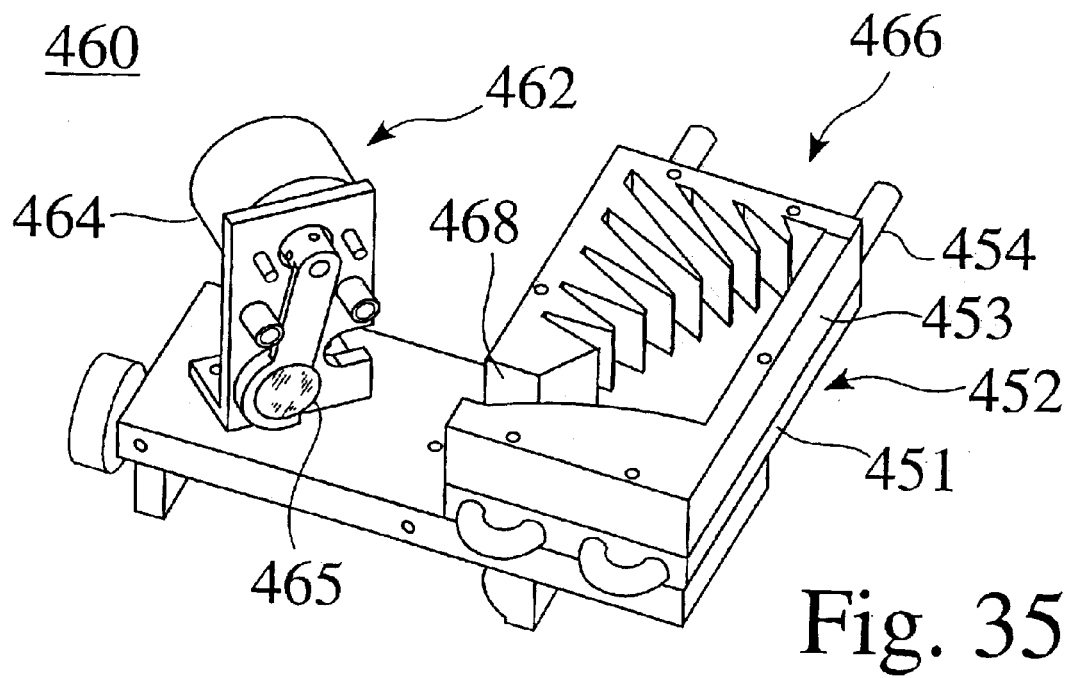

FIG. 35 is a perspective view of the laser beam shutter assembly depicted in FIG. 34 with a top cooling plate removed to reveal the laser beam "dump" chamber and reflecting beam absorbers.

FIGS. 36 to 40 are side and front elevations and perspective views of a multi-axis deposition head. The head includes an integral powder delivery system.

Figure 40:
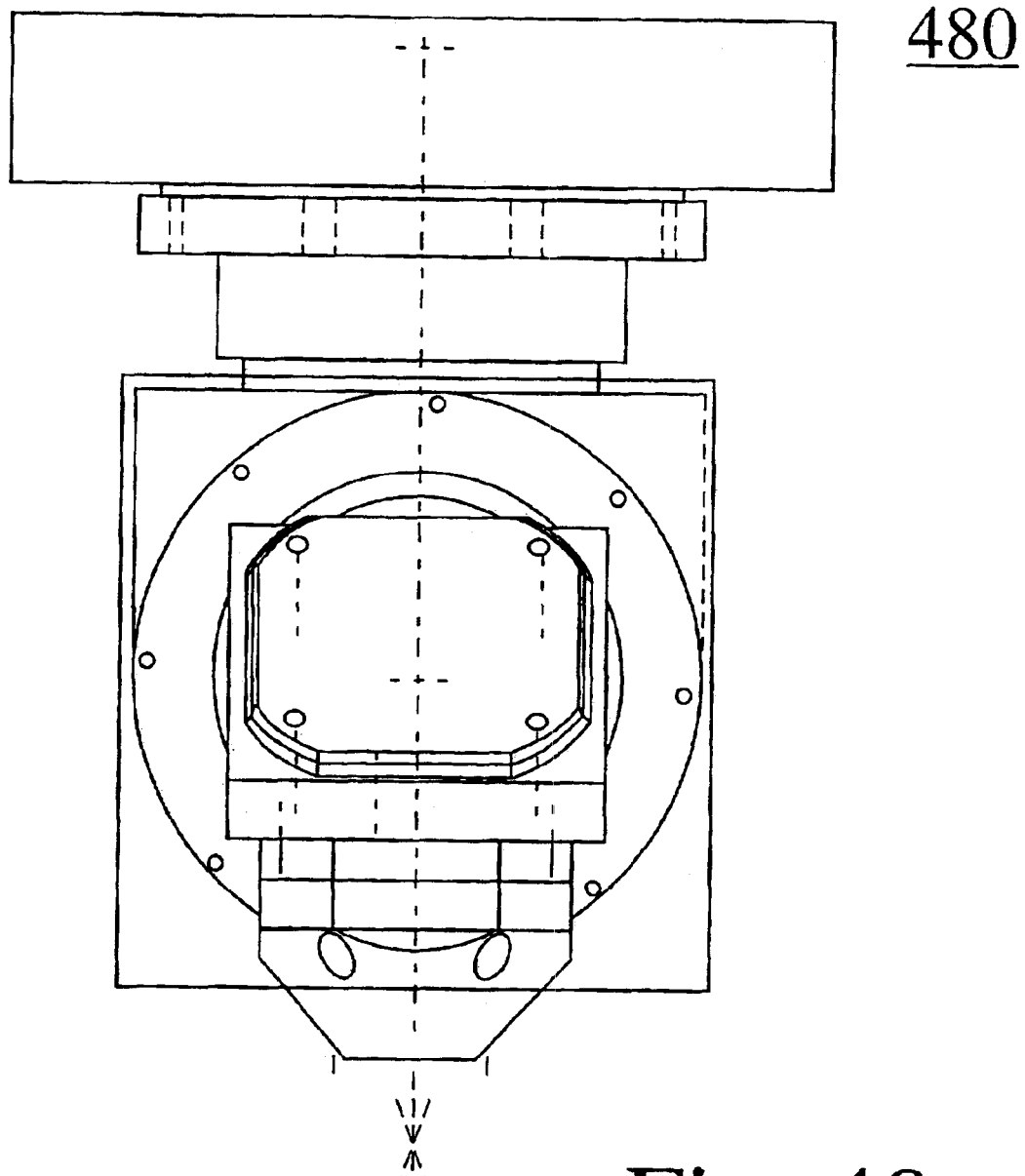
Figure 40A:
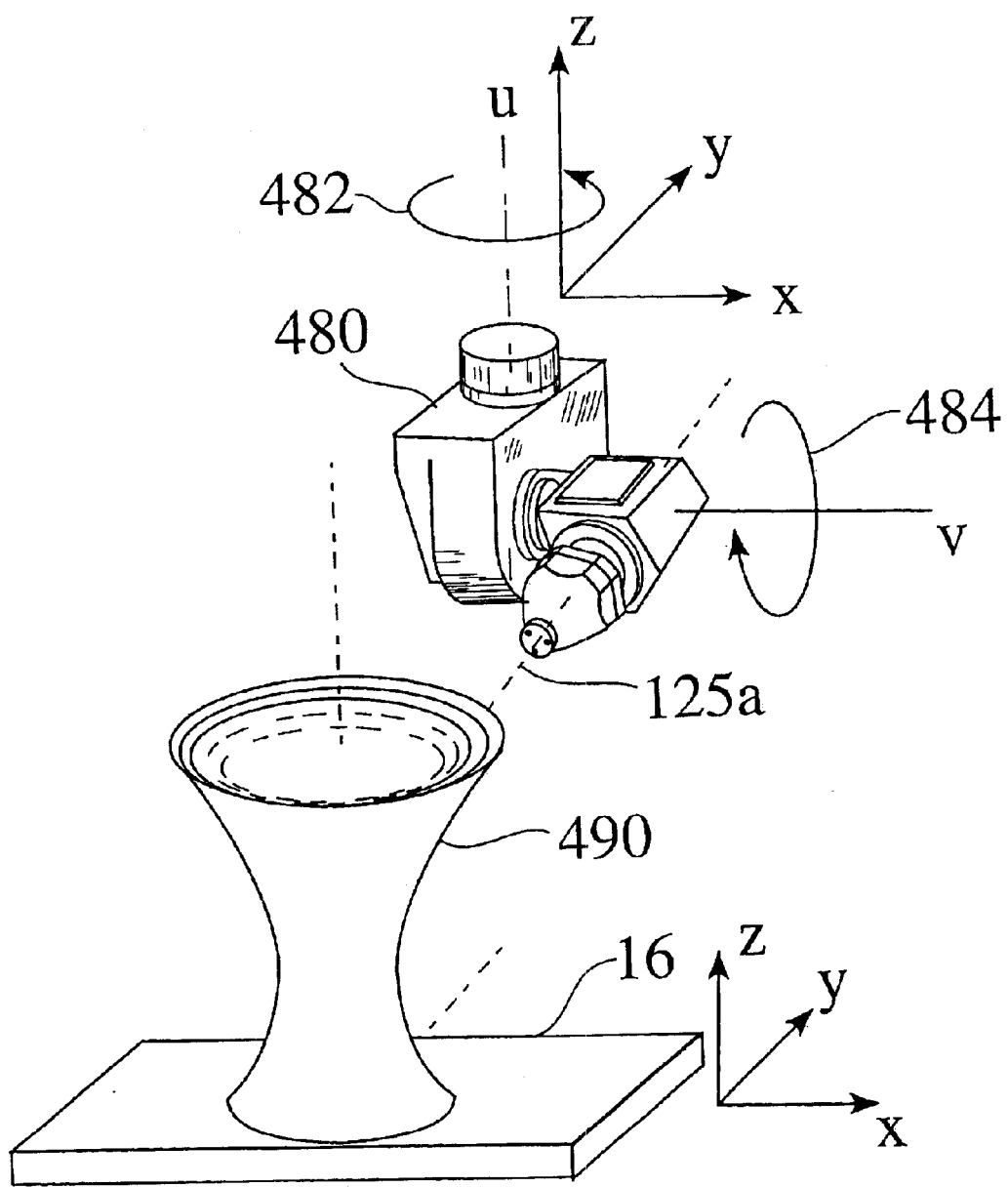

FIG. 40a presents a perspective view of the multi-axis deposition head, illustrating deposition of three-dimensional structure having a curved surface. In this example, the head is positioned in three translational and two rotational axes.

FIG. 41 depicts one of a plurality of powder delivery nozzles of the prior art, which are disposed in a deposition head.

FIG. 42 shows an improved powder delivery nozzle used in the present invention.

FIG. 43 reveals a still further improved powder delivery nozzle alternatively used in the present invention.

Figure 44:
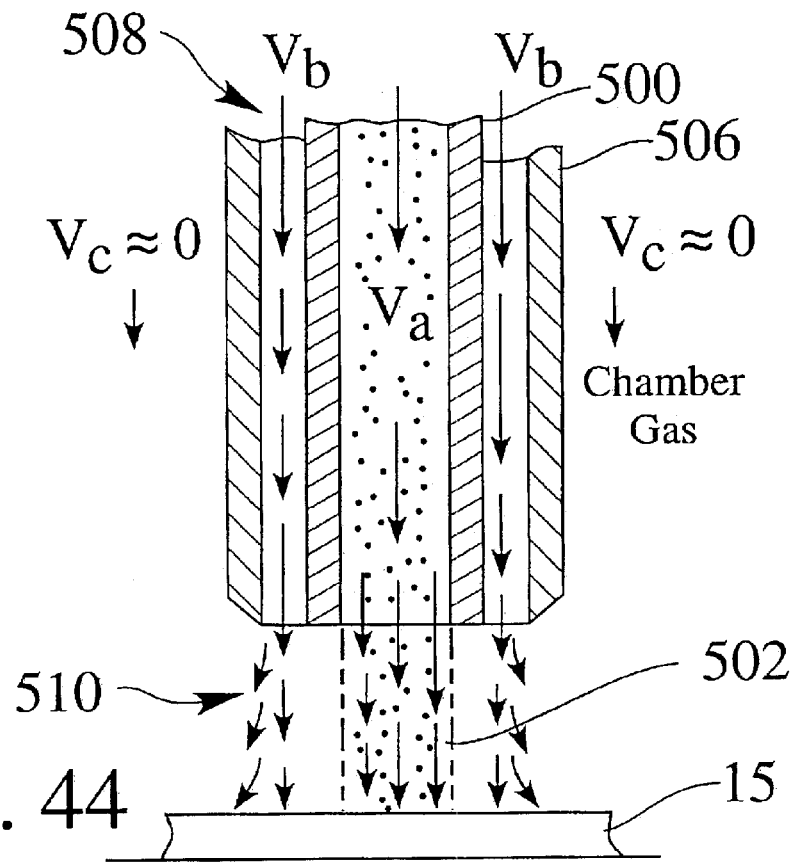

FIG. 44 depicts schematically the operation of a coaxial gas flow sheath which acts as a boundary layer barrier to the entrained powder stream in a powder delivery nozzle. The velocity of the coaxial gas flow and the entrained powder stream are approximately the same.

Figure 45:
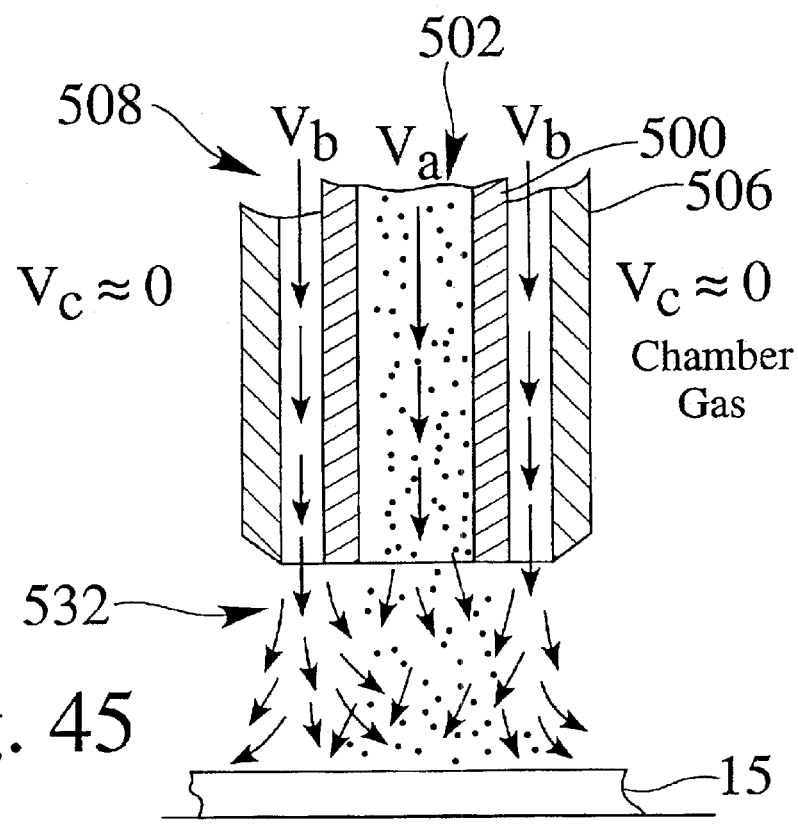

FIG. 45 is another schematic representation of powder delivery nozzle having a coaxial gas sheath and entrained powder stream. In this illustration, the velocity of the coaxial gas stream is much greater than that of the entrained powder stream resulting in mixing of the two streams. Large de-focusing of the powder stream causes powder to be scattered widely over the deposition surface.

A DETAILED DESCRIPTION OF PREFERRED & ALTERNATIVE EMBODIMENTS

1. Forming Structures Directly from a CAD Solid Model

The present invention comprises apparatus and methods for fabricating metallic hardware with exceptional material properties and good dimensional repeatability. The term "net shape" refers to an article fabricated to the approximate desired size and features, solid or latticed, by a process which requires little or no machining. The prior art in this technology has focused on methods to enable the deposition process. However, little work has been done on how to best control the process to achieve a desired outcome in a solid structure.

The present invention uses the laser-based process to provide users with the ability to create a net shape or near-net shape, fully dense, metallic object directly from a computer aided design (CAD) solid model. The shapes are created a layer at time. In this Specification and in the Claims that follow, the invention is referred to as a directed material deposition (DMD) process. This DMD process has the potential to revolutionize the approach to designing hardware. Presently, designers must often make compromises in materials selections, and, as a result, achieve a less than optimum solution to a problem. The layer approach used in the material deposition process provides the freedom to vary material composition within a single structure. This ability enables components to be engineered a layer at a time to satisfy conflicting material requirements. Currently, the process is capable of producing metallic objects using stainless steel and nickel-based super alloys that have nearly a two to three fold increase in strength and with improved ductility in comparison to conventionally processed materials. Other materials that have been processed include tool steels, copper and titanium.

The material deposition process of the present invention is functionally similar to many of the existing rapid prototyping technology (RPT) methods in that it utilizes a computer rendition of a solid model of an article to build an object a layer at a time. Conventional stereolithography (STL) file format may be used. The file is sliced electronically into a series of layers that are subsequently used to generate the motion of the apparatus which deposits each layer of material. The layers are deposited in a sequential fashion to build an entire part.

Figure 1:
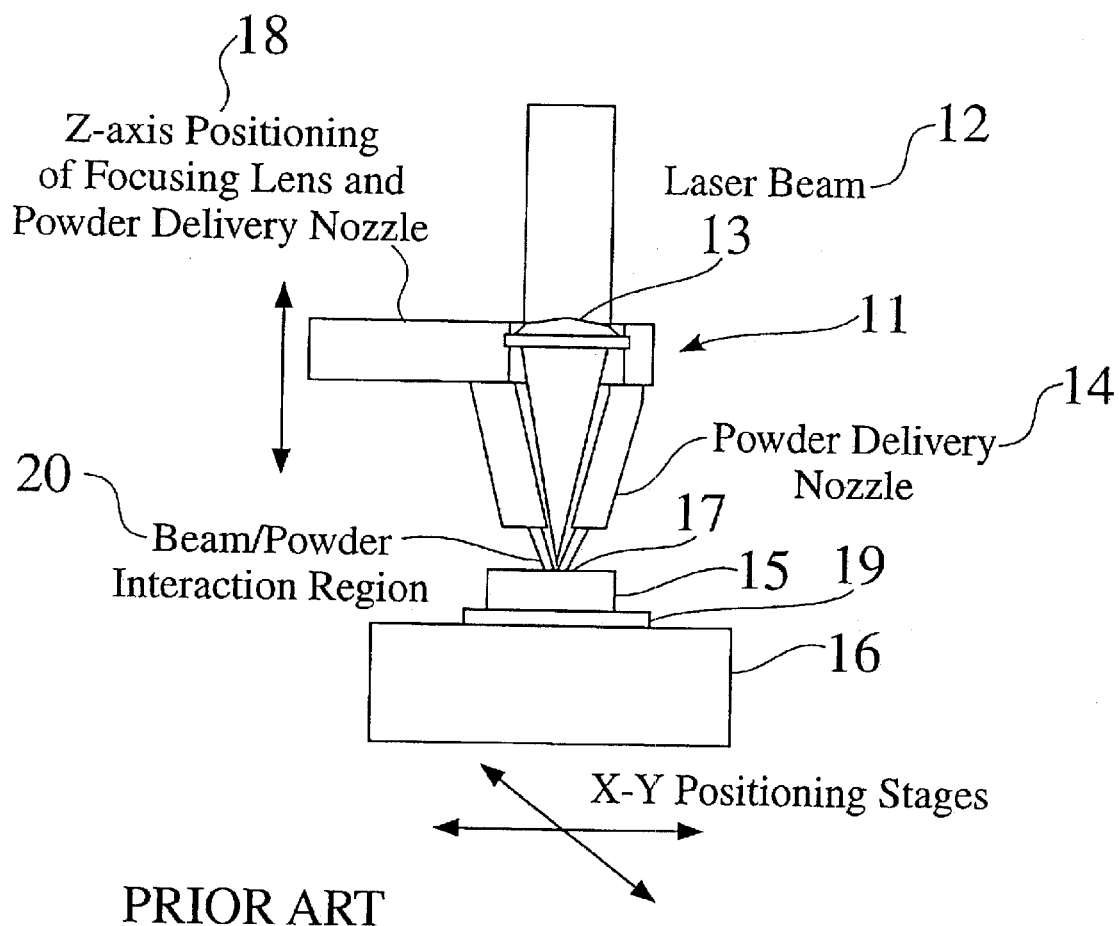
FIG. 1 is a schematic representation of the prior art, Laser Engineered Net Shaping (LENS™) process showing a vertically-movable laser beam, powder delivery nozzle and a substrate situated upon X-Y positioning stages.

A schematic representation of the prior art, laser engineered net shaping process apparatus, is shown in FIG. 1. To begin the fabrication process, a metal substrate 19 is used as a base onto which new material 15 is deposited. A high power laser 12 is focused by lens 13 onto the substrate 19 to create a molten puddle 17 and metal powder 20 is injected into the puddle 17. The substrate 19 is moved relative to the laser beam 12 in a controlled fashion to deposit thin metallic lines of a finite width and height. A stage 16 provides relative motion between the work piece and the deposition head 11 in orthogonal directions and the focusing lens 13 is moved in the z-axis as the material grows in height. Lines of material are deposited side by side in the desired regions to create the pattern for each layer. In this fashion, each layer is built up line by line and the entire object evolves, layer by layer.

Testing was done to prove that a prior technology called LENS™ processing ("laser engineered net shaping," a Trade Mark used by the Sandia National Laboratories) was viable for direct fabrication applications. Mechanical testing data from tensile specimens prepared in 316 stainless steel and Inconel 625 are given in Table 1:

TABLE 1

Mechanical test data from LENS ™ manufactured tensile specimens.

| Plane Orientation with Respect to Tensile Direction (mesh size) | Ultimate Strength (MPa) | Yield Strength (MPa) | Elongation (% in 2.54 cm) |
|---|---|---|---|
| 316 SS Perpendicular (−325) | 0.793 | 0.448 | 66 |
| 316 SS Perpendicular | 0.793 | 0.448 | 51 |
| 316 SS Parallel (−325) | 0.807 | 0.593 | 33 |
| 316 SS Anneal bar (Standard) | 0.586 | 0.241 | 50 |
| 625 Parallel (100/325) | 0.931 | 0.634 | 38 |
| 625 Perpendicular (100/325) | 0.931 | 0.517 | 37 |

The ultimate tensile strength and yield strengths of the DMD samples are given in mega-Pascals (Mpa). As can be seen from these data, the specimens produced using the metal deposition process exhibited very good material properties and, in fact, in all cases the measured yield strengths of these samples were significantly better than typical annealed wrought material. Additionally, the ductility of these specimens was as good or better than the annealed wrought material with only one exception. This improvement in material properties occurred for both the 316 stainless steel and Inconel 625 alloys. Transmission electron microscopy analysis of the 316 stainless steel specimens has shown that the grain size within the DMD fabricated structures is on the order of five to ten micrometers ($\mu$m) whereas the grain size for the annealed 316 stainless steel is typically around 60 am. This difference in grain size is believed to be the primary cause of the improved material properties for the DMD fabricated structures. In addition, the simultaneous increase in strength and ductility would suggest that although there is undoubtedly residual stress within the DMD fabricated structures, it is not sufficiently large to result in degraded material properties.

Figure 2:
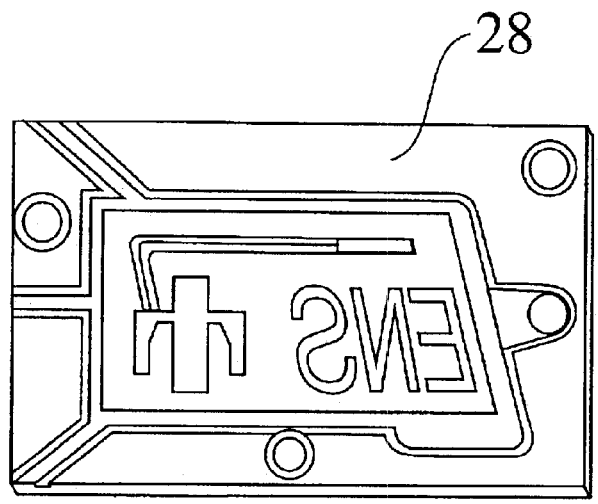
FIG. 2 is a plan view of a sample object used in dimensional repeatability of metal deposition experiments.

Another problem for many RPT processes is the inability to produce accurate parts directly from a CAD solid model. Studies were performed that characterize the DMD process in this area as well. The component geometry used in these studies is shown in FIG. 2. The part 28 shown in FIG. 2 represents a simple half-mold that was fabricated for molding plastic. Measurements made of several areas of this part 28 are included in Table 2.

TABLE 2

Measured physical dimensions of mold halves made using LENS ™ process along with statistical results for error and repeatability.

| Measurements of Features for NSF Phase I SBIR Parts | | | | | |
|---|---|---|---|---|---|
| Outside Dimensions (mm) | | | Thunderbird Dimensions (mm) | | |
| Part Number | Length | Width | Part Number | Wing Span | Tail-to-Head |
| 1 | 76.619 | 45.009 | 1 | 14.681 | 14.478 |
| 2 | 76.670 | 45.034 | 2 | 14.732 | 14.529 |
| 3 | 76.645 | 45.034 | 3 | 14.656 | 14.427 |
| Avg. Value | 6.645 | 45.027 | | 14.689 | 14.478 |
| Std. Deviation | 0.025 | 0.015 | | 0.038 | 0.051 |

TABLE 2-continued

Measured physical dimensions of mold halves made using LENS ™ process along with statistical results for error and repeatability.

| Part | Alignment Hole Dimensions | | | | | |
| --- | --- | --- | --- | --- | --- | --- |
| | Upper Right Hole | | Upper Left Hole | | Lower Center Hole | |
| Number | X Dim. | Y Dim. | X Dim. | Y Dim. | X Dim. | Y Dim. |
| 1 | 4.826 | 4.877 | 4.890 | 5.004 | 3.543 | 3.607 |
| 2 | 4.826 | 4.826 | 4.953 | 4.902 | 3.632 | 3.645 |
| 3 | 4.724 | 4.686 | 4.775 | 4.724 | 3.505 | 3.556 |
| Avg. Value | 4.793 | 4.796 | 4.872 | 4.877 | 3.607 | 3.602 |
| Std. Dev. | 0.058 | 0.099 | 0.089 | 0.142 | 0.066 | 0.046 |

In Table 2, the standard deviation of measurements over several parts is less than 0.142 mm, suggesting that dimensional repeatability of the DMD process is very good in the deposition plane. Modification of control software to account for the finite laser beam width allows this process to very accurately produce parts. A process capable of fabricating hardware within ±0.127 mm. directly, in metal, will satisfy many current needs for direct fabrication applications. It is reasonable to expect these numbers to approach machine tool accuracy. At this time the dimensional repeatability of the DMD process in the growth or vertical direction is approximately ±0.381 mm, which is not as good as in the deposition plane.

DMD technology is clearly valuable for tooling applications. This process holds the promise of significantly impacting many other manufacturing areas. Although work to date has focused on producing fully dense metallic structures, modification of existing process parameters allows porous structures to be produced. Both step-function and gradient-transition interface characteristics between differing materials is described below.

Impacted immediately by the DMD technology, are applications where high strength-to-weight ratio materials are required. For many applications, a tenuous qualification process must be performed prior to substitution of one material for a second material. Even after qualification, designers are often reluctant to make the transition to a new material. Using DMD technology, composite materials can easily be fabricated for testing and evaluation.

In developing the DMD process, statistical data from experiments have been used extensively by the inventors. These experiments have caused controlling relationships between process variables and response variables to be identified and defined. From the experimental results, response surface models were developed to optimize the process. One critical relationship identified through these experiments was the deposition layer thickness as a function of certain process parameters. Using the deposition layer thickness as a response variable, both laser irradiance and the velocity of the deposition were identified as key process parameters.

Figure 3:
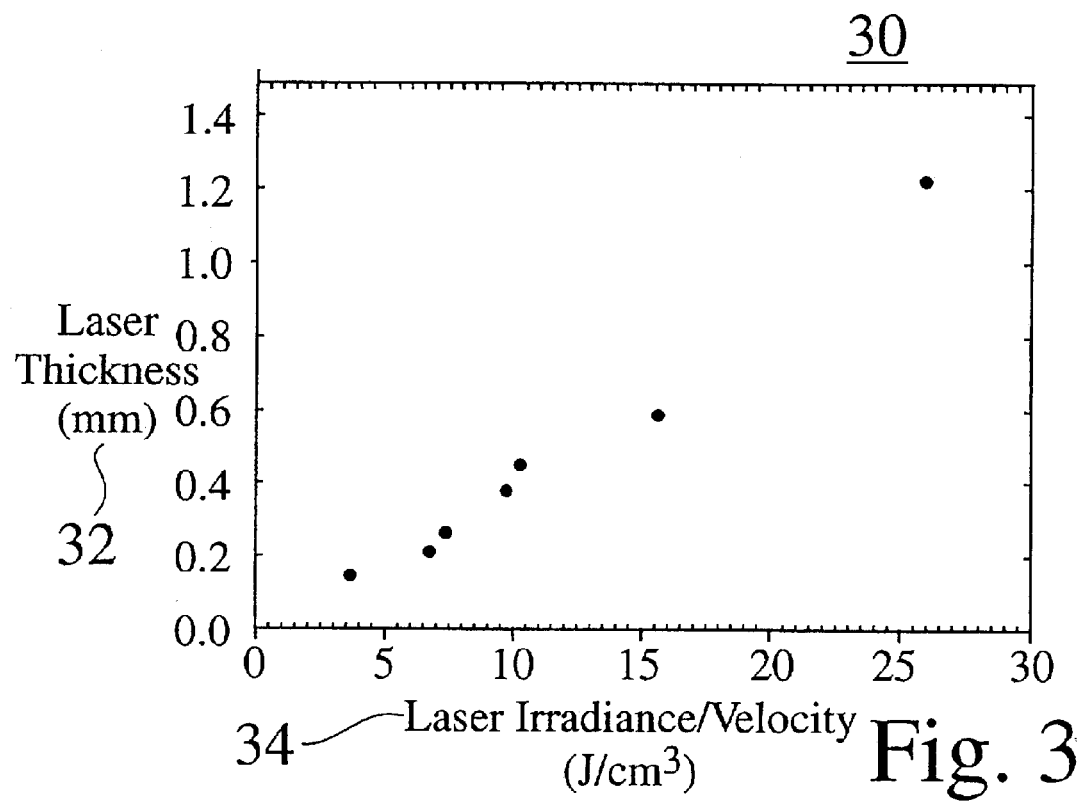
FIG. 3 is a chart showing deposition layer thickness as a function of the volumetric exposure (laser irradiance/velocity) of the metal deposition measured in several samples.

FIG. 3 shows a graph 30 of deposition layer thickness 32 in a z-plane vs. laser irradiance (J/sec-cm$^2$) divided by the deposition velocity in an x-y plane (cm/sec) 34. Inspection of this graph 30, shows that the deposition layer thickness 32 varies approximately linearly with J/cm$^3$ 34.

Figure 4:
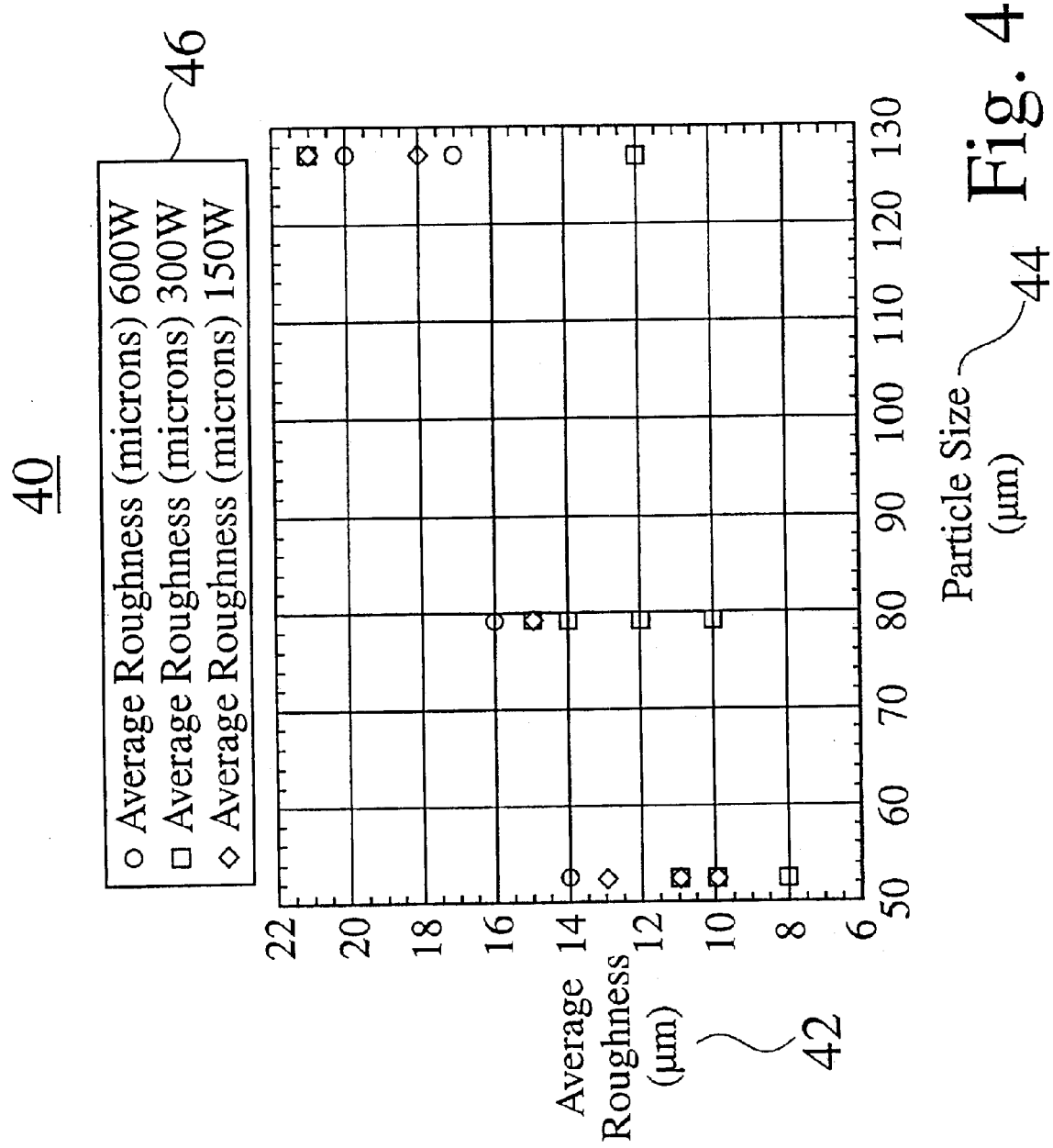
FIG. 4 depicts a graph of surface finish as a function of powder mesh size and laser power used in creating deposited metal samples.

The relationship of surface roughness 42 with powder particle size 44 is displayed in the chart 40, shown as FIG. 4. For this set of experiments, the average roughness (am) of the surface finish of the deposited material was measured as a response variable while a variety of process variables including laser power, particle size, particle size distribution, etc. were considered as process variables. The chart 40 shows that at a given laser power, the surface finish roughness 42 is a function of the particle size 44, as one might expect. Closer analysis of the graph 40 shows that there is a strong functional dependence of the surface finish on laser power. In fact, a statistical analysis indicates a power level of approximately 350 watts achieves the best finish independent of the particle size. These relationships have been used for DMD process optimization in the present invention.

To develop a single system to produce finished parts directly from a CAD solid model, other laser techniques have been evaluated to enhance the DMD process. As an example, laser glazing of a previously deposited layer has yielded significant improvements in surface finish. The results suggest that this method can be applied to achieve the surface finish required for tooling and other precision applications. The measured surface finish for laser glazing tests is given in Table 3:

TABLE 3

Measured surface finish for laser-remelted directed material deposition

| Surface Condition | Surface Finish (am) |
| --- | --- |
| As Deposited | 10.97 |
| Remelt Condition 1 | 2.46 |
| Remelt Condition 2 | 1.88 |

The measured surface finish for the DMD fabricated part without additional processing is 10.97 am. Applying different processing conditions for the second and third sample demonstrates that surface finish can be dramatically improved using a laser glazing technique. In fact, without significant optimization, a surface finish of approximately 1.88 $\mu$m was obtained. Laser glazing is programmable into the control files, so that the process is not interrupted by removing a partially completed article from the work flow.

1a. Using a Finished Part as a Substrate

In another embodiment of the invention, the substrate may be a generally or substantially finished part which requires another finish, feature or modification. In one specific application, this method may be employed to seal up cavities. In another application, this additional deposition step may be used to provide a hard surface on top of a softer material. In general, this extra deposition can offer a high value-added manufacturing process.

1b. Finished Part is Segmented into Different Features

In another embodiment of the invention, the component being fabricated is segmented into different features that are built in a sequential fashion by determining the optimum build direction for each segment prior to building the complete component.

2. Controlling the Microstructure of Materials Formed by Directed Material Deposition Referring again to FIG. 1, it shows the directed material deposition apparatus 10 of the prior art. A collimated laser beam 12 is focused onto a substrate 19 and powdered material 14 is then injected into the deposition spot. The powder 14 streams come into the deposition area 20 and are melted by the laser beam which is focused by lens 13. Initially the deposition begins at the surface of the substrate at the deposition spot on the substrate 19. As the fabrication progresses, the deposited material layers 15 are built into the desired shape.

Figure 1A:
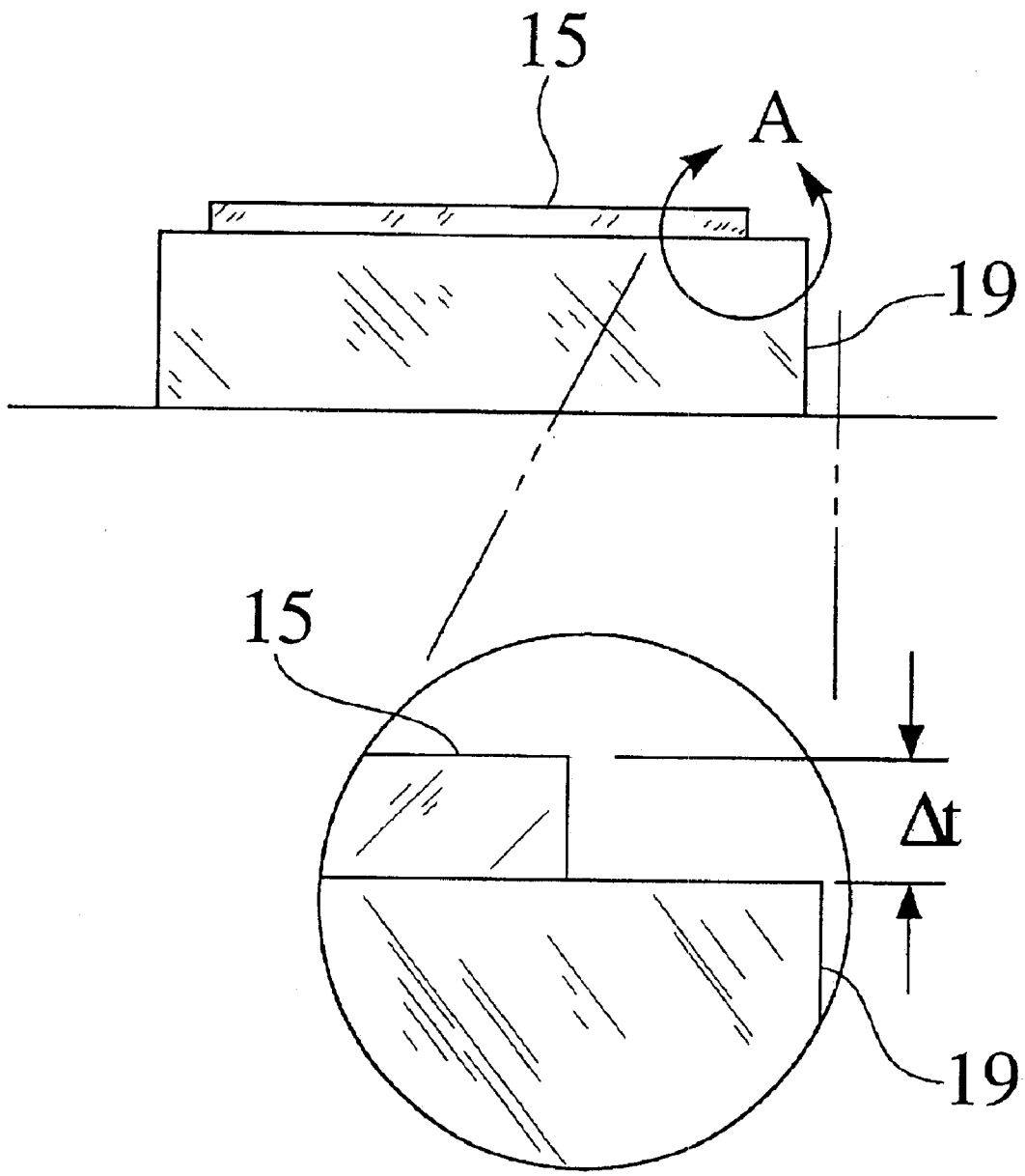

FIG. 1a shows a layer of material 15, having a thickness Δt, deposited on top of a substrate 19 or substructure. Material properties such as tensile strength, toughness, ductility, etc. may be engineered into the material layer 15 using a laser-exposure factor (E), defined as:

$$E = a\frac{p}{v}.$$ Equation (1)

Constant a includes the focused laser spot diameter and material constants. Variable p is the laser power in Joules per second, and v is the velocity in centimeters per second, of the deposition 15 relative to the surface of the substrate 19 or substructure. The exposure parameter E is a measure of energy input and thus has an effect on the solidification or quench rate of the deposited material 15. Thickness Δt of the layer is critical to the control of material microstructure. It affects the quench rate, but it also affects the thermal gradient created in the deposited structure. If thickness Δt is precisely controlled along with solidification rate, then the material microstructure within a DMD structure can be controlled. Knowing the thermal gradient and how to vary it allows one of ordinary skill in the art to precisely control the microstructure of the deposited material. Production of articles having directional solidification and even single-crystal structure is enabled. See the discussion below in Sections 5 in respect of forming structures from multiple materials.

Substrate temperature biasing helps when one wishes to make parts having single-crystal growth. This technique is described in more detail below.

Figure 4A:
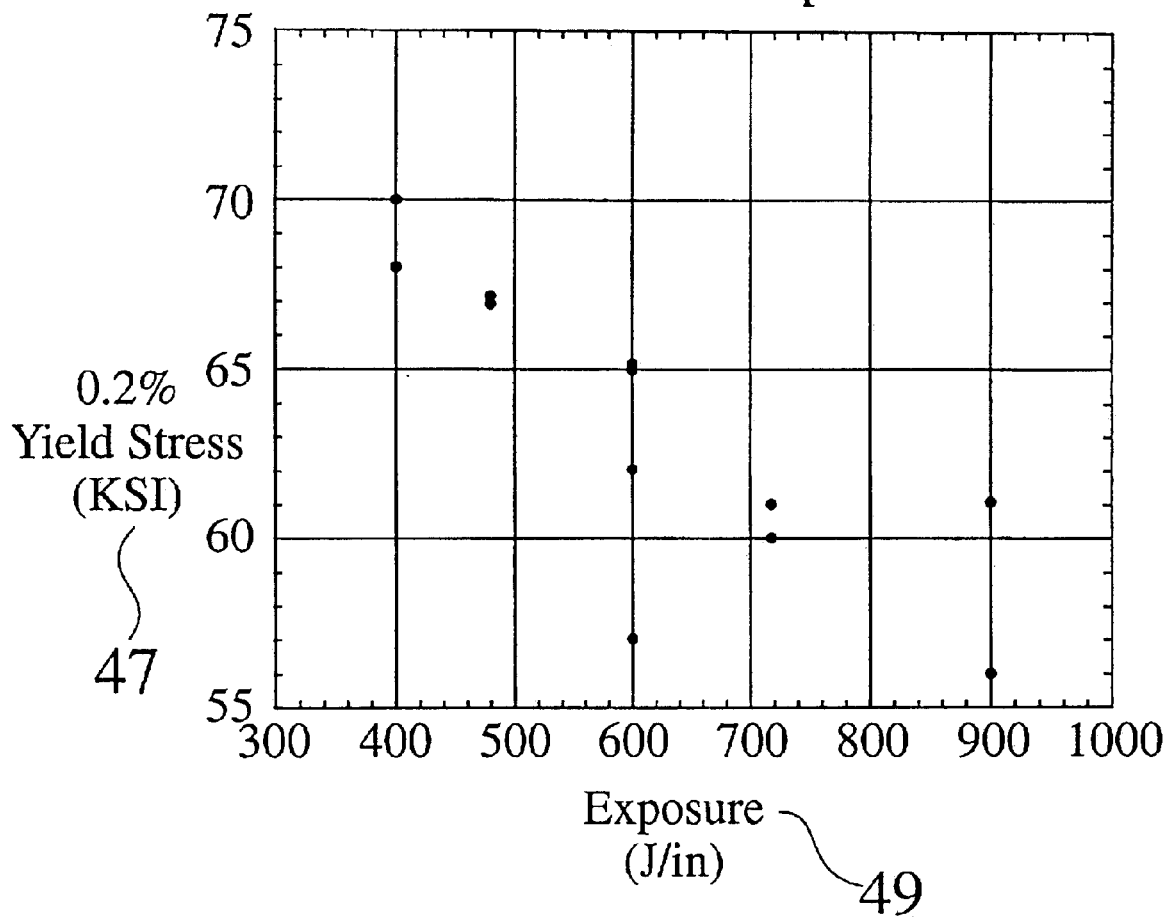
FIG. 4a is a graph that demonstrates how material strength of 316 stainless steel varies with exposure parameter E.

FIG. 4a depicts a tensile stress versus exposure graph 48 that demonstrates how material strength varies with the exposure parameter E. In the graph, 0.2% yield strength 47 of 316 stainless steel is plotted against values of the laser-exposure factor 49. A regression line drawn through the data points shows that the 0.2% yield strength 47 of the test material, declined approximately 0.030 kilopounds (Kips) per square inch, per unit of laser-exposure factor 49.

3. Substrate Heating for Producing Parts Having Accurate Dimensions

Figure 5:
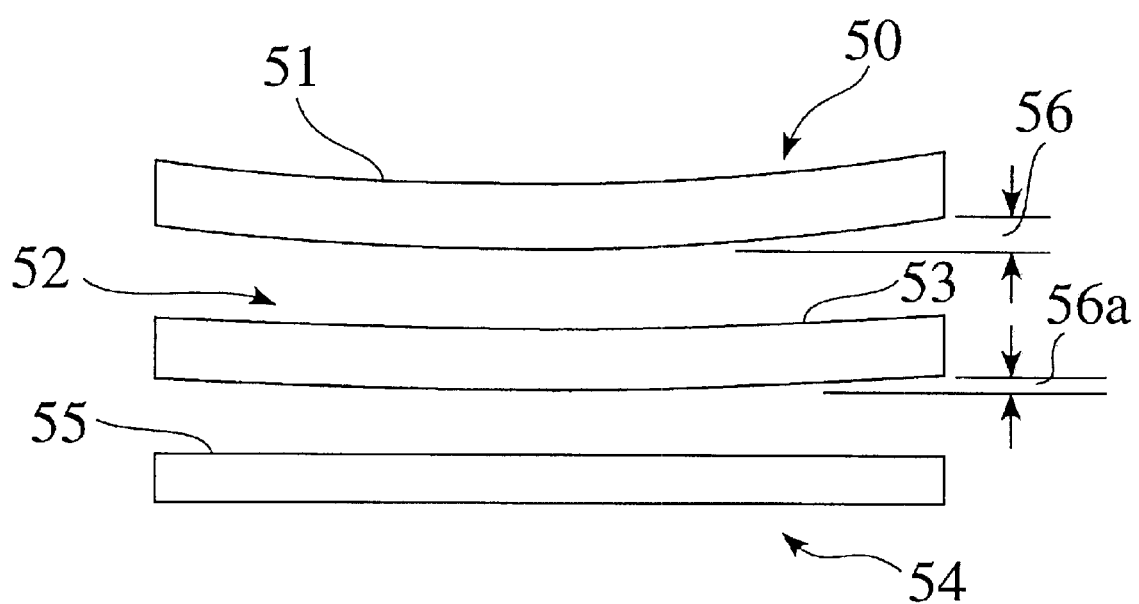
FIG. 5 is an elevation-view comparison of deformation of three substrate samples exposed to metal depositions using laser beam melting, the most deformed substrate having no preheating, the least deformed substrate preheated to 200 degrees centigrade and the intermediate substrate preheated to 100 degrees centigrade.

FIG. 5 reveals a side view of three different substrate pieces 50, 52, 54 that were exposed, in an actual experiment on H13 tool steel, to the laser beam 12. Different biasing temperature were applied to the substrates 50, 52, 54. The first substrate 50 was not preheated before the laser beam impinged on its upper surface 51. Because the upper and lower surfaces cooled differentially, the substrate 50 has deformed 56. A second substrate 52 was preheated to 100 degrees centigrade (° C.) before the laser beam melted the upper surface 53. The substrate 52 also suffered deformation 56a, but considerably less than in the first case. A third substrate 54 was preheated to 200° C. No deformation is seen, even though the upper surface 55 was subjected to the same melting conditions as the other two substrates 50, 52.

The substrates 50, 52, 54 were first ground flat. On the upper surface 51, 53, 55 of each substrate 50, 52, 52 was deposited two one inch by four inch patterns of material. Each of the substrates 50, 52, 54 was measured for flatness prior to beginning the tests. The first pattern deposited was one layer thick and the second pattern was 10 layers thick. For substrate 50 which was at room temperature when the deposition was made, a distortion 56 or change of flatness of 0.012 inches was observed. For substrate 52, preheated to 100° C., a distortion 56a or change of flatness of 0.008" was observed. For substrate 52, preheated to 200° C., no measurable change in flatness was detected. An additional test was made preheating a substrate to 300° C. bias temperature. No measurable distortion was observed.

FIG. 6 shows an embodiment 70 of the directed material deposition apparatus in which heating is applied to the substrate 19 and deposition 15. A heat lamp 72 or other radiant source such as a laser directs radiant energy 74 to the work area 15, 19. A thermal monitoring device 76 such as an optical pyrometer is utilized to control the temperature of the work area 15, 19.

FIG. 7 reveals another heating method 80 in which a heated platen 81 is part of the x-y axis movable stage. The platen 81 provides heat to the substrate 19 and deposition 15 during processing. A temperature sensor 86 is attached to the substrate 15. Heating elements 82 are built into the platen 81. A platen temperature sensor 84 monitors platen temperature.

Of course, the heating methods described above are only examples. Other methods of heating the work are possible, such as an inductive heating source or a furnace surrounding the work.

FIG. 8 is a chart of temperature versus time 90 and depicts a profile of temperature applied to a substrate 19. The temperature of the substrate 19 is controlled before, during and after the build sequence to insure that the optimum material properties are obtained in the deposited material. The thermal profile 90 shown in FIG. 8 begins at room temperature. The temperature is then raised in a controlled ramp 95 up to the processing temperature. A constant temperature 96 is maintained during material deposition, and a controlled ramp 97 down in temperature is programmed during the time the material is cooling. This insures the correct microstructure of the material is achieved when the article cools.

FIG. 9 depicts the difference between a material deposition with heating 15 applied during processing and a material deposition without heating 15a. In the non-heating case, the top surface of the deposit 15a is flat but the substrate 19 is distorted. Because of the distortion of the substrate 19 and deposition 15 without heating, it is very difficult to control the dimensions of the deposition 15 both horizontally and vertically. However, when heating by use of apparatus shown in FIGS. 7 or 8, the substrate 19 and deposition 15 have no detectable distortion and the dimensions of the deposited article 15 are closely controlled.

An alternate profile 110 of heating applied to the deposition 15 during fabrication is depicted in FIG. 10. As in the earlier-described profile 90, the cycle begins from room temperature with a controlled ramp 112 up before deposition and a steady soak 114 during deposition and a controlled ramp 117 down in temperature after deposition. In this profile 110, steps 118, 120, 122 are added to further improve the properties of the deposited material 15. The part is not allowed to cool to room temperature prior to completing the entire thermal cycle 110.

4. Depositions Using Several Materials

FIG. 11 shows schematically the directed material deposition system 123 for fabrication with at least two different materials, and having means to preheat the substrate 19 and the material layers 15 thereon. The laser 124 projects a beam 125 through the powder deposition head 11 onto the substrate 19 and subsequently the material layers 15. The substrate 19 is mounted on a an x-y axis positioning stage 16 which contains heating and heat control apparatus. The positioning stage 16 moves the substrate 19 in a plane under the focused laser beam 125a. Two different powder feed units 126, 127 supply the powder deposition head 11. A z-axis positioning stage 18 raises or lowers the focal point of the focused laser beam 125a as the deposition grows. An enclosure 128 controls the atmosphere in the process area. The atmosphere is usually desired to be inert, but could be a reducing or oxidizing atmosphere.

A computer 129 and monitor 129a control the deposition process from stored data and CAD control files.

5. Forming Structures from Multiple Materials

Adaptation of the DMD apparatus 123 and methods have been applied to the problem of creating articles comprised of multiple materials in order to take advantage of the properties of each material. Multiple-material structures have been made by other processes, however, in the prior art there is no useful method of fabricating these structures directly from a computer rendering of an object. Prior art CAD systems and associated software only describe an article by the surfaces bounding the object. Thus, they are not effective to define the regions of gradient materials directly from computer files in those CAD systems.

In creating these structures using DMD techniques, several technical hurdles were overcome. These include: material compatibility; transitions from one material to another material; and definition of the multiple-material structure so that a simple computer controlled machine may automatically produce such a structure.

Instant change of feedstock materials, delivered from the powder feed units 126, 127 in a controlled manner, is another key requirement for the production of three-dimensional, gradient material structures. Known powder feed systems do not meet this requirement.

The invention includes hardware to control powder flow with little hesitation. It also provides a method for controlling the material composition, and thus the material characteristics, within a multiple material structure directly from computer rendering of solid models of the desired component. This method functions both with the industry accepted stereolithography (STL) file format as well as with other solid model file formats. The concept allows designers to create multiple material structures that are functionally graded, have abrupt transitions, or both. In addition, this invention provides a method to create these structures using the current solid model rendering that only define the surfaces of a model.

The development of solid free form (SFF) technologies, such as stereolithography, has created an increasing interest in creating functionally graded materials directly from a computer-rendered object. Once an object's shape is defined and the regions identified within the object where different materials are to be deposited, the object can then be broken down into a series of solid models that represent each of the different material regions.

FIG. 12 is a perspective sketch illustrating the concept 130 of capturing a solid model made of one material within a solid model made of a different material by means of the present invention. FIG. 12 presents a simple case for illustration purposes in which a block 132 of a first material is located within a second larger block 134 composed of a second material. The larger block 134 contains a cavity at its center which is the desired shape of the second block 132.

FIG. 13 is a cross-sectional view of the composite, two-materials structure 130 seen along section A—A of FIG. 12. In this structure 130, the outer block 134 is shown as being formed by layered depositions 138 made horizontally. The inner block 132 is seen as formed by layered depositions following the hatching 142 along a 45 degree angle. There is a region 136 between the inner block 132 and the outer block 134 which is to composed of both materials and is graded from outer block 134 material beginning at a surface interface 140 in the large block 134 and continuing to a surface interface 144 of the inner block 132.

In this example, the multiple material structure is defined from two solid models. FIGS. 13 and 14 illustrate these two solid models 141, 146 in cross-sectional view looking along section A—A of FIG. 12. The solid model 141 representing a first material is bounded by the exterior outline 143 and interior outline 144 of outer block 134. In FIG. 14, the solid model 146 representing a second material is "exploded" for easier visualization of the two separate models 141, 146. The solid model is bounded by the outline 140 and forms the inner block 132 and the composite, graded material zone 136. The regions defined by each of the solid models include the region 136 where the composite of the two materials is graded. By defining each of the solid models 141, 146 as containing the region where the desired amount of first material and second material will exist, the DMD apparatus 123 is programmed to deposit each of the materials in the correct proportion.

Using conventional methods, each of the solid models 141, 146 can be electronically sliced into layers, from which programming the solid object is fabricated. For a typical solid free-form method, a series of contours 140, 143 and hatch-fill lines 138, 142 are used to deposit the structure a layer at a time. The contour information is used to define the boundaries 140, 143, 144 of the object and the hatch-fill lines 138, 142 are used to fill the region within the bounding surfaces. It is only necessary now to define how the material is to be graded within the overlap region. This is input to the computer as a function of the coordinate axes, f(x,y,z). If it is assumed that the solid model slices are taken in steps along the z principal axes, then the grading becomes a function of the x and y coordinates on any given layer.

A preferred method of implementing this strategy is to define each of the solid models 141, 146 as independent entities and to electronically slice each of these models 141, 146 into layers as is typical for a solid free form method. When dimensions of the first solid model 146 and the second solid model 141 allow, these two "sliced" objects are recombined on a layer-by-layer basis. The slice information can be compared in the computer in order to define the single-material boundaries as well as the hatching information for the graded material region. The combined-slice files can then be used to directly drive a DMD apparatus 123 where the composition can be varied directly by the computer 129.

Referring again to FIG. 11, the directed material deposition process is carried out inside a sealed chamber 128, although this is not strictly required. The laser 124 generates a beam 125 which is focused to heat simultaneously a deposition substrate 19 and powder feedstock material 126, 127 that is supplied to the beam/powder interaction region 20. The laser beam 125 is focused 125a to provide an area of high irradiance 17 at or near the surface on which the deposition is to occur. The area including the focused laser beam 125a and initially, the deposition substrate 19 surface comprises the deposition region. The deposition region changes with time, thus it is not necessary for the deposition to always correspond to the surface of the deposition substrate 19. As the deposited material layers 15 build up, the deposition region can be moved far away from the original deposition substrate 19 surface. At or near the deposition region, the powder feedstock material 126, 127 intersects the focused laser beam 125a and becomes molten to create a new layer of material 15 on an existing substrate 19.

As additional new material is supplied to the deposition region, the substrate 19 on which the deposition 15 is occurring is scanned in a fashion predetermined by computer programming such that a specific pattern is created. This pattern defines the region where the material is deposited to create one layer of an object that is comprised of a series of lines. The relative position between the focused laser beam 125a and the powder feedstock material 126, 127 is fixed with respect to each other during the deposition process. However, relative motion between the deposition substrate 19, which rests on the orthogonal, x-y positioning stages 16, and the beam/powder interaction zone 20 is provided to allow desired patterns of materials to be deposited. Through this motion, materials are deposited to form solid objects a layer at a time, to provide a surface-coating layer for enhanced surface properties, and to deposit certain materials in a specific pattern to produce the object configurations described above and below. Computer controlled motion of the x-y stages provides one means for controlling the relative motion between the deposition substrate 19 and the beam/powder interaction zone 20. The computer control method is preferred to control this motion since the process is driven directly by the solid model data contained within the CAD files. Persons skilled in the art will appreciate that alternatively, the stage 16 can be stationary and the deposition head 11 moved in relation thereto. Movement of the deposition head in multiple axes, for example up to five axes, offers advantages of flexibility over the conventional x-y plane positioning, for producing overhangs and other shapes.

The present invention offers a deposition process that uses more than three axes of motion such that the part build axis can be varied during the process to allow unsupported overhangs to be built. In an alternative deposition process, the additional axes of motion may be used to fabricate outer surfaces that are unsupported by directing the deposition beam such that it is substantially tangent to the overhang surface. In one embodiment of the invention, these additional axes of motion are provided by a multi-axes deposition head 480.

5a. Feedstock Rapid-Action Powder Metering Valve

Rapid-action metering of powder feedstock flow is controlled by a spool valve assembly 149 such as shown in schematic form in FIG. 14a. The process of proportional powder flow control implemented with the use of the valve assembly 149 is depicted schematically in FIG. 14b. Rapid response to changing mass-flow requirements for powder material delivery is accomplished by using a plenum to mix powder-rich and powder-free gas streams. No stagnant flow condition can be permitted in the system once powder is "fluidized" in a carrier gas stream. Downstream of the mixing plenum a flow diverter 149 directs part of the powder-rich stream Gp and part of the powder-free stream G into a powder material delivery path 154. The volumetric flow rate of the carrier gas into each inlet 150, 151 is separately controlled and maintained. The flow diverters 158 are controlled proportionally so that the total volumetric flow rate of powder material is constant. The powder mass flow rate in the delivery path 154 to the work piece can be varied quickly from no powder to the total mass flow available in the powder-rich stream Gp. Waste gas and powder 150a are re-circulated. Waste gas 151b is reclaimed.

A flow of powder, entrained in a gas vehicle Gp such as argon or helium, is introduced into a valve body 152. A flow of gas only G enters the valve body 152 through inlet 151. A plunger 156 in which diverter passages 158 are formed, slides in and out of the body 152. With the plunger 156 in the position shown, the gas with entrained powder PG is separated into two flows 150a, 150b through the diverter passages 158. The gas G entering through inlet 151 is also separated into two flows 151a, 151b. The flow through each of the diverter passages 158 is proportional to the cross-sectional area of each passage 158 which is presented to the to the inlets 150, 151. Therefore, depending on valve position, a proportional amount of powder and gas 150b, 151a flows to the work through the diverter passages 158 and a first valve outlet 154. Waste powder and gas 150a flow from a second valve outlet 153. Remaining gas 151b flows from a third valve outlet 155. The residual gas flow 151b from the third outlet 155 is combined with the waste powder and gas flow 150a downstream of the valve. This ensures a constant flow of gas through the system while the valve is in any open position, but varies the flow of powder to the work according to plunger 156 position. Powder and gas 150b, 151a are delivered to the deposition apparatus. Waste powder and gas 150a, 151b are returned to storage.

Rapid variation of the flow of powder and gas Gp occurs when the plunger 156 is partially withdrawn from the valve body 152 and the diverter passages 158 are no longer fully presented to the to the inlets 150, 151. The flow paths 153, 154, 155 are quickly altered without stopping the motion of the powder particles. The plunger 156 is positioned under computer control in accordance with the CAD files used to control the deposition 15. A mass flow sensor 159 measures powder flow rate in real time. The sensor 159 output is used for closed-loop control of powder flow 150b, 151a. As variations in powder flow occur, the sensor signals for the powder required for the process.

One embodiment of the invention utilizes a fast acting valve for power flow control comprising at least two inlet ports and three outlet ports. A powder and a gas flow into the one outlet 150, and impinge onto the separating unit 156 where the powder and gas stream are separated into two streams 150a, and 150b. The separated streams are then directed out of the valve into tubes 153, 154. Gas input in tube 151 is also simultaneously separated into two streams 151a and 151b, and directed into tubes 154 and 155 such that it combines with the two powder streams to provide additional gas flow. This feature prevents the powder streams from slowing down this additional gas is required to maintain the minimum powder velocity to avoid having powder settle out of the gas stream.

Another embodiment of the invention, a spool valve for controlling powder flow rate may be employed. The spool valve comprises a gas and powder inlet 150; a separator 156 and two outlet tubes. The second gas inlet is provided to make up for the flow reduced caused by the separator 156.

5b. Volumetric Powder Feed Unit

FIG. 15 is a perspective view of a volumetric powder feed unit 170. FIG. 16 is a perspective view of the same unit, seen in the direction of view B-B of FIG. 15. The unit 170 allows a user to achieve extremely low flow rates with a variety of powder materials 185. FIG. 16a is a perspective view of the powder feed disk 179 and wiper assembly 184, alone (i.e., removed from the powder transfer chamber 178), revealing a series of powder feed receptacles 181, disposed circumferentially around the face of the powder feed disk 179, which pick up powder from the supply pile 185. The powder feed receptacles 181 are formed by piercing the powder feed disk 179, typically by drilling, at a radial distance from the axis of disk rotation 183.

The powder feeder design is a marked improvement over current disk-style powder feeders in which the disk typically is buried in powder. In the present invention, powder flow from a reservoir 172 to a transfer chamber 178 is limited by the angle of repose of the powder feedstock 185, preventing the disk 179 from being overwhelmed and clogged with powder 185. The present invention is insensitive to variations in flow rate of the gas 187 which transports the powder 185 to the deposition head. The spacing between the feed disk 179 and wipers 184 which remove powder from the disk can be greater than in prior art designs without losing control of powder metering. This promotes much less wear on the wipers 184 and substantially improves the life of the powder feed unit 170.

During powder feeder 170 operation, powder feedstock 185 from the powder reservoir 172 enters the powder transfer chamber 178 through feed tube 190. The powder 185 necessarily forms a heap that limits flow into the powder transfer chamber 178 but presents a constant source of powder 185 to the feed disk 179. The powder 185 partially covers the powder feed disk 179 which is disposed perpendicular to the axis of rotation of the feed disk 179 so a portion of the disk 179 and a portion of powder receptacles 181 are immersed in the feedstock powder 185. The powder feed disk 179, is driven by a motor 180 and motor controller 182. The series of feed receptacles 181 in the face of the disk 179 bring a controlled volume of powder 185 to the wiper assembly 184. Gas 187 entering under pressure through a gas inlet 186 clears the powder receptacles 181 of powder 185 by blowing it into a powder-and-gas outlet 188. From there, the powder 185, entrained in gas 187 is transported to the deposition zone 15.

To facilitate the transport of powder 185 from the powder mound to the wiper assembly 184, the powder feed disk 179 is partially immersed in the powder mound as it is rotated by the motor 180. The receptacles 181 in the disk 179 fill with powder 185. As the disk 179 rotates, only the powder in the disk receptacles 181 remains with the disk 179 as it exits the powder 185 mound. When the disk holes pass the wiper assembly 184, powder transport gas 187 "fluidizes" the powder 185 and entrains it in a gas stream 174 that is carried to the deposition area for use in the directed material deposition process. The transport gas is typically an inert gas such as argon or helium, although other gases such as nitrogen can be used in order to obtain special properties in the deposited material 15.

Another optional feature employs a tube on the bottom of the hopper which extends into the horizontal chamber 178. The powder passing through the extended tube can form a powder heap in the horizontal chamber 175 that partially covers the vertical powder feed wheel.

The powder feed wheel may be configured to rotate through the powder heap so that the holes in the powder feed wheel fill with powder that is carried past the gas 187 inlet or outlets. This arrangement renders the powder. This feature of the powder feed unit allows close tolerances between the powder feed wheel and the gas inlet and outlet wipers to be maintained, while keeping the powder largely away from these surfaces. As a result, these surfaces are not covered with powder continuously, and so the reliability is increased substantially.

The graph of FIG. 16*b* plots average flow rate for 316 stainless steel powder versus powder feed disk rotational velocity (RPM) for three test conditions, showing the performance of the powder feeder. The flow rate 200 can be varied approximately linearly from about 0.1 grams per minute to about 30 grams per minute depending directly on the rotational speed of the powder feed disk 179. The powder feeder 170 is a needed improvement to facilitate fabrication of gradient material structures.

5c. Joining Dissimilar Metals in DMD Process

When joining dissimilar metals in a DMD process, it is often necessary to place a "buttering" layer of one or more materials between the two dissimilar metals being joined. Buttering is a method that deposits metallurgically compatible metal on one more surfaces of the dissimilar metals to be joined. The buttering layers prevent coalescence of the dissimilar metals and provide a transitional region between them, because of, among other things, material incompatibility. An example of one preferred method of this process is shown in FIG. 16*c*.

In FIG. 16*c*, a substrate 210 is first manufactured or deposited from a "base" material. Buttering layers 212 & 214 of a first and second transitional material are next deposited over the first base material 210. When the transitional layers 212 & 214 are completed, a second base material 216 is deposited on top of the transitional layers 212 & 214. It should be appreciated that one or more buttering layers 212 & 214 maybe required depending on the properties of the dissimilar metals to be joined. As examples, some practical combinations are nickel as a buttering layer between copper alloys and steel, 309 or 310 stainless steel as a buttering layer when joining stainless steel to a carbon or low alloy steel, and 309 stainless steel as a buttering layer between a ferritic and austenitic stainless steel.

FIG. 16*c* depicts flat material layers, but it should be appreciated that these layers may also be contoured in several directions. FIGS. 17 through 23, discussed below, illustrate the invention's ability to form surfaces having complex contours.

6. Forming Cooling Channels for Thermal Control of Three-Dimensional Articles

Directed material deposition processes allow complex components to be fabricated efficiently in small lot sizes to meet the stringent requirements of the rapidly changing manufacturing environment. The present invention creates within a solid article, internal features using direct material deposition techniques coupled with a layer-by-layer manufacturing. These internal features provide thermal control of complex shapes, in ways not previously available. One important use for this invention is providing high efficiency cooling for injection mold tooling. The technology provides the ability to create an isothermal surface as well as produce thermal gradients within the part for controlled cooling.

The following discussion discloses features that are obtainable in an article by using direct material deposition manufacturing techniques including material sintering techniques. The development of precise material deposition processes provides the ability to create structures and material combinations that were previously not capable of being manufactured easily. Traditional methods cannot be used easily for manufacturing these internal geometries and multiple material structures that are completely enclosed in a solid body. Embedded structures forming conformal cooling channels support rapid and uniform cooling of many complex shapes. The shapes may have irregular internal or external geometry.

7. Thermal Management within Solid Structures

There are often compromises that must be made to work within the constraints of the physical environment. Compromises in the thermal management within solid structures have often been required. For example, in tooling there are often conflicting requirements for long-lifetime tool and one with efficient cooling properties. For these applications, designers will typically use a form of tool steel which can be hardened and which will provide a very good wear surface. However, the thermal conductivity of tool steels in general is relatively poor. Therefore, the cooling cycle time is compromised in favor of long tool life. The invention described herein allows these normally conflicting requirements to be simultaneously satisfied. In addition, methods of the present invention provide the ability to fashion the structures beneath the surface of a component to tailor the thermal characteristics of the structure. Thermal characteristics within a structure can be manipulated to control the rate at which a component is heated and cooled.

The opportunity to embed features such as passages, chambers and multiple material structures is provided with the present invention. As an example, structures are shown in FIGS. 17 through 23 in which passages and chambers are integrally formed. The passages and chambers can be empty, or filled with a circulating coolant liquid. They may also be filled with another material that performs a function such as increasing or decreasing the rate of cooling or heating in the structure. The passages and chambers may be interconnected to provide uniform thermal control or several passages or chambers can exist within a component that are not interconnected to provide localized thermal management. The structures may be actively or passively temperature controlled. Active control is accomplished by flowing a fluid coolant medium through the passages and chambers. Passive temperature control is achieved by combining the basic component material with other materials that locally affect the thermal gradients in particular regions of the component.

A schematic diagram of one preferred embodiment of this invention is given in FIG. 17. Cooling passages 252 which conform to the shape of a mold cavity 254 are integral with the mold block 256. For clarity, the mold block 256 has been cross-sectioned through a mid-plane 258, exposing the internal cooling passages 252 and support fin structures 259. The arbitrarily shaped injection mold block 256, is the base that houses the mold cavity 254 and the conformed cooling passages 252. The passages 252 follow the contour of the surface they lie beneath at a prescribed distance beneath the surface. The conformal cooling passages 252 are designed to follow the surface of the mold cavity at prescribed distances, determined by the desired cooling balance of the mold cavity.

The present invention produces injection molds having rapid, uniform cooling. The conformal cooling systems are integrated into the mold inserts 256 fabricated by directed material deposition techniques. Cooling passages 252 are fabricated using a DMD system 123. When using DMD techniques, passage width can be chosen such that no support material is needed and the passages will remain open cavities that are completely enclosed in the mold base 256. The conformal cooling channels 252 provide uniform support for the mold cavity 254 as well as increase the surface area of the cooling channel surfaces 259.

The embedded features 252, 259 are produced in the three-dimensional mold insert structure 256 by feeding one or more separate material feedstock 126, 127 into the directed material deposition process 123 and depositing the melted feedstock 126, 127 onto a substrate 19. The deposition is made in a manner depicted in FIGS. 12 through 14 and described above, according to computerized files of solid models of the elements of the completed article. In addition to external contours, the solid-model computer files describe regions of each separate material, regions of a composite of the materials and regions of voids in each layer or "slice." The steps are repeated a sufficient number of times in layer-by-layer patterns, defined by "slices" of the solid models, to create the three dimensional structure 156 having the geometric details depicted in FIGS. 17 and 18. It should be appreciated that these steps can produce nearly any other shape that can be imagined.

A finned structure 252 as shown in FIG. 17 provides several advantages over structures that can be produced using existing methods. Typically, cooling passages are drilled into a structure. However, the circular cross-section of the drilled passages present a minimum surface area in contact with the thermally conductive medium. Finned structures 252 can provide an order of magnitude increase in surface area. A finned structure 252 provides support for the exposed surface 254. This is critical for applications such as injection molding of plastic parts where the pressure can be on the order of 5000 pounds per square inch. One of the factors that influence the heat transfer rate of a structure is thermal conductivity of the material. A second is the efficiency at which the energy is transferred to the heat conducting medium. Uniformly distributing fins 259 beneath the surface of the component compensates for poor thermal conductivity of its materials.

FIG. 18 is a perspective view of a full mold block 256. Shown here are inlet port 260 and outlet port 262 for the flow of a coolant medium through the mold conformal cooling passages 252. In this application, cooling passages 252 that conform to the shape of the mold cavity are precisely located. The cooling passages 252 can be connected to other passages through the ports 260, 262. The passages 252 can be designed for equal and uniform flow of coolant, or whatever flow is optimum in the circumstances.

These structures offer another advantage in thermal management of fabricated articles. They can be designed to create a constant pressure and uniform flow of the coolant medium across the entire structure. FIG. 19 is a cross-sectional view of a solid, rectangular article 270, showing the internal cooling passages 276 and inlets 272, 274 made integral with the article 270. Although coolant inlet and outlet ports 272, 274 can be introduced into the part from almost any location, their respective location to the inlet and outlet of the cooling channels 276 plays a significant role in obtaining uniform cooling in these structures. The cooling channels 276 are terminated in reservoir-like features 278. The inlet 272 to a first reservoir 278 is at one end and the outlet 274 is at the end of a second reservoir 279. A constant pressure drop and uniform flow through the structure is thus provided. This is similar to the structure of a cross-flow style radiator used in an automobile. Of course, other structures used for flow control can also be formed by DMD processes.

The DMD processes provide the unique ability to deposit a plurality of materials within a single build layer. This provides yet another advantage of fabricating structures with integral thermal management features. In many structures, the control of the temperature by active means is not possible. There may be no way to embed cooling passages 252 within a low thermal conductivity material structure 256 to facilitate heat transfer. In that case, the structure is fabricated such that the region beneath the surface is composed of a high thermal conductivity material. A technique similar to that depicted in FIGS. 12 through 14 and described above is used. High thermal conductivity material deposited in the cavities of lower thermal conductivity material provides a solid structure that acts as a heat pipe. The high thermal conductivity material is placed in contact with a heat exchange medium which provides a means to quickly cool adjacent lower thermal conductivity material.

FIG. 20 is a schematic of an alternate embodiment. It is a cross-sectional view of a cylindrical article 280 of random length having integral cooling passages 282. The structure's geometry increases cooling surface area by a significant amount. The internal cooling structure can vary in cross section and direction.

FIG. 21 is a cross-sectional view of a cylindrical object with complex geometries of separate cooling passages fabricated into the component. The view depicts an cylindrical shape 286 with multiple independent loops of cooling passages 288 and a plurality of cooling channels 289 having a common reservoir. A plurality of cooling passages 288, 289 can be incorporated for separate cooling media.

FIG. 22 is a perspective view of a solid, curved object 290 having the cooling passages 292 following the contour of the outer shape of the object 290. A person of ordinary skill in the art will appreciate that cooling passages 292 of very complex geometry can be incorporated into an arbitrarily curved shape 290. The method of the present invention, however, is not limited to heat exchanger technology in solid bodies.

FIG. 23 is a perspective view of an airfoil shape 300, such as a turbine blade, with cooling channels fabricated integrally within the airfoil. The figure illustrates incorporation of cooling channels 302 into an irregular, arbitrary shape having length, twist and curvature. The advantage of fabrication with the present invention over extruded shapes which can only have a constant cross-section should be clear.

8. Smart Substrates for Reduced Fabrication Time

The present invention is clearly useful for construction of articles with internal spaces which cannot be reached easily from the surfaces of the article for machining. Of course, there is no point in fabricating a portion of an article which can be made by using conventional means effectively. But certain "smart" substrates can be made by deposition, used as a starting point for manufacturing the whole article and can become part of the final structure. FIG. 24 is a perspective view of such a substrate 310*a* in which the outside envelope 312 and inside cavities 314 have been partially constructed by deposition using methods already described above. In FIG. 25, the upper surfaces 316 of the substrate 310*b* have been approximately three-quarters deposited. FIG. 26 reveals the completed substrate 310, before any additional, conventional machining.

Yet another embodiment of "smart" substrate is revealed in the thermal management structure of FIG. 26*a*. The lattice structure 318 is an embedded structure in which the volume of deposited material is minimized but the design offers sufficient support for many different applications. This structure allows the tubular structure 319 between the surfaces 320 to be flooded with a liquid or gas medium providing good energy-transfer efficiency between the surface 320 and the tubular structure 319. Such a device for providing thermal management of surfaces 320 allows an end user to control temperatures of the structure at a surface 320.

In FIGS. 26*b* and 26*c*, another structure 322 is illustrated in which thermal management structures are embedded beneath the surface 323 using the DMD process. This structure 322, shows particularly a tool for plastic injection molding in which the cooling channels 324 within the structure 322 conform to the shape of the molding surface 325. Unlike the finned structures shown in FIGS. 17 through 23, The channels here have a circular cross-section. Further enhancing the ability to control the temperature of a structure at its surface, cooling structures can alternatively comprise embedded materials of different thermal conductivity from the surface material. For example, copper can be used as an embedded material of high thermal conductivity.

9. Fabricating Unsupported Structures

A combination of methods is used to build three-dimensional, graded material structures. A problem of construction is creating overhanging edges which may occur in cavities within a structure. FIGS. 27 and 28 illustrate one preferred method of producing an unsupported overhang 346 in a structure 15 using three-axis positioning. The focused laser beam 340 is moved a distance $\Delta x$ over the edge of a previously deposited surface 15 and a bead of material 344 is deposited. The distance $\Delta x$ is typically less than ½ of the focused laser beam diameter 17. At this distance $\Delta x$, surface tension of the melted material 342 aids in maintaining the edge, thus allowing a slight overhang 346. By repeating this deposition several times in one layer 348, an angle of the overhang 346 of approximately 60 degrees can be achieved. After the over hanging edge 346 bead 344 and other edge beads 344 are deposited, material is filled in to complete the layer 348.

FIG. 28*a* shows how additional beads of material may be attached to an existing overhanging surface 346. By defining the overhanging surface 346 as a series of contours that incrementally move outward, away from a solid structure 15, several beads 345 of material may be added to a structure to extend the build over an unsupported region. A second bead of material 345 is deposited to the first edge bead 344 using a multiple contouring method. The overhanging surface is extended into a region where there is no underlying support for the bead. The method provides a "virtual" support for the overhanging build.

In an alternative embodiment, the multi-axis capability of the invention is used to deposit the overhanging surfaces 344, and then the filled regions are filled 348 by the deposition beam, which is directed towards the build surface in a direction normal to the substrate surface.

In another alternative embodiment, the plane of deposition is rotated in respect of the work piece 15 as shown in FIGS. 29 and 30 so the focused laser beam 340 is parallel to a tangent 343 to the surface which is being built. When the edge beads 344 have been deposited as in FIG. 31, the part can be reoriented with the deposition layer 348 normal to the laser beam 340 axis as seen in FIG. 32. The layer 348 is filled in, as before.

Note that either the part 15 or the laser deposition head 14 can be adjusted to accomplish parallelism of the laser beam 340 axis with the tangent 343 to the surface of the deposition 15. In fabricating certain configurations of structures, it is easier to tilt and rotate the deposition head axes than those of the part. The present invention, therefore, includes a deposition head which deposits materials in directions other than downward along the z-axis.

10. Protecting the Fiber Optic which Delivers Laser Power to the Work

Work with known systems 10 in the field has shown that catastrophic failure of a fiber optic used to deliver laser energy to the deposition surface 15 can occur because of the effect of reflected laser energy on the optical fiber. The present invention includes a laser beam delivery system which eliminates this problem by imaging both specular and diffuse reflections from a laser beam emanating from the work area 17 on an area of surface that is a distance from the fiber optic face.

The laser beam delivery system 420, depicted in FIG. 33, provides a laser beam 436 from a preferred Neodymium YAG laser. The beam 436 emerges from an optical fiber 430 and is focused on a spot 17 on the surface of the work piece 15. The beam 436 is reflected to the work piece 15 at an approximate right angle by a folding mirror 438. After the diverging laser beam 436 leaves the optical fiber 430, it is collimated by lens 433. The collimated beam 436 is then focused by a convex lens 434 to achieve the high power density required to melt material at the work piece surface 15.

In prior fiber delivery systems, off-axis reflections result when rays of an unfocused laser beam reflect from a folding mirror used in the optical system, at an angle other than 45°. In the present invention, because the beam is focused before it strikes the mirror 438, the off axis reflections do not occur. While the reflected beam 439 has a small aberration, it only serves to spread out the beam energy at the beam image 17 on the deposition surface 15.

Typically, the folding mirror is positioned at 45° to the axis 440 of the beam 436 and reflects the focused beam 436a normal to the work piece surface 15. When the laser beam 436a is sharply focused on the deposition surface, any reflected light travels along the reverse path. A reflected beam 439 is incident on the folding mirror 438 and is directed through the focusing lens 434 in a reverse direction. The focusing lens 434 now collimates the reflected laser energy and the collimating lens 433 focuses the reflected beam 439 onto the optical fiber 430. Since there is generally some tolerance associated with the mirror 438 mounting, the beam 436 may not always be coupled directly back normal to the optical fiber face. If coupling should occur, some of the reflected laser light 439 leaks out of the fiber 430 and for a short time no serious heating results. During the powder deposition process, however, the operating time is long enough that the optical fiber 430 can be damaged by the additional heat of the reflected laser beam 439.

To solve this problem, the reflected laser beam 439 is deliberately imaged elsewhere than on the optical fiber 430. By tilting the folding mirror slightly from 45° to the beam axis 440, an angular deviation of the optical system is introduced. For example, if the folding mirror is tilted at a 2° angle away from 45°, a sufficient offset is introduced into the beam 439 to prevent the reflected beam 439 from being imaged back onto the fiber optic 430. When specular reflection of the focused laser beam 436a occurs at the work piece surface 17, the beam 436a is reflected away from the surface 17 at an angle equal to the angle of incidence. The reflected beam 439 propagates back towards the folding mirror 438 at an angle of 2° with respect to the normal to the work piece surface 17. When the reflected beam strikes the folding mirror 438, a second 2° offset is added to its direction of propagation with respect to the optical axis 440 of the emergent beam 436. That is, the reflected beam 439 is now directed 4° away from the axis of the optical fiber 430. In a preferred embodiment, the reflected beam 439 is imaged harmlessly on the water-cooled optical fiber holder 431a distance away from the optical fiber 430 itself. This small angular deviation introduces a small displacement of the focused spot 17 from a point normal to the deposition surface 17. Through proper design, negative effects due to the different trajectory angle of the reflected beam 439 through the powder stream intersection region 20 are negligible.

The focused beam 436a is incident onto the surface 17 of the work 15 at 2° from normal. The beam 436a passes through the powder stream intersection region 20 at this angle also. If it is assumed that the deposition occurs in a 0.100 inches long region of the powder stream intersection zone, that is along the work piece surface 17, the "pointing" error of the beam 436a in the deposition plane is as about 0.0035 inches. This error is negligible.

Zemax™, a commercially available optical design package, was used to determine the offset as the beam 436, 439 was propagated through the collimating and focusing lenses 433, 434. The prescription data and details used to model the lens are not included here. However, the predicted location of the final specular-reflected beam image on the fiber holder 431 was displaced from the center of the optical fiber 430 by approximately 0.310 inches. An image due to diffuse reflections should be offset by at least half of this amount.

Although the offset image of the reflected beam 439 prevents the reflected laser energy from damaging the optical fiber 430, there is also an issue of direct fiber heating by the laser beam 436 as it is transmitted through the optical fiber cable 430. To mitigate this effect, the output end of the fiber 430 is mounted in a water-cooled copper block 431. The copper block 431 has an output aperture diameter of about 0.2 inches. The diameter was chosen to be sufficiently large to accommodate the diverging output beam 436 from the fiber 430 without blocking the beam 436. At the edge of the aperture, the surface of the copper block 431 is beveled at 45° to reflect any light incident onto this surface outward away from the center line 440 of the fiber mount. The inner, rear surface of the block 431 traps the reflected light 439 so that the laser energy can be absorbed in the fiber holder 431 where the heat can be subsequently carried away by cooling water.

The above system of laser beam 436 delivery has been performed while operating the laser at 900 watts and scanning the focused beam 436a on a copper substrate 15 for approximately one hour. The copper substrate 15 has a reflectivity of approximately 98% at the laser wavelength of 1.064 am. Essentially, all of the laser power was reflected back to the water-cooled surface of the fiber holder 431. There was no degradation of the optical fiber 430 at its output.

11. Laser Beam Shutter

To cut-off the laser beam 125 while re-positioning the deposition head 11 from place-to-place on the work piece 15, a laser beam shutter assembly 450 has been created for the DMD process such as outlined below. FIGS. 34 and 35 are perspective views of the laser beam shutter assembly 450. FIG. 35 shows the assembly of FIG. 34 with the cover and a section of the liquid cooled beam "dump" 452 removed. The design of the beam "dump" 452 for this shutter assembly 450 is unique. The beam dump 452 is a liquid-cooled metal block 453 on which the laser beam 436 is focused by the laser beam shutter mechanism 462. To allow operation at high power, it is important to be able to spread the laser energy out over a large surface to avoid damage to any of the beam dump surfaces. Liquid is circulated through tubes 454 to cool the whole beam dump block 453.

Probably the most important reason for avoiding damage to the beam dump 450 is danger of generating vapor which will degrade optical surfaces near a damaged dump surface. As with any optical surface, once some damage has occurred, the surface quickly degrades to a point of uselessness.

Figure 35A:
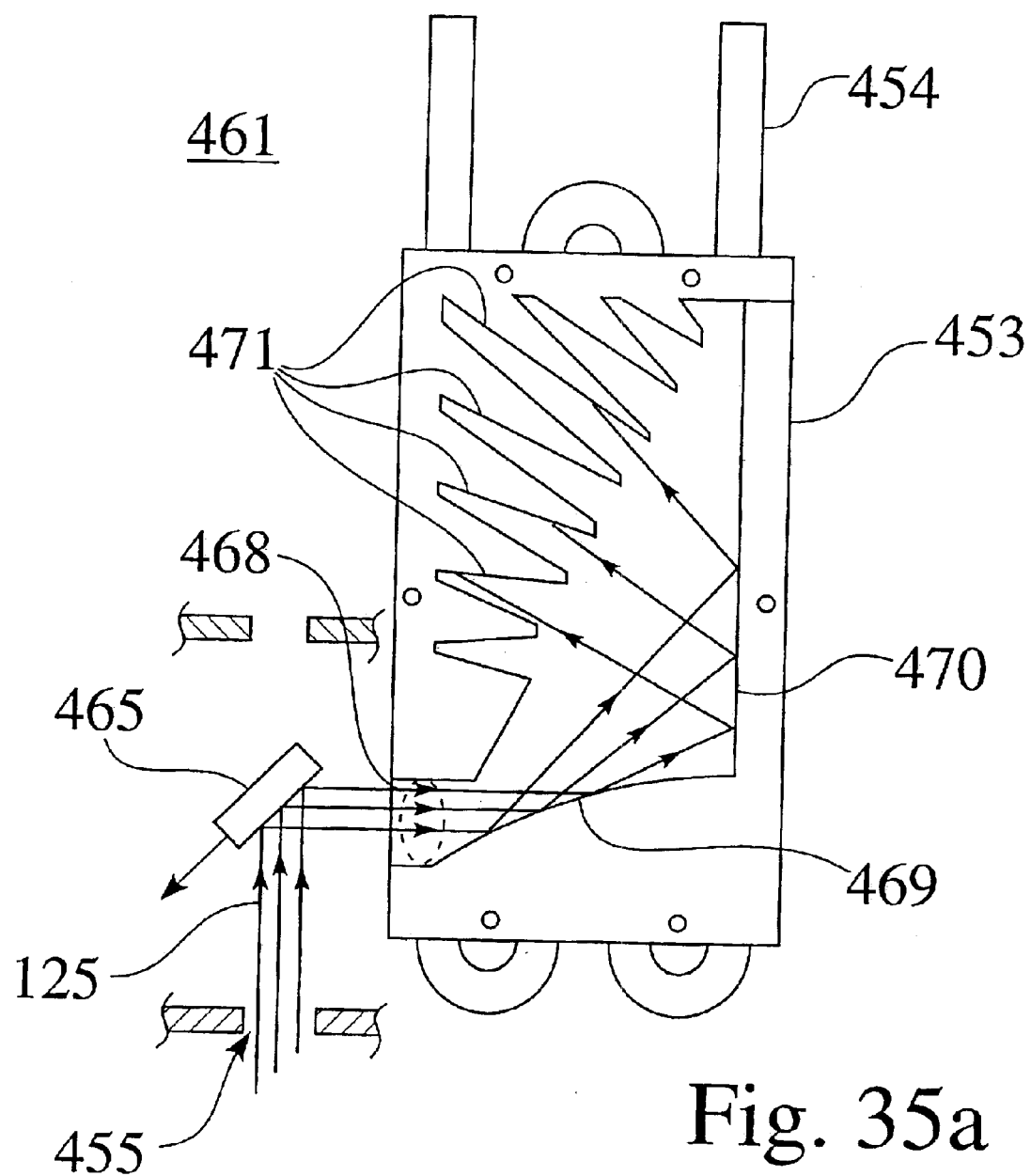
Figure 36:
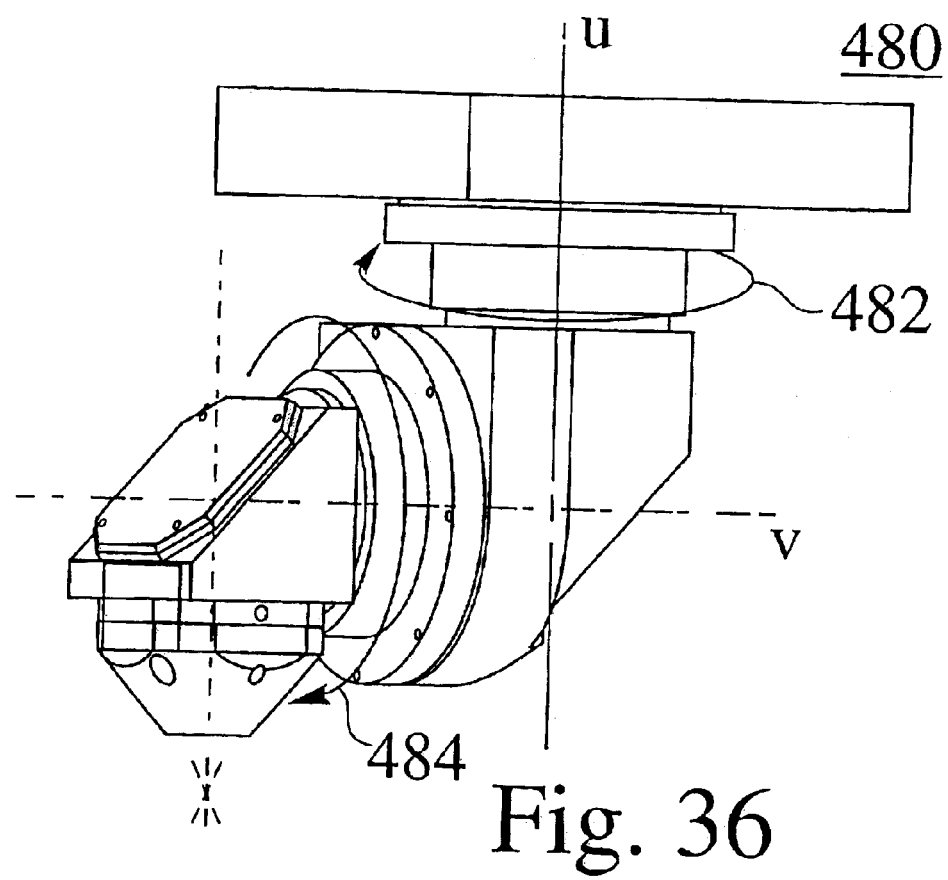
Figure 37:
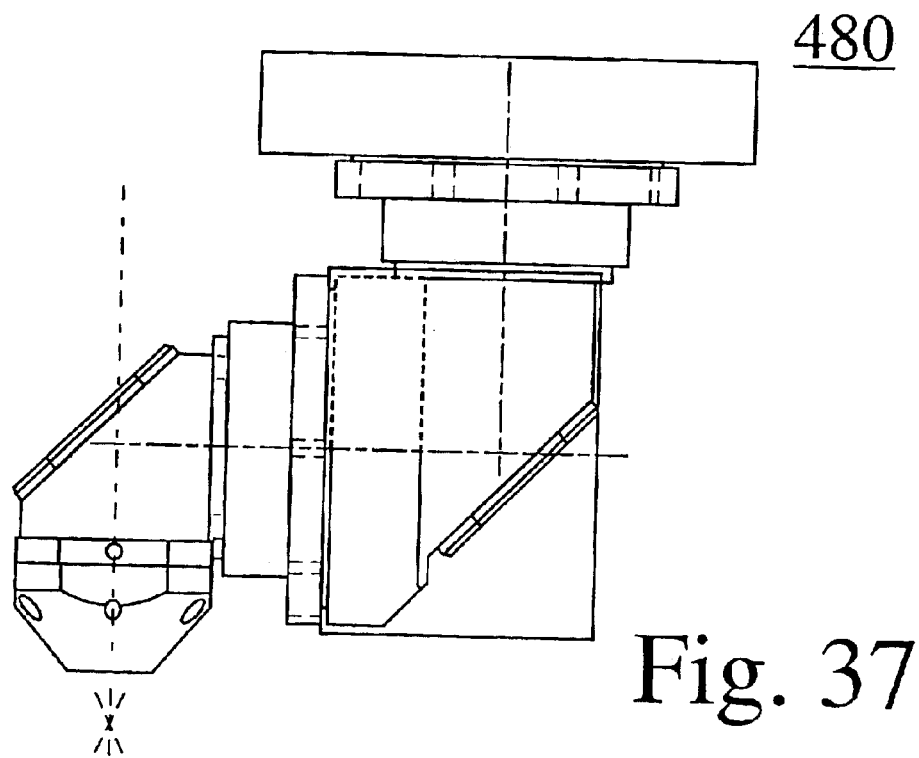
Figure 38:
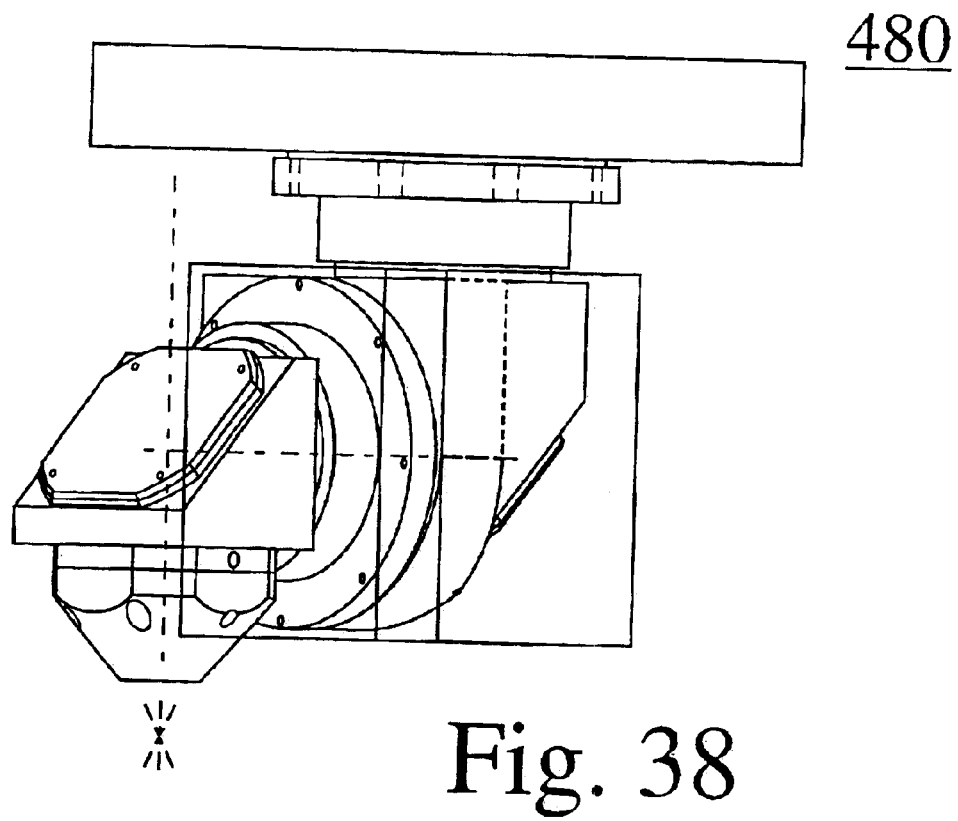
Figure 39:
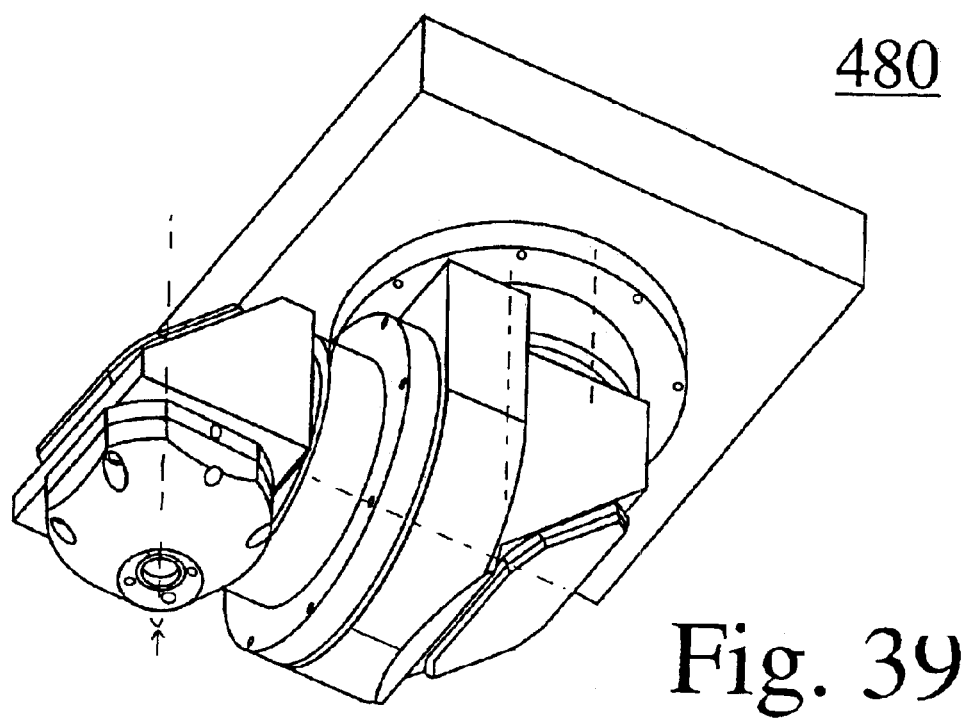

FIG. 35a is a schematic sketch of the operation of the laser beam shutter mechanism 462 with the cooling caps 451 removed. The laser beam 125 is interrupted by a mirror 465 which redirects the laser beam 125 into the laser beam absorption chamber 466 through laser dump aperture 468. The beam 125 falls on a first reflective, diverging surface 469. The divergent beam is reflected onto a second reflective surface 470 and then onto surface 471 where it is absorbed. Creation of the divergent beam may be by alternative means such as a lens, concave or convex reflective surface.

12. Multi-Axis Deposition Head

FIGS. 36 through 40a reveal a multi-axis deposition head 480 which is designed to deposit materials in other directions in addition to the z-axis. The head 480 contains the powder delivery system integrally. When coupled with a three-axis stage which positions the deposition head 480 in the x-y-z orthogonal axes, the deposition head 480 provides rotation 482 about a fourth axis u and rotation 484 about a fifth axis v. Of course, the work piece can also be moved in the x-y-z orthogonal axes and the deposition head 480 held stationary.

FIG. 40*a* shows how the deposition head 480 is continually positioned to produce a three-dimensional, curved object 490. It is the relative motion of the deposition head 480 and the work piece which creates the lines of material deposition, as has already been seen. Applying the multi-axis feature of the deposition head 480, enables three-dimensional structures of virtually every kind to be fabricated directly from a CAD solid model. In addition to the multi-axis head 480, robotic arms and tilting, rotating stages for the work piece are usable for fabrication of many three-dimensional structures. These features also facilitate use of transformations to various coordinate systems which accommodate specific geometric configurations such as cylinders and spheres.

The multi-axis deposition head 480 includes the powder delivery system 170 and optical fiber, laser beam delivery system 420 described above. FIG. 40*a* illustrates how the multi-axis deposition head 480 is positioned in order to produce a three dimensional, curved structure 490. Controlled translation in three axes x, y and z and controlled rotation about two axes u an v are used to position the deposition head 480 with respect to the work piece 490. Note that the translation of the head in the x, y and z axes can be used in place of or in combination with the translation of stage 16.

13. Particle Beam Focusing to Reduce Material Waste

FIG. 41 depicts one of a plurality of powder delivery nozzles 14 of the prior art, which are disposed in a deposition head 11. In this configuration, a stream of gas-entrained powder 502 exits a powder tube 500 and tends to disperse away from the axis of the stream 502 because of expansion and deceleration of the gas.

FIG. 42 shows an improved powder delivery nozzle 504 used in the present invention. A coaxial flow tube 506 surrounds the powder tube 500 and is coextensive with it. The bore of the coaxial flow tube is slightly larger than the outside diameter of the powder tube 500. Gas 508 is forced to flow through the coaxial flow tube 506, between the outside diameter of the powder tube 500 and the inner bore of the coaxial flow tube 506. The gas 508 forms a sheath-like column 510 surrounding the entrained powder 502 as it leaves the powder tube 500. The gas column 510 provides a barrier to the entrained powder 502 and as a result, the powder 502 is projected from the powder tube 500 in a coaxial stream, and remains so for an extended distance and time period.

The improved nozzle 504 projects a smaller, constant-diameter powder stream 502 for a longer distance than the prior art nozzle 14. As a result, the powder delivery nozzle 504 can be located farther away from the deposition 15 surface with much less waste of material. Material utilization efficiency depends on the ratio of area of the laser-created molten pool 17 to that of the powder stream 502 footprint on the deposition 15 surface.

FIG. 43 reveals a still further improved powder delivery nozzle 515 which increases the efficiency of directed material depositions with the present invention. A coaxial flow tube 520 which surrounds the powder delivery tube 500 is constricted at the outlet 526 so the coaxial gas column 508 is directed inward toward the entrained powder stream 502 as the powder stream 502 leaves the powder tube 500. Turbulence in the coaxial gas column 528 concentrates the powder stream 502 and focuses it to a small footprint on the deposition surface. This innovation provides an even higher concentration of powder at the deposition 15 surface than powder delivery nozzle 504, the least waste and therefore the best powder utilization efficiency. The outlet orifice depicted in FIG. 43 is as approximately square edged, which is easily manufactured. A more precision, converging-diverging nozzle shape is an alternative embodiment to the square-edged outlet 526.

The operation of the sheath-like column 510 which forms a "no-slip" fluid boundary layer may be better understood by referring to FIGS. 44 and 45. FIG. 45 reveals a flow of powder entrained in gas 502 which is moving at a velocity of Va. The coaxial gas flow has a velocity of Vb. The gas surrounding the powder tube 500 and coaxial flow tube 506 in the environmentally controlled chamber 128 in which the deposition takes place has a velocity of Vc. Control of the velocities Va and Vb is essential to the operation of the coaxial gas sheath 510. Flow rate conditions considering Va and Vb and Vc are:

| | |
|---|---|
| 1. | Va ≈ Vb; Vc ≈ 0 |
| 2. | Vb << Va; Vc ≈ 0 |
| 3. | Vb >> Va; Vc ≈ 0 |

FIG. 44 illustrates a flow rate condition where Va≈Vb and Vc≈0. For this first condition, there is no significant change in the direction of powder stream 502 as it leaves the powder tube 500. Vb will decrease at the edge of the coaxial gas stream 510 because the velocity Vc of the gas in the environmentally controlled chamber 128 is approximately zero. But the sheath formed by the coaxial gas flow 510 maintains the focus of the entrained powder stream 502 until it strikes the deposition surface 15.

However, if as in condition 2, Vb is much less than Va, then Vb "peels back" the entrained powder stream 502, de-focusing it and causing the powder to spread out at the deposition surface 15.

In condition 3, depicted in FIG. 45, where Vb is much greater than Va, an adverse situation develops in which the coaxial gas stream mixes 532 with the entrained powder stream and the powder spreads out unacceptably at the deposition surface 15.

In respect of the improved nozzle 515 shown in FIG. 43, control of the gas velocities Va and Vb is still important even though the localized turbulence caused by the orifice 526 helps to focus the entrained gas flow 502.

CONCLUSION

Although the present invention has been described in detail with reference to particular preferred and alternative embodiments, persons possessing ordinary skill in the art to which this invention pertains will appreciate that various modifications and enhancements may be made without departing from the spirit and scope of the Claims that follow. The various hardware and software configurations that have been disclosed above are intended to educate the reader about preferred and alternative embodiments, and are not intended to constrain the limits of the invention or the scope of the Claims. The List of Reference Characters which follows is intended to provide the reader with a convenient means of identifying elements of the invention in the Specification and Drawings. This list is not intended to delineate or narrow the scope of the Claims.

LIST OF REFERENCE CHARACTERS

FIGS. 1 & 1a
10 LENS™ apparatus, prior art
11 Deposition head
12 Laser beam
13 Focusing lens
14 Powder delivery nozzle
15 Deposited material
16 X-Y positioning stages
17 Molten metal pool
18 Z-axis positioning stage
19 Substrate
20 Laser beam-material powder interaction region
Δt Deposition layer thickness
FIG. 2
28 Sample object
FIG. 3
30 Chart of Deposition Layer Thickness v. Laser Irradiance/Velocity
32 Deposition Layer Thickness
34 Laser Irradiance/Velocity
FIG. 4
40 Graph of Average Surface Roughness vs. Material Particle Size
42 Average Roughness
44 Particle Size
46 Legend: Average Roughness and Laser Power
FIG. 4a
47 0.2% yield strength
49 Laser-exposure factor
48 Tensile Strength vs. Exposure graph
FIG. 5
50 Unheated substrate
51 Upper surface of unheated substrate
52 Pre-heated substrate (100 deg. C.)
53 Upper surface of preheated substrate (100 deg. C.)
54 Preheated substrate (200 deg. C.)
55 Upper surface of preheated substrate (200 deg. C.)
56 Deformation of first substrate
56a Deformation of second substrate
FIGS. 6 & 7
70 Directed material Deposition (DMD) apparatus with heated substrate
12 Laser beam
13 Beam focusing lens
14 Powder delivery nozzle
15 Material deposition
16 x-y axis position stages
18 z-axis positioning stage
17 Molten metal pool
19 Substrate
72 Radiant heating source
74 Radiant heat
76 Temperature sensor/pyrometer
80 Directed material deposition apparatus with heated platen
81 Heated platen and x-y positioning stages
82 Heating element
84 Platen temperature sensor
86 Substrate temperature sensor
FIG. 8
90 Temperature profile chart for DMD processing
92 Temperature
94 Time
95 Temperature cycle: controlled temperature increase
96 Temperature cycle: steady temperature maintained
97 Temperature cycle: controlled temperature decrease
FIG. 9
100 Comparison deformation of deposition for heated and unheated substrates
15 Deposition on heated substrate
15a Deposition on unheated substrate
19 Heated substrate
19a Unheated substrate
FIG. 10
110 Temperature profile chart for DMD processing
92 Temperature
94 Time
112 Temperature ramp-up
114 Steady state temperature
116 Temperature decrease to above room temperature
117 Steady state, elevated temperature
118 Second cycle: Temperature ramp-up
120 Steady state, high temperature
122 Temperature ramp-down to room temperature
FIG. 11
123 Directed Material Deposition apparatus
11 Deposition head with focusing lens
15 Deposited material
16 x-y axis positioning stages
18 z-axis positioning stage
19 Substrate
20 Laser beam-material powder interaction region
124 Laser
125 Emitted laser beam
125a Focused laser beam
126 First material storage
127 Second material storage
128 Environmentally controlled chamber
129 Computer, controller
129a Computer monitor
129b Computer signals to positioning stages
FIGS. 12 through 14
130 Solid model of a first material captured within a solid model of a second material
132 Inner block made of a first material
134 Outer block made of second material;
136 Region of overlapping solid models and composite material
138 Hatch-fill lines of deposition of second material
140 Boundary of composite material
141 Cross-section of solid model of second material
142 Hatch-fill lines of deposition of first material
144 Outer boundary of block of first material; inner boundary of composite material region 146 Cross-section of solid model of first material
FIGS. 14a & 14b
149 Rapid-acting metering valve
150 Gas and powder inlet port
150a Gas and powder waste
150b Gas and powder to delivery path (to work piece)
151 Gas only inlet port
151a Gas to reclamation
151b Gas to powder delivery path
152 Valve body
153 Outlet port, powder delivery to work piece
154 Waste powder outlet port
155 Gas flow to powder delivery path, outlet port
156 Diverter plunger
158 Diverter passages
159 Powder flow rate sensor
Gp Gas and powder input flow
G Gas input flow
FIGS. 15, 16, 16a
170 Powder feed unit
172 Powder reservoir
174 Gas and powder flow to deposition head
175 View ports
176 Reservoir lid
178 transfer chamber
179 Powder feed disk
180 Motor
181 Powder receptacles
182 Motor controller
183 Rotational axis
184 Wiper assembly
185 Powder mound
186 Gas inlet
187 Powder and gas stream to work piece
188 Gas and powder outlet
189 Mounting bracket
190 Powder feed tube
FIG. 16b
200 Flow rate axis
202 RPM axis
FIG. 16c
210 First dissimilar material
212 First transitional material deposition
214 Second transitional material deposition
216 Second dissimilar material
FIGS. 17 & 18
250 Cut-away view of injection mold insert with integral cooling passages
252 Cooling passages
254 Mold cavity
256 Mold block
258 Cross-sectioned face of mold block
259 Finned structure separating cooling passages
260 Cooling medium inlet
262 Cooling medium outlet
FIG. 19
270 Cross-section of solid rectangular article with uniform-flow cooling passages
272 Cooling medium inlet
274 Cooling medium outlet
276 Cooling passage
278 Cooling medium inlet reservoir
279 Cooling medium outlet reservoir
FIG. 20
280 Cross-section of a cylindrical article of random length with integral cooling passages
282 Cooling passages
FIG. 21
286 Cross-section of a cylindrical shape with multiple independent loops of cooling passages and a plurality of cooling channels 189 having a common reservoir
288 Independent cooling passages
289 Cooling channels with a common reservoir
FIG. 22
290 Solid, curved object having integral cooling passages which follow the contour of the outer shape of the object
292 Cooling passages
FIG. 23
300 Airfoil-shaped article having length, curvature and twist, with integral cooling passages
302 Cooling passages
FIGS. 24 through 26c
310 Completed substrate
310a Partially completed substrate
310b Partially completed substrate with partially completed upper surface
312 External surfaces
314 Internal cavities
316 Partially completed upper surface
318 Latticed substrate
319 Tubular cooling channels structure
320 Latticed substrate support surface
322 Injection mold substrate with embedded cooling channels
323 Upper surface of mold
324 Cooling channels
325 Molding surface
FIGS. 27 through 32
14 Deposition head
15 Material deposition
20 Laser beam-powder interaction zone
340 Focused laser beam
342 Powder stream
344 Material bead deposition at the part edges
346 Overhanging structure
348 Deposition layer
θ Work piece rotation
Δx Material bead overhang dimension
FIG. 33
15 Work piece deposition
17 Molten pool, deposition plane
420 Laser delivery system
430 Optical fiber
431 Water-cooled fiber holder
433 Collimating lens 432 Laser beam center line
434 Focusing lens
436 Deposition laser beam
436a Focused deposition laser beam
438 Folding mirror
439 Reflected laser beam
440 Reflected laser beam image
441 Lens housing
FIGS 34, 35 & 35a
450 Laser beam shutter "dump" assembly
451 Cooling caps
452 Laser beam "dump"
453 "Dump" block
454 Cooling fluid tubes
455 Shutter aperture
460 Cut-away view of laser beam shutter "dump" assembly
461 Light path diagram
462 Shutter mechanism
464 Shutter actuator
465 Mirror
466 Laser beam absorption chamber
468 Aperture, beam "dump"
469 Diverging first surface
470 Reflective second surface
471 Absorbent surfaces
FIGS. 36 through 40a
16 Stage
125a Focused laser beam
480 Multi-axis deposition head
482 Rotation about u-axis
484 Rotation about v-axis
x, y, z Orthogonal translation axes
FIGS. 41 through 45
14 Powder delivery nozzle of prior art
15 Deposition
500 Powder tube
502 Entrained powder stream
504 Improved powder delivery nozzle with axial-flow gas tube
506 Coaxial gas flow tube
508 Coaxial gas flow
510 Coaxial gas column and turbulence
515 Improved powder delivery nozzle with axial-flow gas tube restrictor.
520 Coaxial flow gas tube with restrictor
526 Gas tube restricted outlet
528 Restricted gas column and turbulence
530 Deposition footprint of powder stream
532 Coaxial gas flow and entrained powder stream mixing
Va Velocity of entrained powder stream
Vb Velocity of coaxial gas stream
Vc Velocity of gas in environmentally controlled chamber (128)

What is claimed is:

1. A method comprising the steps of:

defining a solid model (141, 146) which describes a finished three-dimensional structure (130), said solid model (141, 146) having embedded features, in a computer-aided design program stored on a control computer (129);

depositing a layer (15) of material feedstock (126, 127) on a substrate (19) using a directed material deposition process (123); said deposition process (123) controlled by said computer-aided design program; and using a deposition process that employs more than three axes of motion such that the part build axis can be varied during said deposition process to allow unsupported overhangs to be built on said solid model (141, 146).

* * * * *

UNITED STATES PATENT AND TRADEMARK OFFICE
CERTIFICATE OF CORRECTION

PATENT NO.        : 6,811,744 B2
APPLICATION NO. : 10/128658
DATED               : November 2, 2004
INVENTOR(S)      : David M. Keicher et al.

It is certified that error appears in the above-identified patent and that said Letters Patent is hereby corrected as shown below:

Column 1, line 24, delete "Inventions" and substitute --Inventors--

Column 36, line 40, insert the following additional claims 2-22:

2. A method comprising the steps of:
defining a solid model (141, 146) which describes a finished three-dimensional structure (130), said solid model (141, 146) having embedded features, in a computer-aided design program stored on a control computer (129); depositing a layer (15) of material feedstock (126, 127) on a substrate (19) using a directed material deposition process (123); said deposition process (123) controlled by said computer-aided design program; and using said substrate (19), which is a generally finished part, in a process which adds an additional feature.

3. A method comprising the steps of:
defining a solid model (141,146) which describes a finished three-dimensional structure (130), said solid model (141, 146) having embedded features, in a computer-aided design program stored on a control computer (129); depositing a layer (15) of material feedstock (126, 127) on a substrate (19) using a directed material deposition process (123); said deposition process (123) controlled by said computer-aided design program; and using said substrate (19), which is a generally finished part, in a process which adds an additional modification.

4. A method as recited in Claim 3, in which said additional modification is sealing a cavity.

5. A method as recited in Claim 3, in which said additional modification is depositing a hard surface on top of a softer material.

6. A method as recited in Claim 3, in which said additional modification is a high value-added manufacturing process.

7. A method as recited in Claim 1, in which said where said additional axes of motion are used to fabricate outer surfaces of said substrate (19) that are unsupported by directing said deposition beam such that it is substantially tangent to an overhang surface (344).

8. A method as recited in Claim 7, in which
said additional axes of motion are used to deposit said overhang surface (344); and
  a filled region is filled (348) by said deposition beam, said deposition beam being   directed towards the build surface in a direction normal to said substrate (19) surface.

UNITED STATES PATENT AND TRADEMARK OFFICE
CERTIFICATE OF CORRECTION

| | | |
|---|---|---|
| PATENT NO. | : 6,811,744 B2 | |
| APPLICATION NO. | : 10/128658 | |
| DATED | : November 2, 2004 | |
| INVENTOR(S) | : David M. Keicher et al. | |

It is certified that error appears in the above-identified patent and that said Letters Patent is hereby corrected as shown below:

9. A method as recited in Claim 1, in which said solid model being fabricated is segmented into different features that are built in a sequential fashion by determining an optimum build direction for each segment prior to building the complete solid model.

10. A method as recited in Claim 1, in which said additional axes of motion are provided by a multi-axes deposition head (480).

11. A method comprising the steps of:
defining a solid model (141, 146) which describes a finished three-dimensional structure (130), said solid model (141, 146) having embedded features, in a computer-aided design program stored on a control computer (129);
 depositing a layer (15) of material feedstock (126, 127) on a substrate (19) using a directed material deposition process (123); said deposition process (123) controlled by said computer-aided design program; and using a powder feed unit to supply said material feedstock (126, 127); said powder feed unit including a powder storage hopper (172); a horizontal chamber (178); a vertical powder feed wheel (179); a gas inlet (186); and a gas outlet (188).

12. A method as recited in Claim 11, which further includes a tube on the bottom of said hopper (172) which extends into said horizontal chamber (178).

13. A method as recited in Claim 12, in which the powder passing through said tube forms a powder heap in a horizontal chamber (175) that partially covers said vertical feed wheel (179).

14. A method as recited in Claim 13, in which said vertical powder feed wheel (179) is configured to rotate through said powder heap so that the holes in said powder feed wheel fill with powder that is carried past a gas inlet and said powder is substantially rendered.

15. A method as recited in Claim 13, in which said vertical powder feed wheel (179) is configured to rotate through said powder heap so that the holes in said powder feed wheel fill with powder that is carried past a gas outlet and said powder is substantially rendererd.

UNITED STATES PATENT AND TRADEMARK OFFICE
CERTIFICATE OF CORRECTION

| | | |
|---|---|---|
| PATENT NO. | : 6,811,744 B2 | |
| APPLICATION NO. | : 10/128658 | |
| DATED | : November 2, 2004 | |
| INVENTOR(S) | : David M. Keicher et al. | |

It is certified that error appears in the above-identified patent and that said Letters Patent is hereby corrected as shown below:

16. A method comprising the steps of:
defining a solid model (141, 146) which describes a finished three-dimensional structure (130), said solid model (141, 146) having embedded features, in a computer-aided design program stored on a control computer (129); depositing a layer (15) of material feedstock (126, 127) on a substrate (19) using a directed material deposition process (123); said deposition process (123) controlled by said computer-aided design program; and using a fast acting valve for power flow control of said fecdstock; said fast acting valve including two inlet ports and three outlet ports.

17. A method as recited in Claim 16, in which a powder and a gas stream flows into one outlet (150) and impinges onto a separating unit (156) where said powder and said gas stream are separated into two streams (150a and 150b).

18. A method as recited in Claim 17, in which said separated streams are then directed out of said valve into said tubes (153, 154).

19. A method as recited in Claim 18, in which a gas input said tube (151) is also simultaneously separated into two streams (151a and 151b) and directed into tubes 154 and 155 such that it combines with the two powder streams to provide additional gas flow to prevent the powder streams from slowing down this additional gas is required to maintain the minimum powder velocity to avoid having powder settle out of the gas stream.

20. A method comprising the steps of:
    defining a solid model (141, 146) which describes a finished three-dimensional structure (130), said solid model (141, 146) having embedded features, in a computer-aided design program stored on a control computer (129);
    depositing a layer (15) of material feedstock (126, 127) on a substrate (19) using a directed material deposition process (123); said deposition process (123) controlled by said computer-aided design program; and a spool valve for controlling powder flow rate.

21. A method as recited in Claim 20, in which said spool valve comprises a gas and powder inlet 150; a separator 156 and two outlet tubes.

UNITED STATES PATENT AND TRADEMARK OFFICE
CERTIFICATE OF CORRECTION

PATENT NO.         : 6,811,744 B2
APPLICATION NO. : 10/128658
DATED              : November 2, 2004
INVENTOR(S)       : David M. Keicher et al.

It is certified that error appears in the above-identified patent and that said Letters Patent is hereby corrected as shown below:

22. A method as recited in Claim 21, in which gas inlet is provided to make up for the flow reduced caused by said separator 156.

Signed and Sealed this

Seventeenth Day of October, 2006

JON W. DUDAS
*Director of the United States Patent and Trademark Office*